United States Patent
Wang et al.

(10) Patent No.: US 11,138,676 B2
(45) Date of Patent: Oct. 5, 2021

(54) METHODS, SYSTEMS AND COMPUTER PROGRAM PRODUCTS FOR COLLECTING TAX DATA

(71) Applicant: INTUIT INC., Mountain View, CA (US)

(72) Inventors: Gang Wang, San Diego, CA (US); Paul Hsu, San Diego, CA (US); Kevin M. McCluskey, Carlsbad, CA (US); Alex G. Balazs, San Diego, CA (US); Varun Krishna, San Diego, CA (US)

(73) Assignee: INTUIT INC., Mountain View, CA (US)

( * ) Notice: Subject to any disclaimer, the term of this patent is extended or adjusted under 35 U.S.C. 154(b) by 571 days.

(21) Appl. No.: 15/363,681

(22) Filed: Nov. 29, 2016

(65) Prior Publication Data

US 2018/0150913 A1 May 31, 2018

(51) Int. Cl.
*G06Q 40/00* (2012.01)
*H04L 29/08* (2006.01)

(52) U.S. Cl.
CPC ......... *G06Q 40/123* (2013.12); *H04L 67/306* (2013.01)

(58) Field of Classification Search
CPC ...... G06Q 40/12; G06Q 40/123; G06Q 40/00; H04L 67/306
See application file for complete search history.

(56) References Cited

U.S. PATENT DOCUMENTS

| 4,209,839 A | 6/1980 | Bedermen |
| 4,213,251 A | 7/1980 | Foundos |
| 4,809,219 A | 2/1989 | Ashford et al. |
| 5,006,998 A | 4/1991 | Yasunobu |

(Continued)

FOREIGN PATENT DOCUMENTS

| EP | 3535729 A1 * | 9/2019 | ............. G06Q 40/08 |
| JP | 2002-099613 | 4/2002 | |

(Continued)

OTHER PUBLICATIONS

Caplan, Robert M., "IRS Announces Release Data for 1040 Modernized E-File Program," (Dec. 31, 2007) (Year: 2007).*

(Continued)

*Primary Examiner* — Bennett M Sigmond
*Assistant Examiner* — James H Miller
(74) *Attorney, Agent, or Firm* — DLA Piper LLP (US)

(57) ABSTRACT

A computer-implemented method for collecting tax data for an electronic tax return preparation program includes a tax logic agent reading a user data profile indexed to a user ID for a user to identify an identifier of a missing datum. The method also includes a match system identifying a data source corresponding to the identifier of the missing datum. The method further includes the match system generating a partition for the user data profile. Moreover, the method includes a dispatch system generating a target queue for the data source using the partition. The target queue includes the identifier of the missing datum. In addition, the method includes a data collector querying the data source based on (Continued)

|  | $Q_A$ | $Q_B$ | $Q_C$ | $Q_D$ | $Q_E$ | $Q_F$ | $Q_G$ | STAT1 | STAT2 |
|---|---|---|---|---|---|---|---|---|---|
| Rule₁ | Y | ? | ? | ? | N | ? | ? | 40% | 10% |
| Rule₂ | N | Y | Y | ? | ? | ? | N | 20% | 5% |
| Rule₃ | N | Y | N | Y | ? | N | ? | 14% | 6% |
| Rule₄ | Y | ? | ? | ? | N | Y | N | 65% | 20% |
| Rule₅ | N | Y | N | ? | ? | ? | Y | 18% | 40% |
| Rule₆ | Y | Y | N | ? | ? | N | ? | 5% | 25% | the target queue to collect data corresponding to the identifier of the missing datum. The method also includes an importer generating a modified user data profile using the collected data.

28 Claims, 15 Drawing Sheets

(56) References Cited

U.S. PATENT DOCUMENTS

| | | | |
|---|---|---|---|
| 5,495,607 A | 2/1996 | Pisello et al. | |
| 5,557,761 A | 9/1996 | Chan et al. | |
| 5,659,718 A | 8/1997 | Osman | |
| 5,673,369 A | 9/1997 | Kim | |
| 5,742,836 A | 4/1998 | Turpin et al. | |
| 5,802,388 A | 9/1998 | Zetts | |
| 5,819,249 A | 10/1998 | Dohanich | |
| 5,819,288 A | 10/1998 | De Bonet | |
| 5,864,482 A | 1/1999 | Hazama | |
| 5,944,784 A | 8/1999 | Simonoff | |
| 6,078,898 A | 6/2000 | Davis | |
| 6,298,333 B1 | 10/2001 | Manzi | |
| 6,535,883 B1 | 3/2003 | Lee et al. | |
| 6,601,055 B1 | 7/2003 | Roberts | |
| 6,631,361 B1 | 10/2003 | O'Flaherty et al. | |
| 6,670,969 B1 | 12/2003 | Halstead et al. | |
| 6,690,854 B2 | 2/2004 | Helbing | |
| 6,691,116 B1 | 2/2004 | Bart | |
| 6,697,787 B1 | 2/2004 | Miller | |
| 6,718,336 B1 | 4/2004 | Saffer | |
| 6,898,573 B1 | 5/2005 | Piehl | |
| 6,912,508 B1 | 6/2005 | McCalden | |
| 7,234,103 B1 | 6/2007 | Regan | |
| 7,295,998 B2 | 11/2007 | Kulkarni | |
| 7,331,045 B2 | 2/2008 | Martin et al. | |
| 7,448,022 B1 | 11/2008 | Ram et al. | |
| 7,539,635 B1 | 5/2009 | Peak et al. | |
| 7,558,777 B1 * | 7/2009 | Santos | G06Q 10/10 |
| 7,565,312 B1 | 7/2009 | Shaw | |
| 7,603,301 B1 | 10/2009 | Regan | |
| 7,668,763 B1 | 2/2010 | Albrecht | |
| 7,680,756 B2 | 3/2010 | Quinn | |
| 7,685,082 B1 | 3/2010 | Coletta | |
| 7,693,760 B1 | 4/2010 | Fiteni | |
| 7,693,769 B1 | 4/2010 | Burlison | |
| 7,716,094 B1 | 5/2010 | Sutter et al. | |
| 7,742,958 B1 | 6/2010 | Leek | |
| 7,747,484 B2 | 6/2010 | Stanley | |
| 7,756,761 B1 | 7/2010 | Albrecht | |
| 7,761,333 B2 | 7/2010 | Kapp | |
| 7,778,895 B1 | 8/2010 | Baxter | |
| 7,805,343 B1 | 9/2010 | Lyons et al. | |
| 7,818,222 B2 | 10/2010 | Allanson | |
| 7,849,405 B1 | 12/2010 | Coletta | |
| 7,853,494 B2 | 12/2010 | Wyle | |
| 7,860,763 B1 | 12/2010 | Quinn et al. | |
| 7,865,829 B1 | 1/2011 | Goldfield | |
| 7,895,102 B1 | 2/2011 | Wilks et al. | |
| 7,899,757 B1 * | 3/2011 | Talan | G06Q 50/01 705/319 |
| 7,900,298 B1 | 3/2011 | Char et al. | |
| 7,908,190 B2 | 3/2011 | Enenkiel | |
| 7,912,767 B1 | 3/2011 | Cheatham et al. | |
| 7,912,768 B2 | 3/2011 | Abeles | |
| 7,917,411 B1 | 3/2011 | Bedell | |
| 7,917,412 B1 * | 3/2011 | Wang | G06Q 40/123 705/31 |
| 7,925,553 B2 | 4/2011 | Banks | |
| 8,001,006 B1 | 8/2011 | Yu et al. | |
| 8,019,664 B1 | 9/2011 | Tifford et al. | |
| 8,082,144 B1 | 12/2011 | Brown et al. | |
| 8,086,970 B2 | 12/2011 | Achtermann et al. | |
| 8,108,258 B1 | 1/2012 | Slattery | |
| 8,126,820 B1 | 2/2012 | Talan | |
| 8,190,499 B1 | 5/2012 | McVickar | |
| 8,204,805 B2 | 6/2012 | Eftekhari | |
| 8,224,726 B2 | 7/2012 | Murray | |
| 8,234,562 B1 | 7/2012 | Evans | |
| 8,244,607 B1 | 8/2012 | Quinn | |
| 8,346,635 B1 | 1/2013 | Olim | |
| 8,346,680 B2 | 1/2013 | Castleman | |
| 8,355,966 B1 | 1/2013 | Vu et al. | |
| 8,370,795 B1 | 2/2013 | Sage | |
| 8,386,344 B2 | 2/2013 | Christina | |
| 8,407,113 B1 | 3/2013 | Eftekhari et al. | |
| 8,417,596 B1 | 4/2013 | Dunbar et al. | |
| 8,417,597 B1 | 4/2013 | McVickar | |
| 8,447,667 B1 | 5/2013 | Dinamani et al. | |
| 8,452,676 B1 | 5/2013 | Talan | |
| 8,473,880 B1 | 6/2013 | Bennett et al. | |
| 8,478,671 B1 | 7/2013 | Tifford | |
| 8,510,187 B1 | 8/2013 | Dinamani | |
| 8,527,375 B1 | 9/2013 | Olim | |
| 8,560,409 B2 | 10/2013 | Abeles | |
| 8,583,516 B1 | 11/2013 | Pitt et al. | |
| 8,589,262 B1 | 11/2013 | Gang | |
| 8,607,353 B2 | 12/2013 | Rippert et al. | |
| 8,635,127 B1 | 1/2014 | Shaw | |
| 8,639,616 B1 | 1/2014 | Rolenaitis | |
| 8,682,756 B1 * | 3/2014 | Tifford | G06F 40/174 705/31 |
| 8,682,829 B2 | 3/2014 | Barthel | |
| 8,694,395 B2 | 4/2014 | Houseworth | |
| 8,706,580 B2 | 4/2014 | Houseworth | |
| 8,788,412 B1 | 7/2014 | Hamm | |
| 8,812,380 B2 | 8/2014 | Murray | |
| 8,813,178 B1 | 8/2014 | Khanna | |
| 8,838,492 B1 | 9/2014 | Baker | |
| 8,892,467 B1 | 11/2014 | Ball | |
| 8,949,270 B2 | 2/2015 | Newton et al. | |
| 9,069,869 B1 | 6/2015 | Quinn et al. | |
| 9,201,558 B1 | 12/2015 | Dingman | |
| 9,372,687 B1 | 6/2016 | Pai | |
| 9,690,854 B2 | 6/2017 | Stent et al. | |
| 9,734,136 B1 | 8/2017 | Mody et al. | |
| 9,760,953 B1 | 9/2017 | Wang et al. | |
| 9,779,129 B1 * | 10/2017 | Lequeux | G06F 16/215 |
| 9,786,017 B1 | 10/2017 | Ohme et al. | |
| 9,787,597 B1 | 10/2017 | Miller et al. | |
| 9,916,628 B1 | 3/2018 | Wang et al. | |
| 9,922,376 B1 | 3/2018 | Wang et al. | |
| 9,990,678 B1 | 6/2018 | Cabrera et al. | |
| 10,140,666 B1 * | 11/2018 | Wang | G06Q 40/123 |
| 10,475,133 B1 * | 11/2019 | Cabrera | G06Q 50/26 |
| 2002/0065831 A1 | 5/2002 | DePaolo | |
| 2002/0107698 A1 | 8/2002 | Brown et al. | |
| 2002/0111888 A1 | 8/2002 | Stanley et al. | |
| 2002/0174017 A1 | 11/2002 | Singh | |
| 2002/0198832 A1 | 12/2002 | Agee | |
| 2003/0101070 A1 | 5/2003 | Mahosky et al. | |
| 2003/0115259 A1 | 6/2003 | Narayanan | |
| 2003/0126054 A1 | 7/2003 | Purcell | |
| 2003/0139827 A1 | 7/2003 | Phelps | |
| 2003/0174157 A1 | 9/2003 | Hellman | |
| 2003/0182102 A1 | 9/2003 | Corston-Oliver et al. | |
| 2004/0002906 A1 | 1/2004 | Von Drehnen et al. | |
| 2004/0019540 A1 | 1/2004 | William | |
| 2004/0019541 A1 | 1/2004 | William | |
| 2004/0021678 A1 | 2/2004 | Ullah et al. | |
| 2004/0078271 A1 | 4/2004 | Morano | |
| 2004/0083164 A1 | 4/2004 | Schwartz et al. | |
| 2004/0088233 A1 | 5/2004 | Brady | |
| 2004/0117395 A1 | 6/2004 | Gong | |
| 2004/0172347 A1 | 9/2004 | Barthel | |
| 2004/0181543 A1 | 9/2004 | Wu et al. | |
| 2004/0205008 A1 | 10/2004 | Haynie et al. | |
| 2004/0254927 A1 | 12/2004 | Lang et al. | |
| 2005/0171822 A1 | 8/2005 | Cagan | |
| 2005/0216379 A1 | 9/2005 | Ozaki | |
| 2005/0262191 A1 | 11/2005 | Mamou et al. | |
| 2006/0085304 A1 | 4/2006 | Buarque De Macedo et al. | |
| 2006/0112114 A1 | 5/2006 | Yu | |
| 2006/0155618 A1 | 7/2006 | Wyle | |

(56) References Cited

U.S. PATENT DOCUMENTS

| | | |
|---|---|---|
| 2006/0155632 A1 | 7/2006 | Cherkas et al. |
| 2006/0178961 A1* | 8/2006 | Stanley ............... G06Q 40/123 705/31 |
| 2006/0282354 A1 | 12/2006 | Varghese |
| 2006/0287890 A1 | 12/2006 | Stead |
| 2006/0293990 A1 | 12/2006 | Schaub |
| 2007/0033116 A1 | 2/2007 | Murray |
| 2007/0033117 A1 | 2/2007 | Murray |
| 2007/0033130 A1 | 2/2007 | Murray |
| 2007/0055571 A1* | 3/2007 | Fox ...................... G06Q 20/20 705/19 |
| 2007/0094207 A1 | 4/2007 | Yu et al. |
| 2007/0136157 A1 | 6/2007 | Neher et al. |
| 2007/0150387 A1 | 6/2007 | Seubert et al. |
| 2007/0156564 A1 | 7/2007 | Humphrey et al. |
| 2007/0179841 A1 | 8/2007 | Agassi |
| 2007/0192166 A1 | 8/2007 | Van Luchene |
| 2007/0250418 A1 | 10/2007 | Banks et al. |
| 2008/0027895 A1 | 1/2008 | Combaz |
| 2008/0059900 A1 | 3/2008 | Murray |
| 2008/0097878 A1 | 4/2008 | Abeles |
| 2008/0126170 A1 | 5/2008 | Leck et al. |
| 2008/0147494 A1 | 6/2008 | Larson |
| 2008/0162310 A1 | 7/2008 | Quinn |
| 2008/0177631 A1 | 7/2008 | William |
| 2008/0189757 A1 | 8/2008 | Schackow et al. |
| 2008/0196098 A1 | 8/2008 | Cottrell |
| 2008/0215392 A1 | 9/2008 | Rajan |
| 2008/0243531 A1 | 10/2008 | Ryder et al. |
| 2009/0024694 A1 | 1/2009 | Fong |
| 2009/0031042 A1 | 1/2009 | Phatak |
| 2009/0037305 A1 | 2/2009 | Sander |
| 2009/0037847 A1 | 2/2009 | Achtermann et al. |
| 2009/0048957 A1 | 2/2009 | Celano |
| 2009/0064851 A1 | 3/2009 | Morris et al. |
| 2009/0117529 A1 | 5/2009 | Goldstein |
| 2009/0125618 A1 | 5/2009 | Huff |
| 2009/0138389 A1 | 5/2009 | Barthel |
| 2009/0150169 A1 | 6/2009 | Kirkwood |
| 2009/0157572 A1 | 6/2009 | Chidlovskii |
| 2009/0193389 A1 | 7/2009 | Miller |
| 2009/0204881 A1 | 8/2009 | Murthy |
| 2009/0239650 A1 | 9/2009 | Alderucci et al. |
| 2009/0248594 A1 | 10/2009 | Castleman |
| 2009/0248603 A1 | 10/2009 | Kiersky |
| 2010/0036760 A1 | 2/2010 | Abeles |
| 2010/0088124 A1 | 4/2010 | Diefendori et al. |
| 2010/0131394 A1 | 5/2010 | Rutsch et al. |
| 2010/0146523 A1 | 6/2010 | Brigaut et al. |
| 2010/0153138 A1 | 6/2010 | Evans |
| 2010/0274606 A1 | 10/2010 | Fain et al. |
| 2010/0312724 A1 | 12/2010 | Pinckney et al. |
| 2011/0004537 A1 | 1/2011 | Allanson et al. |
| 2011/0066602 A1 | 3/2011 | Studer |
| 2011/0078062 A1 | 3/2011 | Kleyman |
| 2011/0145112 A1 | 6/2011 | Abeles |
| 2011/0173222 A1* | 7/2011 | Sayal .................... G06F 16/215 707/769 |
| 2011/0225220 A1 | 9/2011 | Huang et al. |
| 2011/0258195 A1 | 10/2011 | Welling |
| 2011/0258610 A1 | 10/2011 | Aaraj et al. |
| 2011/0264569 A1 | 10/2011 | Houseworth |
| 2012/0016817 A1 | 1/2012 | Smith et al. |
| 2012/0027246 A1 | 2/2012 | Tifford |
| 2012/0030076 A1 | 2/2012 | Checco et al. |
| 2012/0030577 A1 | 2/2012 | Akolkar et al. |
| 2012/0072321 A1 | 3/2012 | Christian et al. |
| 2012/0109792 A1* | 5/2012 | Eftekhari ............... G06Q 40/02 705/31 |
| 2012/0109793 A1 | 5/2012 | Abeles |
| 2012/0136764 A1 | 5/2012 | Miller |
| 2012/0278365 A1 | 11/2012 | Labat et al. |
| 2013/0036347 A1 | 2/2013 | Eftekhari |
| 2013/0080302 A1 | 3/2013 | Allanson et al. |
| 2013/0097262 A1 | 4/2013 | Dandison |
| 2013/0111032 A1 | 5/2013 | Alapati et al. |
| 2013/0138586 A1 | 5/2013 | Jung et al. |
| 2013/0185347 A1 | 7/2013 | Romano |
| 2013/0187926 A1 | 7/2013 | Silverstein et al. |
| 2013/0198047 A1 | 8/2013 | Houseworth |
| 2013/0198287 A1* | 8/2013 | Raz ....................... H04L 67/22 709/204 |
| 2013/0218735 A1 | 8/2013 | Murray |
| 2013/0262279 A1 | 10/2013 | Finley et al. |
| 2013/0282539 A1 | 10/2013 | Murray |
| 2013/0290169 A1 | 10/2013 | Bathula |
| 2014/0032259 A1 | 1/2014 | LaFever |
| 2014/0068413 A1 | 3/2014 | Christensen |
| 2014/0108213 A1 | 4/2014 | Houseworth |
| 2014/0114822 A1 | 4/2014 | Sharma |
| 2014/0172656 A1 | 6/2014 | Shaw |
| 2014/0201045 A1 | 7/2014 | Pai et al. |
| 2014/0207633 A1 | 7/2014 | Aldrich et al. |
| 2014/0241631 A1 | 8/2014 | Huang |
| 2014/0244455 A1 | 8/2014 | Huang |
| 2014/0244457 A1 | 8/2014 | Howell et al. |
| 2014/0248063 A1 | 9/2014 | Chourasia |
| 2014/0337189 A1 | 11/2014 | Barsade et al. |
| 2015/0081470 A1 | 3/2015 | Westphal |
| 2015/0142703 A1 | 5/2015 | Rajesh |
| 2015/0237205 A1 | 8/2015 | Waller et al. |
| 2015/0254623 A1 | 9/2015 | Velez et al. |
| 2015/0269491 A1 | 9/2015 | Tripathi et al. |
| 2016/0027127 A1 | 1/2016 | Chavarria et al. |
| 2016/0063645 A1 | 3/2016 | Houseworth et al. |
| 2016/0071112 A1* | 3/2016 | Unser .................... G06Q 30/01 705/325 |
| 2016/0078567 A1 | 3/2016 | Goldman et al. |
| 2016/0092993 A1 | 3/2016 | Ciaramitaro |
| 2016/0092994 A1 | 3/2016 | Roebuck et al. |
| 2016/0098804 A1 | 4/2016 | Mascaro et al. |
| 2016/0148321 A1 | 5/2016 | Ciaramitaro et al. |
| 2016/0275627 A1 | 9/2016 | Wang |
| 2017/0004583 A1 | 1/2017 | Wang |
| 2017/0004584 A1 | 1/2017 | Wang |
| 2017/0032468 A1 | 2/2017 | Wang et al. |
| 2017/0104841 A1 | 4/2017 | Duke |
| 2018/0032855 A1 | 2/2018 | Wang et al. |

FOREIGN PATENT DOCUMENTS

| | | |
|---|---|---|
| JP | 2002-117121 A | 4/2002 |
| JP | 2005-190425 A | 7/2005 |
| JP | 2014-206960 A | 10/2014 |
| KR | 10-2009-0089225 | 8/2009 |
| KR | 10-2012-0011987 A | 2/2012 |
| KR | 10-2013-0027811 | 3/2013 |
| WO | WO 2004/008367 | 1/2004 |
| WO | 2017/004094 A1 | 1/2017 |
| WO | 2017004095 A1 | 1/2017 |
| WO | 2017019233 A1 | 2/2017 |
| WO | 2017116496 A1 | 7/2017 |
| WO | 2017116497 A1 | 7/2017 |
| WO | 2018022023 A1 | 2/2018 |
| WO | 2018022128 A1 | 2/2018 |
| WO | 2018/080562 A1 | 5/2018 |
| WO | 2018/080563 A1 | 5/2018 |

OTHER PUBLICATIONS

Gregg, H. R. Decision Tables for Documentation and System Analysis. No. K-1718. Union Carbide Corp., Oak Ridge, Tenn. Computing Technology Center, 1967 (Year: 1967).*

Office Communication dated Apr. 4, 2018 in Canadian Patent Application No. 2,959,230, (6pages).

Supplementary Search Report dated Mar. 26, 2018 in European Patent Application No. 16843282.1-1217, (6pages).

Amendment and Response to Office Action for U.S. Appl. No. 14/462,345 dated Apr. 12, 2018, (15pages).

Response to Office Action for U.S. Appl. No. 14/553,347 dated Mar. 30, 2018, (26pages).

(56) References Cited

OTHER PUBLICATIONS

Advisory Action for U.S. Appl. No. 14/553,347 dated Apr. 13, 2018, (7pages).
Response and Request for Continued Examination for U.S. Appl. No. 14/553,347 dated Mar. 30, 2018, (41pages).
Amendment and Response to Office Action for U.S. Appl. No. 14/673,261 dated Apr. 23, 2018, (39pages).
Advisory Action for U.S. Appl. No. 14/673,261 dated May 14, 2018, (9pages).
Amendment and Response to Office Action for U.S. Appl. No. 14/698,733 dated Mar. 30, 2018, (39pages).
Office Action for U.S. Appl. No. 14/462,058 dated Apr. 27, 2018, (47pages).
Amendment and Response to Final and Advisory Actions and Request for Continued Examination for U.S. Appl. No. 14/448,678 dated Mar. 5, 2018, (25pages).
Amendment and Response for U.S. Appl. No. 14/555,553 dated Apr. 12, 2018, (24pages).
Advisory Action for U.S. Appl.No. 14/555,553 dated Apr. 24, 2018, (3pages).
Amendment and Response to Final Office Action and Request for Continued Examination for U.S. Appl. No. 14/555,553 dated May 11, 2018, (25pages).
Amendment and Response for U.S. Appl. No. 14/529,798 dated Mar. 28, 2018, (23pages).
Response for U.S. Appl. No. 14/755,684 dated Mar. 12, 2018, (23pages).
Advisory Action for U.S. Appl. No. 141755,684 dated Mar. 30, 2018, (2pages).
Response for U.S. Appl. No. 14/755,684 dated Apr. 4, 2018, (23pages).
Office Action for U.S. Appl. No. 14/555,902 dated May 17, 2018, (23pages).
Response for U.S. Appl. No. 14/207,121 dated Mar. 19, 2018, (34pages).
Advisory Action for U.S. Appl. No. 14/207,121 dated Apr. 6, 2018 (3pages).
Response for U.S. Appl. No. 14/462,315 dated May 9, 2018, (33pages).
Office Action for U.S. Appl. No. 14/698,746 dated Feb. 28, 2018, (14pages).
Response for U.S. Appl. No. 14/698,746 dated Apr. 30, 2018, (18pages).
Advisory Action for U.S. Appl. No. 14/698,746 dated May 15, 2018, (3pages).
Response for U.S. Appl. No. 14/462,397 dated Feb. 20, 2018, (33pages).
Response for U.S. Appl. No. 14/462,373 dated Feb. 28, 2018, (25pages).
Office Action for U.S. Appl. No. 14/755,859 dated Mar. 21, 2018, (57pages).
Response for U.S. Appl. No. 14/755,859 dated May 21, 2018, (8pages).
Response for U.S. Appl. No. 14/448,886 dated Feb. 28, 2018, (31pages).
Amendment for U.S. Appl. No. 14/448,922 dated Feb. 28, 2018, (27pages).
Office Action for U.S. Appl. No. 14/448,922 dated May 16, 2018, (41pages).
Office Action for U.S. Appl. No. 14/448,962 dated Apr. 13, 2018, (17pages).
Office Action for U.S. Appl. No. 14/448,986 dated May 11, 2018, (15pages).
Response for U.S. Appl. No. 14/462,411 dated May 8, 2018, (27pages).
Response for U.S. Appl. No. 14/555,334 dated Apr. 4, 2018, (14pages).
Advisory Action for U.S. Appl. No. 14/555,334 dated Apr. 17, 2018, (2pages).
Response for U.S. Appl. No. 14/555,334 dated May 7, 2018, (41pages).
Office Action for U.S. Appl. No. 14/673,646 dated Feb. 28, 2018, (19pages).
Response for U.S. Appl. No. 14/673,646 dated Mar. 30, 2018, (22pages).
Response for U.S. Appl. No. 14/701,087 dated Apr. 2, 2018, (41pages).
Amendment After Allowance for U.S. Appl. No. 14/675,166, (5pages).
Supplemental Notice of Allowability for U.S. Appl. No. 14/675,166, (3pages).
Response for U.S. Appl. No. 14/555,296, (23pages).
Response for U.S. Appl. No. 14/555,222, (8pages).
Office Action for U.S. Appl. No. 14/700,981, (28pages).
Office Action for U.S. Appl. No. 14/673,555, (43pages).
H.R. Gregg; Decision Tables for Documentation and System Analysis; Oct. 3, 1967; Union Carbide Corporation, Nuclear Division, Computing Technology Center: pp. 5, 6, 18, 19, & 21 (Year: 1967).
Solomon L. Pollack; Analysis of the Decision Rules in Decision Tables, May 1963; The Rand Corooration; pp. iii, iv, 1, 20, & 24 (Year: 1963).
Communication pursuant to Rules 70(2) and 70a(2) EPC dated Apr. 25, 2018 in European Patent Application No. 16843282.1-1217, (1page).
Notice of Allowance and Fee(s) Due dated May 5, 2017 in U.S. Appl. No. 14/206,682, (30pages).
PCT International Search Report for PCT/US2016/044094, Applicant: Intuit Inc., Form PCT/ISA/210 and 220, dated Apr. 24, 2017 (5pages).
PCT Written Opinion of the International Search Authority for PCT/US2016/044094, Applicant: Intuit Inc., Form PCT/ISA/237, dated Apr. 24, 2017 (5pages).
PCT International Search Report for PCT/US2016/067839, Applicant: Intuit Inc., Form PCT/ISA/210 and 220, dated Apr. 25, 2017 (5pages).
PCT Written Opinion of the International Search Authority for PCT/US2016/067839, Applicant: Intuit Inc., Form PCT/ISA/237, dated Apr. 26, 2017 (12pages).
Amendment dated May 3, 2017 in U.S. Appl. No. 14/462,411, filed Aug. 18, 2014, (5pages).
Response dated May 15, 2017 in U.S. Appl. No. 14/448,962, filed Jul. 31, 2014, (30pages).
Office Action dated May 15, 2017 in U.S. Appl. No. 14/462,345, filed Aug. 18, 2014, (57pages).
Office Action dated May 15, 2017 in U.S. Appl. No. 14/555,902, filed Nov. 28, 2014, (8pages).
Office Action dated May 2, 2017 in U.S. Appl. No. 14/698,733, filed Apr. 28, 2015, (31pages).
http://en.wikipedia.org/wiki/Dependency_grammar#Semantic_dependencies, printed Mar. 11, 2014.
http://www.webopedia.com/TERM/L/loose_coupling.html, printed Mar. 11, 2014.
http://en.wikipedia.org/wiki/Loose_coupling, printed Mar. 11, 2014.
www.turbotax.com, printed Mar. 11, 2014.
https://turbotax.intuit.com/snaptax/mobile/, printed Mar. 11, 2014.
http://www.jboss.org/drools/drools-expert.html, printed Mar. 11, 2014.
http://en.wikipedia.org/wiki/Drools, printed Mar. 11, 2014.
http://en.wikipedia.org/wiki/Declarative_programming, printed Mar. 11, 2014.
http://www.wisegeek.com/what-is-declarative-programming.htm, printed Mar. 11, 2014.
http://docs.jboss.org/drools/release/5.3.0.Final/drools-expert-docs/html/ch01.html, printed Mar. 11, 2014.
http://quicken.intuit.com/support/help/tax-savings/simplify-tax-time/INF24047.html, updated Jul. 25, 2013, printed Jun. 24, 2014 (11 pages).
http://quicken.intuit.com/support/help/income-and-expenses/how-to-assign-tax-form-line-items-to-a-category/GEN82142.html, updated Aug. 11, 2011, printed Jun. 24, 2014 (2 pages).
http://quicken.intuit.com/support/help/reports--graphs-and-snapshots/track-the-earnings-taxes--deductions--or-deposits-from-paychecks/GEN82101.html, updated May 14, 2012, printed Jun. 24, 2014 (2 pages).

(56) References Cited

OTHER PUBLICATIONS

NY State Dep of Taxation, NY State Personal Income Tax MeF Guide for Software Developers, 2012, NY State.
Restriction Requirement dated May 22, 2015 in U.S. Appl. No. 14/097,057, filed Dec. 4, 2013, inventor: Gang Wang.
Response dated Jun. 30, 2015 in U.S. Appl. No. 14/097,057, filed Dec. 4, 2013, inventor: Gang Wang.
Office Action dated Oct. 2, 2015 in U.S. Appl. No. 14/097,057, filed Dec. 4, 2013, inventor: Gang Wang.
Response dated Feb. 29, 2016 in U.S. Appl. No. 14/097,057, filed Dec. 4, 2013, inventor: Gang Wang.
Final Office Action dated Apr. 8, 2016 in U.S. Appl. No. 14/097,057, filed Dec. 4, 2013, inventor: Gang Wang.
Pre-Appeal Brief dated Jun. 24, 2016 in U.S. Appl. No. 14/097,057, filed Dec. 4, 2013, inventor: Gang Wang.
Pre-Appeal Brief Conference Decision dated Aug. 15, 2016 in U.S. Appl. No. 14/097,057, filed Dec. 4, 2013, inventor: Gang Wang.
Amendment dated Sep. 13, 2016 in U.S. Appl. No. 14/097,057, filed Dec. 4, 2013, inventor: Gang Wang.
Office Action dated Nov. 4, 2016 in U.S. Appl. No. 14/097,057, filed Dec. 4, 2013, inventor: Gang Wang.
Amendment dated Feb. 6, 2017 in U.S. Appl. No. 14/097,057, filed Dec. 4, 2013, inventor: Gang Wang.
Final Rejection dated Mar. 9, 2017 in U.S. Appl. No. 14/097,057, filed Dec. 4, 2013, inventor: Gang Wang.
Office Action dated Dec. 23, 2016 in U.S. Appl. No. 14/462,345, filed Aug. 18, 2014, inventor: Gang Wang.
Amendment dated Mar. 23, 2017 in U.S. Appl. No. 14/462,345, filed Aug. 18, 2014, inventor: Gang Wang.
Office Action dated Mar. 10, 2017 in U.S. Appl. No. 14/448,678, filed Jul. 31, 2014, inventor: Gang Wang.
Office Action dated Jul. 8, 2015 in U.S. Appl. No. 14/206,682, filed Mar. 12, 2015, inventor: Gang Wang.
Response dated Aug. 31, 2015 in U.S. Appl. No. 14/206,682, filed Mar. 12, 2015, inventor: Gang Wang.
Office Action dated Mar. 9, 2016 in U.S. Appl. No. 14/206,682, filed Mar. 12, 2015, inventor: Gang Wang.
Amendment dated Jul. 11, 2016 in U.S. Appl. No. 14/206,682, filed Mar. 12, 2015, inventor: Gang Wang.
Office Action dated Sep. 16, 2016 in U.S. Appl. No. 14/206,682, filed Mar. 12, 2015, inventor: Gang Wang.
Amendment dated Jan. 13, 2017 in U.S. Appl. No. 14/206,682, filed Mar. 12, 2015, inventor: Gang Wang.
Office Action dated Dec. 31, 2015 in U.S. Appl. No. 14/206,834, filed Mar. 12, 2015, inventor: Gang Wang.
Amendment dated May 31, 2016 in U.S. Appl. No. 14/206,834, filed Mar. 12, 2015, inventor: Gang Wang.
Office Action dated Sep. 6, 2016 in U.S. Appl. No. 14/206,834, filed Mar. 12, 2015, inventor: Gang Wang.
Amendment dated Jan. 6, 2017 in U.S. Appl. No. 14/206,834, filed Mar. 12, 2015, inventor: Gang Wang.
Office Action dated Apr. 30, 2015 in U.S. Appl. No. 14/207,121, filed Mar. 12, 2015, inventor: Gang Wang.
Response dated Apr. 30, 2015 in U.S. Appl. No. 14/207,121, filed Mar. 12, 2015, inventor: Gang Wang.
Office Action dated Jul. 30, 2015 in U.S. Appl. No. 14/207,121, filed Mar. 12, 2015, inventor: Gang Wang.
Response dated Nov. 30, 2015 in U.S. Appl. No. 14/207,121, filed Mar. 12, 2015, inventor: Gang Wang.
Office Action dated Apr. 29, 2016 in U.S. Appl. No. 14/207,121, filed Mar. 12, 2015, inventor: Gang Wang.
Amendment dated Aug. 29, 2016 in U.S. Appl. No. 14/207,121, filed Mar. 12, 2015, inventor: Gang Wang.
Office Action dated Dec. 14, 2016 in U.S. Appl. No. 14/462,315, filed Aug. 18, 2014, inventor: Gang Wang.
Response dated Mar. 14, 2017 in U.S. Appl. No. 14/462,315, filed Aug. 18, 2014, inventor: Gang Wang.
Office Action dated Mar. 21, 2017 in U.S. Appl. No. 14/448,481, filed Jul. 31, 2014, inventor: Gang Wang.
Office Action dated Nov. 29, 2016 in U.S. Appl. No. 14/448,886, filed Jul. 31, 2014, inventor: Gang Wang.
Amendment dated Feb. 28, 2017 in U.S. Appl. No. 14/448,886, filed Jul. 31, 2014, inventor: Gang Wang.
Office Action dated Apr. 20, 2017 in U.S. Appl. No. 14/448,886, filed Jul. 31, 2014, inventor: Gang Wang.
Final Office Action dated Jun. 6, 2017 in U.S. Appl. No. 14/462,411, (20pges).
Amendment After Final Office Action dated Jun. 6, 2017 in U.S. Appl. No. 14/448,922, (8pages).
Interview Summary dated Jun. 7, 2017 in U.S. Appl. No. 14/448,922, (2pages).
Advisory Action dated Jun. 14, 2017 in U.S. Appl. No. 14/448,922, (4pages).
Amendment After Final Office Action dated Jun. 20, 2017 in U.S. Appl. No. 14/448,922, (14pages).
Office Action dated May 26, 2017 in U.S. Appl. No. 14/553,347, (43pages).
Office Action dated Jun. 2, 2017 in U.S. Appl. No. 14/673,261, (65pages).
Office Action dated May 25, 2017 in U.S. Appl. No. 14/529,736, (42pages).
Office Action dated Jun. 6, 2017 in U.S. Appl. No. 14/462,315, (54pages).
Amendment and Response dated Jun. 2, 2017 in U.S. Appl. No. 14/448,986, (12pages).
Interview Summary dated Jun. 2, 2017 in U.S. Appl. No. 14/448,986, (3pages).
Office Action dated Jun. 7, 2017 in U.S. Appl. No. 14/555,334, (54pages).
Office Action dated Jun. 7, 2017 in U.S. Appl. No. 14/555,296, (7pages).
Response dated Jun. 7, 2017 in U.S. Appl. No. 14/555,543, (21pages).
Amendment dated Jun. 9, 2017 in U.S. Appl. No. 14/097,057, (26pages).
Office Action dated Jun. 22, 2017 in U.S. Appl. No. 14/698,746, (50pages).
Response to Restriction Requirement dated Jul. 5, 2017 in U.S. Appl. No. 14/555,902, (12pages).
PCT International Search Report for PCT/US2016/067866 Applicant: Intuit Inc., Form PCT/ISA/210 and 220, dated Jul. 26, 2017 (5pages).
PCT Written Opinion of the International Search Authority for PCT/US2016/067866, Applicant: Intuit Inc., Form PCT/ISA/237, dated Jul. 26, 2017 (4pages).
PCT International Search Report for PCT/US2016/067867 Applicant: Intuit Inc., Form PCT/ISA/210 and 220, dated Jul. 26, 2017 (5pages).
PCT Written Opinion of the International Search Authority for PCT/US2016/067867, Applicant: Intuit Inc., Form PCT/ISA/237, dated Jul. 26, 2017 (9pages).
Response to Office Action dated Jul. 17, 2017 in U.S. Appl. No. 14/462,345, (17pages).
Advisory Action dated Jul. 31, 2017 in U.S. Appl. No. 14/462,345, (3pages).
Request for Continued Examination and Response dated Aug. 14, 2017 in U.S. Appl. No. 14/462,345, (17pages).
Office Action dated Aug. 9, 2017 in U.S. Appl. No. 14/097,057, (47pages).
Interview Summary dated Sep. 6, 2017 in U.S. Appl. No. 14/553,347, (2pages).
Response dated Aug. 15, 2017 in U.S. Appl. No. 141698,733, (24pages).
Response dated Aug. 10, 2017 in U.S. Appl. No. 141448,678, (41pages).
Office Action dated Jul. 28, 2017 in U.S. Appl. No. 141555,553, (52pages).
Office Action dated Aug. 21, 2017 in U.S. Appl. No. 14/755,684, (43pages).
Response dated Jul. 5, 2017 in U.S. Appl. No. 14/555,902, (12pages).
Office Action dated Sep. 8, 2017 in U.S. Appl. No. 14/555,939, (92pages).

(56) References Cited

OTHER PUBLICATIONS

Office Action dated Jun. 28, 2017 in U.S. Appl. No. 14/207,121, (29pages).
Office Action dated Sep. 14, 2017 in U.S. Appl. No. 14/557,335, (57pages).
Response dated Aug. 7, 2017 in U.S. Appl. No. 14/462,315, (10pages).
Advisory Action dated Aug. 24, 2017 in U.S. Appl. No. 14/462,315, (3pages).
Request for Examination and Response dated Sep. 6, 2017 in U.S. Appl. No. 14/462,315, (43pages).
Office Action dated Jun. 27, 2017 in U.S. Appl. No. 14/755,859, (174pages).
Advisory Action dated Jul. 5, 2017 in U.S. Appl. No. 14/448,922, (4pages).
Request for Continued Examination and Amendment dated Aug. 21, 2017 in U.S. Appl. No. 14/448,922, (37pages).
Request for Continued Examination and Amendment dated Sep. 6, 2017 in U.S. Appl. No. 14/448,922, (36pages).
Request for Continued Examination and Amendment dated Sep. 6, 2017 in U.S. Appl. No. 14/462,411, (24pages).
Office Action dated Aug. 25, 2017 in U.S. Appl. No. 14/673,646, (65pages).
Office Action dated Jun. 27, 2017 in U.S. Appl. No. 14/675,166, (46pages).
Response dated Jun. 23, 2017 in U.S. Appl. No. 14/555,293, (7pages).
Office Action dated Jul. 10, 2017 in U.S. Appl. No. 14/555,222, (63pages).
Office Action dated Aug. 18, 2017 in U.S. Appl. No. 14/555,543, (42pages).
Office Action dated Aug. 25, 2017 in U.S. Appl. No. 14/673,555, (71pages).
Response dated Sep. 21, 2017 in U.S. Appl. No. 14/448,481, (44pages).
Office Action dated Sep. 14, 2017 in U.S. Appl. No. 14/530,159, (41pages).
Amendment and Response dated Nov. 9, 2017 in U.S. Appl. No. 14/097,057, (31pgs.).
Amendment and Response dated Oct. 26, 2017 in U.S. Appl. No. 14/553,347, (25pgs.).
Amendment and Response dated Nov. 2, 2017 in U.S. Appl. No. 14/673,261, (30pgs.).
Office Action dated Oct. 30, 2017 in U.S. Appl. No. 14/448,678, (39pgs.).
Amendment and Response dated Oct. 30, 2017 in U.S. Appl. No. 14/555,553, (17pgs.).
Notice of Allowance dated Nov. 3, 2017 in U.S. Appl. No. 14/529,736, (13pgs.).
Interview Summary dated Sep. 28, 2017 in U.S. Appl. No. 14/529,736, (3pgs.).
Office Action dated Sep. 14, 2017 in U.S. Appl. No. 14/530,159, (41pgs.).
Amendment and Response dated Nov. 21, 2017 in U.S. Appl. No. 14/755,684, (23pgs.).
Office Action dated Nov. 15, 2017 in U.S. Appl. No. 14/206,834, (100pgs.).
Office Action dated Sep. 8, 2017 in U.S. Appl. No. 14/555,939, (92pgs.).
Amendment and Response dated Sep. 28, 2017 in U.S. Appl. No. 14/207,121, (38pgs.).
Office Action dated Sep. 14, 2017 in U.S. Appl. No. 141557,335, (57pgs.).
Amendment and Response dated Aug. 7, 2017 in U.S. Appl. No. 14/462,315, (10pgs.).
Advisory Action dated Aug. 24, 2017 in U.S. Appl. No. 14/462,315, (3pgs.).
Amendment and Response and Request for Continued Examination dated Sep. 6, 2017 in U.S. Appl. No. 14/462,315, (43pgs.).
Amendment and Response dated Sep. 21, 2017 in U.S. Appl. No. 14/448,481, (44pgs.).
Office Action dated Jun. 22, 2017 in U.S. Appl. No. 14/698,746, (50pgs.).
Amendment and Response dated Sep. 22, 2017 in U.S. Appl. No. 14/698,746, (26pgs.).
Office Action dated Oct. 13, 2017 in U.S. Appl. No. 141462,397, (72pgs.).
Office Action dated Nov. 30, 2017 in U.S. Appl. No. 14/462,373, (72pgs.).
Office Action dated Jun. 27, 2017 in U.S. Appl. No. 14/755,859, (174pgs.).
Amendment and Response dated Nov. 27, 2017 in U.S. No. 14/755,859, (53pgs.).
Amendment and Response dated Jun. 20, 2017 in U.S. Appl. No. 14/448,886, (14pgs.).
Advisory Action dated Jul. 5, 2017 in U.S. Appl. No. 14/448,886, (4pgs.).
Amendment and Response dated Aug. 21, 2017 in U.S. Appl. No. 14/448,886, (37pgs.).
Office Action dated Nov. 28, 2017 in U.S. Appl. No. 14/448,886, (65pgs.).
Amendment and Response and Request for Continued Examination dated Sep. 6, 2017 in U.S. Appl. No. 141448,922, (36pgs.).
Office Action dated Nov. 28, 2017 in U.S. Appl. No. 141448,922, (65pgs.).
Office Action dated Oct. 10, 2017 in U.S. Appl. No. 14/448,962, (27pgs.).
Office Action dated Oct. 16, 2017 in U.S. Appl. No. 14/448,986, (30pgs.).
OpenRules, Preparing a Tax Return Using OpenRules Dialog, Aug. 2011 (Year: 2011) (25pgs.).
Amendment and Response and Request for Continued Examination dated Sep. 6, 2017 in U.S. Appl. No. 14/462,411, (24pgs.).
Amendment and Response dated Nov. 7, 2017 in U.S. Appl. No. 14/555,334, (26pgs.).
Advisory Action dated Nov. 22, 2017 in U.S. Appl. No. 14/555,334, (2pgs.).
Office Action dated Oct. 11, 2017 in U.S. Appl. No. 14/701,030, (53pgs.).
Office Action dated Aug. 25, 2017 in U.S. Appl. No. 14/673,646, (65pgs.).
Office Action dated Jul. 10, 2017 in U.S. Appl. No. 14/555,222, (63pgs.).
Amendment and Response dated Nov. 10, 2017 in U.S. Appl. No. 14/555,222, (25pgs.).
Office Action dated Nov. 3, 2017 in U.S. Appl. No. 14/701,087, (103pgs.).
Office Action dated Jun. 27, 2017 in U.S. Appl. No. 14/675,166, (46pgs.).
Amendment and Response dated Oct. 27, 2017 in U.S. Appl. No. 14/675,166, (25pgs.).
Response dated Jun. 23, 2017 in U.S. Appl. No. 14/555,296, (7pgs.).
Office Action dated Oct. 20, 2017 in U.S. Appl. No. 141555,296, (50pgs.).
Office Action dated Aug. 18, 2017 in U.S. Appl. No. 14/555,543, (42pgs.).
Interview Summary dated Oct. 25, 2017 in U.S. Appl. No. 14/555,543, (3pgs.).
Office Action dated Sep. 25, 2017 in U.S. Appl. No. 14/700,981, (52pgs.).
Office Action dated Aug. 25, 2017 in U.S. Appl. No. 14/673,555, (65pgs.).
Office Action dated Sep. 28, 2017 in U.S. Appl. No. 14/701,149, (71pgs.).
Vanderbilt University, "Free tax prep help available for Vanderbilt employees", Feb. 6, 2014, Vanderbilt University, p. 1-3 [NPL-1].
Office Action dated Dec. 28, 2017 in U.S. Appl. No. 14/097,057, filed Dec. 4, 2013, (10pages).
Office Action dated Jan. 12, 2018 in U.S. Appl. No. 14/462,345, filed Aug. 18, 2014, (9pages).
Office Action dated Jan. 30, 2018 in U.S. Appl. No. 14/553,347, filed Nov. 25, 2014, (40pages).

(56) References Cited

OTHER PUBLICATIONS

Office Action dated Dec. 12, 2017 in U.S. Appl. No. 14/698,733, filed Apr. 28, 2015, (90pages).
Response dated Feb. 12, 2018 in U.S. Appl. No. 14/698,733, filed Apr. 28, 2015, (36pages).
Advisory Action dated Feb. 16, 2018 in U.S. Appl. No. 14/698,733, filed Apr. 28, 2015, (3pages).
Response dated Jan. 3, 2018 in U.S. Appl. No. 14/448,678, filed Jul. 31, 2014, (37pages).
Advisory Action dated Feb. 5, 2018 in U.S. Appl. No. 14/448,678, filed Jul. 31, 2014, (7pages).
Office Action dated Feb. 12, 2018 in U.S. Appl. No. 14/555,553, filed Nov. 26, 2014, (40pages).
Notice of Allowability dated Dec. 22, 2017 in U.S. Appl. No. 14/529,736, filed Oct. 31, 2014, (13pages).
Office Action dated Dec. 28, 2017 in U.S. Appl. No. 14/529,798, filed Oct. 31, 2014, (61pages).
Response dated Jan. 16, 2018 in U.S. Appl. No. 14/530,159, filed Oct. 31, 2014, (13pages).
Interview Summary dated Feb. 5, 2018 in U.S. Appl. No. 14/530,159, filed Oct. 31, 2014, (3pages).
Office Action dated Jan. 12, 2018 in U.S. Appl. No. 14/755,684, filed Jun. 30, 2015, (31pages).
PCT International Preliminary Report on Patentability (Chapter I of the Patent Cooperation Treaty) for PCT/US2016/039919, Applicant: Intuit Inc., Form PCT/IB/326 and 373, dated Jan. 11, 2018, (11pages).
Response dated Feb. 15, 2018 in U.S. Appl. No. 14/206,834, filed Mar. 12, 2014, (36pages).
Interview Summary dated Feb. 15, 2018 in U.S. Appl. No. 14/206,834, filed Mar. 12, 2014, (3pages).
Response dated Jan. 5, 2018 in U.S. Appl. No. 14/555,902, filed Nov. 28, 2014, (14pages).
Response dated Dec. 8, 2017 in U.S. Appl. No. 14/555,939, filed Nov. 28, 2014, (52pages).
Office Action dated Jan. 18, 2018 in U.S. Appl. No. 14/207,121, filed Mar. 12, 2014, (22pages).
Response dated Jan. 31, 2018 in U.S. Appl. No. 14/557,335, filed Dec. 1, 2014, (26pages).
Office Action dated Feb. 9, 2018 in U.S. Appl. No. 14/462,315, filed Aug. 18, 2014, (38pages).
Notice of Allowance and Fee(s) Due dated Jan. 25, 2018 in U.S. Appl. No. 14/448,481, filed Jul. 31, 2014, (62pages).
Interview Summary dated Feb. 9, 2018 in U.S. Appl. No. 14/448,481, filed Jul. 31, 2014, (8pages).
Response dated Dec. 22, 2017 in U.S. Appl. No. 14/698,746, filed Apr. 28, 2015, (15pages).
Office Action dated Jan. 26, 2018 in U.S. Appl. No. 14/461,982, filed Aug. 18, 2014, (94pages).
Interview Summary dated Dec. 15, 2017 in U.S. Appl. No. 14/755,859, filed Jun. 30, 2015, (4pages).
PCT International Preliminary Report on Patentability (Chapter I of the Patent Cooperation Treaty) for PCT/US2016/039918, Applicant: Intuit Inc., Form PCT/IB/326 and 373, dated Jan. 11, 2018, (11pages).
Response dated Jan. 10, 2018 in U.S. Appl. No. 14/448,962, filed Jul. 31, 2014, (27pages).
Interview Summary dated Feb. 20, 2018 in U.S. Appl. No. 14/448,962, filed Jul. 31, 2014, (3pages).
Response dated Feb. 16, 2018 in U.S. Appl. No. 14/448,986, filed Jul. 31, 2014, (16pages).
Office Action dated Feb. 8, 2018 in U.S. Appl. No. 14/462,411, filed Aug. 18, 2014, (76pages).
Office Action dated Feb. 5, 2018 in U.S. Appl. No. 14/555,334, filed Nov. 26, 2014, (52pages).
Response dated Jan. 11, 2018 in U.S. Appl. No. 14/701,030, filed Apr. 30, 2015, (35pages).
Response dated Dec. 22, 2017 in U.S. Appl. No. 14/673,646, filed Mar. 30, 2015, (22pages).
Interview Summary dated Dec. 28, 2017 in U.S. Appl. No. 14/673,646, filed Mar. 30, 2015, (3pages).
Response dated Feb. 13, 2018 in U.S. Appl. No. 14/462,397, filed Aug. 18, 2014, (33pages).
Cronin, Julie-Anne et al., Distributing the Corporate Income Tax: Revised U.S. Treasury Methodology, May 2012, Department of Treasury, web, 2-31 (Year:2012) (34pages).
Notice of Allowance and Fee(s) Due dated Feb. 20, 2018 in U.S. Appl. No. 14/675,166, filed Mar. 31, 2015, (52pages).
Interview Summary dated Dec. 21, 2017 in U.S. Appl. No. 14/555,222, filed Nov. 26, 2014, (2pages).
Office Action dated Feb. 5, 2018 in U.S. Appl. No. 14/555,222, filed Nov. 26, 2014, (4pages).
Response dated Dec. 18, 2017 in U.S. Appl. No. 14/555,543, filed Nov. 26, 2014, (20pages).
Advisory Action dated Jan. 17, 2018 in U.S. Appl. No. 14/555,543, filed Nov. 26, 2014, (3pages).
Response dated Jan. 18, 2018 in U.S. Appl. No. 14/555,543, filed Nov. 26, 2014 (20pages).
Office Action dated Feb. 14, 2018 in U.S. Appl. No. 14/555,543, filed Nov. 26, 2014, (18pages).
Response dated Jan. 25, 2018 in U.S. Appl. No. 141700,981, filed Apr. 30, 2015, (30pages).
Response dated Dec. 26, 2017 in U.S. Appl. No. 14/673,555, filed Mar. 30, 2015, (22pages).
Interview Summary dated Jan. 19, 2018 in U.S. Appl. No. 14/673,555, filed Mar. 30, 2015, (3pages).
Response dated Dec. 28, 2017 in U.S. Appl. No. 14/701,149, filed Apr. 30, 2015, (46pages).
PCT International Preliminary Report on Patentability (Chapter I of the Patent Cooperation Treaty) for PCT/US2016/039917, Applicant: Intuit, Inc., Form PCT/IB/326 and 373, dated Feb. 8, 2018 (13pages).
PCT International Search Report for PCT/US2017/062777, Applicant: Intuit Inc., Form PCT/ISA/210 and 220, dated Feb. 21, 2018 (5pages).
PCT Written Opinion of the International Search Authority for PCT/US2017/062777, Applicant: The Regents of the University of California, Form PCT/ISA/237, dated Feb. 21, 2018 (8pages).
Office Action dated Feb. 22, 2018 in U.S. Appl. No. 14/673,261, filed Mar. 30, 2015, (46pages).
Wikipedia, https://en.wikipedia.org/wiki/Data_structure, "Data Structures", Jan. 12, 2012, entire page (Year:2012) (1page).
Wikipedia, https://en.wikipedia.org/wiki/Tree_(data_structure), "Tree (data structure)", May 15, 2005, entire page (Year:2005) (1page).
Response to Rule 161 Communication dated Jan. 5, 2018 in European Patent Application No. 16843282.1, (16pages).
Communication pursuant to Rules 161(2) and 162 EPC dated Jul. 26, 2017 in European Patent Application No. 16843282.1, (2pages).
Office Action dated Nov. 17, 2016 in U.S. Appl. No. 14/448,922, filed Jul. 31, 2014, inventor: Gang Wang.
Amendment dated Feb. 17, 2016 in U.S. Appl. No. 14/448,922, filed Jul. 31, 2014, inventor: Gang Wang.
Office Action dated Apr. 6, 2017 in U.S. Appl. No. 14/448,922, filed Jul. 31, 2014, inventor: Gang Wang.
Office Action dated Aug. 11, 2016 in U.S. Appl. No. 14/448,962, filed Jul. 31, 2014, inventor: Gang Wang.
Amendment dated Nov. 11, 2016 in U.S. Appl. No. 14/448,962, filed Jul. 31, 2014, inventor: Gang Wang.
Office Action dated Jan. 13, 2017 in U.S. Appl. No. 14/448,962, filed Jul. 31, 2014, inventor: Gang Wang.
Office Action dated Aug. 23, 2016 in U.S. Appl. No. 14/448,986, filed Jul. 31, 2014, inventor: Gang Wang.
Response dated Jan. 23, 2017 in U.S. Appl. No. 14/448,986, filed Jul. 31, 2014, inventor: Gang Wang.
Office Action dated Feb. 17, 2017 in U.S. Appl. No. 14/448,986, filed Jul. 31, 2014, inventor: Gang Wang.
Office Action dated Jan. 12, 2017 in U.S. Appl. No. 14/462,411, filed Aug. 18, 2014, inventor: Gang Wang.
Office Action dated Feb. 7, 2017 in U.S. Appl. No. 14/555,543, filed Nov. 26, 2014, inventor: Gang Wang.
PCT International Search Report for PCT/US2016/039919, Applicant: Intuit Inc., Form PCT/ISA/210 and 220, dated Oct. 11, 2016.

(56) References Cited

OTHER PUBLICATIONS

PCT Written Opinion of the International Search Authority for PCT/US2016/039919, Applicant: Intuit Inc., Form PCT/ISA/237, dated Oct. 11, 2016.
PCT International Search Report for PCT/US2016/039917, Applicant: Intuit Inc., Form PCT/ISA/210 and 220, dated Oct. 11, 2016.
PCT Written Opinion of the International Search Authority for PCT/US2016/039917, Applicant: Intuit Inc., Form PCT/ISA/237, dated Oct. 11, 2016.
PCT International Search Report for PCT/US2016/039918, Applicant: Intuit Inc., Form PCT/ISA/210 and 220, dated Oct. 11, 2016.
PCT Written Opinion of the International Search Authority for PCT/US2016/039918, Applicant: Intuit Inc., Form PCT/ISA/237, dated Oct. 11, 2016.
PCT International Search Report for PCT/US2016/039913, Applicant: Intuit Inc., Form PCT/ISA/210 and 220, dated Oct. 21, 2016.
PCT Written Opinion of the International Search Authority for PCT/US2016/039913, Applicant: Intuit Inc., Form PCT/ISA/237, dated Oct. 21, 2016.
PCT International Search Report for PCT/US2016/039916, Applicant: Intuit Inc., Form PCT/ISA/210 and 220, dated Oct. 11, 2016.
PCT Written Opinion of the International Search Authority for PCT/US2016/039916, Applicant: Intuit Inc., Form PCT/ISA/237, dated Oct. 11, 2016.
web.archive.org/web/20100919125845/http://cpaclass.conn/tax-accounting/tax-law/internal-revenue-code/26-usc-section/196.htnn, CPA class, U.S. Tax Laws Internal Revenue Code, Sep. 19, 2010 (Year: 2010).
http://en.wikipedia.org/wiki/Artificial_neural_network, printed Oct. 27, 2014 (22 pages).
http://en.wikipedia.org/wiki/Generalized_linear_model, printed Oct. 27, 2014 (13 pages).
http://en.wikipedia.org/wiki/Gradient_boosting, printed Oct. 27, 2014 (8 pages).
http://en.wikipedia.org/wiki/K-d_tree, printed Oct. 27, 2014 (10 pages).
http://en.wikipedia.org/wiki/K-nearest_neighbors_algorithm, printed Oct. 27, 2014 (10 pages).
http://en.wikipedia.org/wiki/Logistic_regression, printed Oct. 27, 2014 (28 pages).
http://en.wikipedia.org/wiki/Naive_Bayes_classifier, printed Oct. 27, 2014 (14 pages).
http://en.wikipedia.org/wiki/Predictive_analytics, printed Oct. 27, 2014 (18 pages).
http://en.wikipedia.org/wiki/Predictive_modelling, printed Oct. 27, 2014 (8 pages).
http://en.wikipedia.org/wiki/Random_forest, printed Oct. 27, 2014 (7 pages).
http://en.wikipedia.org/wiki/Support_vector_machine, printed Oct. 27, 2014 (16 pages).
http://www.gartner.com/it-glossary/predictive-modeling, printed Oct. 27, 2014 (1 page).
http://www.ibm.com/developerworks/library/ba-predictive-analytics2/, printed Oct. 27, 2014 (8 pages).
PCT International Search Report for PCT/US2014/056516 dated Jun. 18, 2015 (5pages).
PCT Written Opinion of the International Search Authority for PCT/US2014/056516 dated Jun. 18, 2015 (9pages).
Australian Office Action dated Nov. 8, 2018 issued in Australian Application No. 20144058856.
Canadian Office Action dated Nov. 22, 2018 issued in Canadian Application No. 2,960,788.

"Modular Programming," Wikipedia, the free encyclopedia, Jul. 29, 2014, http://en.wikipedia.org/w/index.php?title=Modular_programming&oldid=618953117, retrieved from the Internet on Mar. 31, 2015, 4 pages.
Anders, B. Susan; "Website of the Month: MSN Money Tax Center," Apr. 2013, The CPA Journal, pp. 72-73.
Forsati, R.; "Web Page Personalization Based on Weighted Association Rules," 2009 International Conference on Electronic Computer Technology, pp. 130-135.
http://en.wikipedia.org/wiki/Declarative_programming, printed Oct. 27, 2014 (4 pages).
http://en.wikipedia.org/wiki/Imperative_programming, printed Oct. 27, 2014 (4 pages).
http://vwvw.forbes.com/sites/danwoods/2013/04/171why-adopting-the-declarative-programming-practices-will-improve-your-return-from-technology/, printed Oct. 27, 2014 (8 pages).
Publication 559: Final Income Tax Return for Decedent—Form 1040, p. 2, paragraph 2; https://taxmap.ntis.gov/taxmap/pub/p559-001.htm; retrieved from the Internet Jul. 11, 2017.
Zhang, Zhenya, et al.; "Enabling Personalization Recommendation with WeightedFP for Text Information Retrieval Based on User-Focus," Proceedings of the International Conference on Information Technology: Coding and Computing (ITCC'04), 5 pp.
"QuickBooks® Assessing the Health of the Data File and Troubleshooting", The Sleeter Group, Aug. 2005 (71 pages).
U.S. Appl. No. 14/698,683, filed Apr. 28, 2015.
U.S. Appl. No. 14/530,305, filed Oct. 31, 2014.
U.S. Appl. No. 14/530,369, filed Oct. 31, 2014.
U.S. Appl. No. 14/607,935, filed Jan. 28, 2015.
U.S. Appl. No. 12/475,767, filed Jun. 1, 2009.
U.S. Appl. No. 11/413,308, filed Apr. 28, 2006.
U.S. Appl. No. 14/674,582, filed Mar. 31, 2015.
U.S. Appl. No. 15/164,777, filed May 25, 2016.
U.S. Appl. No. 14/925,633, filed Oct. 28, 2015.
U.S. Appl. No. 16/295,417, filed Mar. 7, 2019.
U.S. Appl. No. 16/524,825, filed Jul. 29, 2019.
U.S. Appl. No. 14/484,119, filed Sep. 11, 2014.
U.S. Appl. No. 14/871,366, filed Sep. 30, 2015 (Nov. 6, 2020 to Feb. 6, 2020).
U.S. Appl. No. 14/925,633, filed Oct. 28, 2015 (Nov. 6, 2020 to Feb. 6, 2020).
U.S. Appl. No. 15/363,683, filed Apr. 28, 2015 (Mar. 3, 2020 to present).
U.S. Appl. No. 14/925,633, filed Oct. 28, 2015 (Mar. 3, 2020 to present).
U.S. Appl. No. 14/484,119, filed Sep. 11, 2014 (Mar. 3, 2020 to present).
U.S. Appl. No. 14/871,366, filed Sep. 30, 2015 (Jun. 3, 2020 to present).
Caplan, Robert M., "IRS Announces Release Data for 1040 Modernized E-File Program", Dec. 31, 2017, 2 pages.
U.S. Appl. No. 16/295,417, filed Mar. 7, 2019 (Sep. 2, 2020 to present).
U.S. Appl. No. 14/484,119, filed Sep. 11, 2014 (Sep. 2, 2020 to present).
U.S. Appl. No. 11/413,308, filed Apr. 28, 2006, Issued.
U.S. Appl. No. 12/475,767, filed Jun. 1, 2009, Abandoned.
U.S. Appl. No. 14/530,305, filed Oct. 31, 2014, Issued.
U.S. Appl. No. 14/530,369, filed Oct. 31, 2014, Issued.
U.S. Appl. No. 14/607,935, filed Jan. 28, 2015, Abandoned.
U.S. Appl. No. 14/484,119, filed Sep. 11, 2014, Pending.
U.S. Appl. No. 14/698,683, filed Apr. 28, 2015, Pending.
U.S. Appl. No. 14/674,582, filed Mar. 31, 2015, Abandoned.
U.S. Appl. No. 15/164,777, filed May 25, 2016, Issued.
U.S. Appl. No. 14/871,366, filed Sep. 30, 2015, Pending.
U.S. Appl. No. 16/295,417, filed Mar. 7, 2019, Pending.
U.S. Appl. No. 14/925,633, filed Oct. 28, 2015, Pending.
U.S. Appl. No. 16/524,825, filed Jul. 29, 2019, Pending.
U.S. Appl. No. 14/871,366, filed Sep. 30, 2015.

* cited by examiner

| | $Q_A$ | $Q_B$ | $Q_C$ | $Q_D$ | $Q_E$ | $Q_F$ | $Q_G$ | STAT1 | STAT2 |
|---|---|---|---|---|---|---|---|---|---|
| Rule₁ | Y | ? | ? | ? | N | ? | ? | 40% | 10% |
| Rule₂ | N | Y | Y | ? | ? | ? | N | 20% | 5% |
| Rule₃ | N | Y | N | Y | ? | N | ? | 14% | 6% |
| Rule₄ | Y | ? | ? | ? | N | Y | N | 65% | 20% |
| Rule₅ | N | Y | N | ? | ? | ? | Y | 18% | 40% |
| Rule₆ | Y | Y | N | ? | ? | N | ? | 5% | 25% |

FIG. 10

METHODS, SYSTEMS AND COMPUTER PROGRAM PRODUCTS FOR COLLECTING TAX DATA

This application includes subject matter similar to the subject matter described in the following co-owned applications: (1) Ser. No. 14/484,119, filed Sep. 11, 2014, entitled "METHODS SYSTEMS AND ARTICLES OF MANUFACTURE FOR USING A PREDICTIVE MODEL TO DETERMINE TAX TOPICS WHICH ARE RELEVANT TO A TAXPAYER IN PREPARING AN ELECTRONIC TAX"; (2) Ser. No. 14/810,116, filed Jul. 27, 2015, now issued as U.S. Pat. No. 10,789,654 and entitled "WEB BROWSING SYSTEMS FOR ACQUIRING TAX DATA DURING ELECTRONIC TAX RETURN PREPARATION"; (3) Ser. No. 14/871,366, filed Sep. 30, 2015, entitled "SYSTEMS FOR ACQUIRING TAX DATA"; (4) Ser. No. 14/925,633, now issued as U.S. Pat. No. 10,740,854 and filed Oct. 28, 2015, entitled "WEB BROWSING AND MACHINE LEARNING SYSTEMS FOR ACQUIRING TAX DATA DURING ELECTRONIC TAX RETURN PREPARATION"; and (5) Ser. No. 15/164,777, now issued as U.S. Pat. No. 10,410,295 and filed May 25, 2016 entitled "METHODS, SYSTEMS AND COMPUTER PROGRAM PRODUCTS FOR OBTAINING TAX DATA." The contents of the above-mentioned applications are fully incorporated herein by reference as though set forth in full.

SUMMARY

Embodiments are directed to systems, computer-implemented methods, and computer program products for collecting tax data for electronic tax return preparation systems.

In one embodiment, a computer-implemented method for collecting tax data for an electronic tax return preparation program includes a tax logic agent reading a user data profile for a user to identify an identifier of a missing datum. The user data profile is indexed to a user ID for the user. The method also includes a match system identifying a data source corresponding to the identifier of the missing datum. The method further includes the match system generating a partition for the user data profile. The partition at least partially corresponding to the identifier of the missing datum and the corresponding data source. Moreover, the method includes a dispatch system generating a target queue for the data source using the partition. The target queue includes the identifier of the missing datum. In addition, the method includes a data collector querying the data source based on the target queue to collect data corresponding to the identifier of the missing datum. The method also includes an importer generating a modified user data profile using the collected data.

In another embodiment, a computer-implemented method for collecting tax data for an electronic tax return preparation program includes a tax logic agent reading a plurality of user data profiles for a respective plurality of users to generate respective sets of identifiers of missing data. The plurality of user data profiles are indexed to respective user IDs for the respective users. The method also includes a match system identifying a plurality of data sources corresponding to the sets of identifiers of missing data. The method further includes the match system generating respective partitions for the plurality of user data profiles. The respective partitions collectively correspond to the sets of identifiers of missing data and one or more of the plurality of data sources. Moreover, the method includes a dispatch system generating respective target queues for the plurality of data sources using the respective partitions. The target queues collectively include the sets of identifiers of missing data. The method also includes a data collector querying the plurality of data sources based on the target queues to collect data corresponding to the sets identifiers of missing data. The method further includes an aggregator generating user specific data sets corresponding to each of the plurality of users from respective collected data, each user specific data set associated with a respective user ID. Moreover, the method includes and an importer generating modified user data profiles for each of the plurality of users using respective user specific data sets.

In still another embodiment, a system for collecting tax data for an electronic tax return preparation program, the system including a computing device executing a tax logic agent, a match system, a dispatch system, a data collector, and an importer. The tax logic agent reads a plurality of user data profiles for a respective plurality of users to generate respective sets of identifiers of missing data. The plurality of user data profiles are indexed to respective user IDs for the respective users. The match system identifies a plurality of data sources corresponding to the sets of identifiers of missing data, and generates respective partitions for the plurality of user data profiles. The respective partitions collectively correspond to the sets of identifiers of missing data and one or more of the plurality of data sources. The dispatch system generates respective target queues for the plurality of data sources using the respective partitions. The target queues collectively include the sets of identifiers of missing data. The data collector queries the plurality of data sources based on the target queues to collect data corresponding to the sets identifiers of missing data. The aggregator generates user specific data sets corresponding to each of the plurality of users from respective collected data, each user specific data set associated with a respective user ID. The importer generates modified user data profiles for each of the plurality of users using respective user specific data sets.

In one or more embodiments, reading the plurality of user data profiles includes the tax logic agent analyzing the plurality of user data profiles in view of completeness graphs and/or decision tables. Identifying the plurality of data sources may include the match algorithm analyzing source metadata for the plurality of data sources. The source metadata may identify the data available from each of the plurality of data sources.

In one or more embodiments, the respective partitions for the plurality of user data profiles includes respective lists of paired missing data and corresponding data sources corresponding to each user data profile of the plurality of user data profiles. The respective target queues for the plurality of data sources may include respective lists of paired user IDs and identifiers of missing data corresponding to each data source of the plurality of data sources. The respective target queues may include source metadata corresponding to at least one of the plurality of data sources, where the source metadata is required to access the at least one of the plurality of data sources. The at least one of the plurality of data sources is a Facebook account of a user, and the source metadata is a Facebook ID of the user.

In one or more embodiments, querying the plurality of data sources includes the data collector sending an API call to a data source of the plurality of data sources and/or sending a query to an internal database in the plurality of data sources. Querying the plurality of data sources may include the data collector requesting more than one piece of missing data from a data source in a single data call.

Generating user specific data sets corresponding to each of the plurality of users may include forming a union set of at least some of the collected data, the union set corresponding to one of the plurality of users.

In one or more embodiments, the collected data includes respective scores indicating respective accuracy of the corresponding collected data. Generating user specific data sets may include comparing first and second scores corresponding to respective first and second collected datum.

BRIEF DESCRIPTION OF THE DRAWINGS

The foregoing and other aspects of embodiments are described in further detail with reference to the accompanying drawings, in which the same elements in different figures are referred to by common reference numerals, wherein:

FIG. 10 illustrates another embodiment of a decision table that incorporates statistical data.

Figure 1:
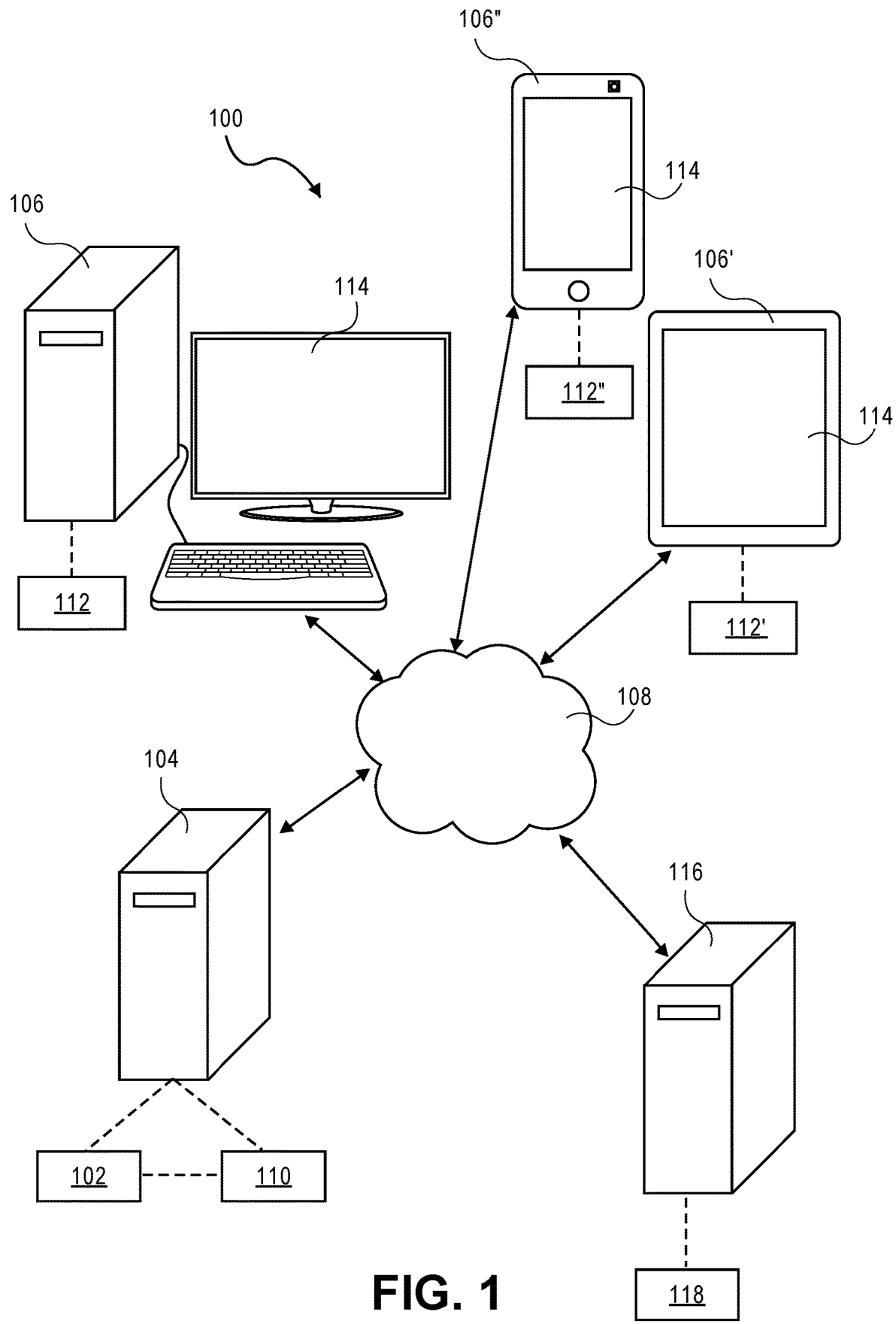
FIGS. 1 to 3 are schematic diagrams illustrating the implementation of tax data acquisition systems on computing devices according to two embodiments.

In order to better appreciate how to obtain the above-recited and other advantages and objects of various embodiments, a more detailed description of embodiments is provided with reference to the accompanying drawings. It should be noted that the drawings are not drawn to scale and that elements of similar structures or functions are represented by like reference numerals throughout. It will be understood that these drawings depict only certain illustrated embodiments and are not therefore to be considered limiting of scope of embodiments.

DETAILED DESCRIPTION OF ILLUSTRATED EMBODIMENTS

During preparation of tax returns, tax data must be acquired to complete the tax return. While tax data can be entered manually by a user/preparer, many electronic tax return preparation systems can acquire some tax data automatically (without human intervention after authorization) or semi-automatically (with minimal human intervention—e.g., provision of financial account authentication information) from third party websites hosted on third party computers through a network, such as the Internet.

Tax return preparation can be performed by the taxpayer, a tax professional, or other preparer using an electronic tax return preparation program. Regardless of who prepares the tax return, a manual tax return preparation system requires the preparer to answer a standard list of questions that are presented in a standard order in an interview/questionnaire format. This can be tedious for the preparer, and result in data entry errors that may have serious financial consequences. The manual tax return preparation process also requires a lengthy time commitment that may be a barrier to tax preparation. While some systems allow for preparers to save returns and resume preparation at a later time, these interruptions can lead to errors related to restarting the process or unfinished tax returns.

Tax data is typically found on paper or electronic documents, which may not be immediately available to the user. Therefore, manually acquiring tax data for tax return preparation may include searching for paper documents, or accessing electronic documents or information from a third party website ("tax data websites"; e.g., payroll processor websites for W-2 information, banking account websites for 1099-INT information, brokerage account websites for 1099-DIV information, etc.) hosted on a third party computer. Consequently, the manual tax return preparation process is often paused or halted one or more times for the user to acquire tax data needed to complete the tax return. These disruptions in the tax return preparation process are opportunities for the user to walk away from the process, which can also lead to errors related to restarting the process or unfinished tax returns.

While preparing a tax returning using an online electronic tax return preparation system, tax data from third party websites can be entered manually by the user, automatically, and/or semi-automatically. Manual data entry typically involves opening a new browser in a new window or a new tab. Tax data obtained from the new browser (e.g., data or electronic documents) must then be manually entered or uploaded into the online electronic tax return preparation system. While this manual process can successfully acquire tax data, it introduces further opportunities for user error, and it can frustrate users who must switch between software experiences.

Alternative to manual tax data entry include automatic and semi-automatic tax data acquisition. Traditionally, acquiring tax data from third party websites through networks has been automated (including automatic and semi-automatic tax data acquisition) using one of two solutions: Application Programming Interface ("API") connection to a third party computer through a network; and screen scraping of third party webpages accessed through a network.

Embodiments describe methods, systems and articles of manufacture for collecting tax data for an electronic tax return preparation system. In particular, some embodiments describe a computing device executing a tax data acquisition system, which operates on a user data profile and a data source to collect tax data for an electronic tax return preparation system. The tax data acquisition system reads the user data profile to identify an identifier of a missing datum. Then, the tax data acquisition system identifies a data source corresponding to the identifier of the missing datum. Next, the tax data acquisition system generates a partition for the user data profiles that at least partially corresponds to the identifier of the missing datum and the data source. Then, the tax data acquisition system generates a target queue for the data source, which includes the identifier of the missing datum, at least partially based on the partition. Next, the tax data acquisition system queries the data sources based on the target queue to collect data corresponding to the identifier of the missing datum. Then, the tax data acquisition system generates a modified user profile using the collected data.

Some current electronic tax return preparation systems automatically obtain data on a user/taxpayer's behalf to improve the electronic tax return preparation experience for the user. The user experience may be improved by saving user time during tax data entry, increasing accuracy of tax data (and therefore accuracy of tax return) by reducing human error, and reducing overall time required to complete an electronic tax return. The number of tax data sources that electronic tax return preparation systems can access automatically is constantly increasing, thereby increasing both the potential improvements to the user experience and the complexity of achieving those user experience improvements.

In order to maximize the user experience improvement from the increasing number of tax data sources while minimizing use of system resources, the diversity of individual taxpayer needs can be taken into account when obtaining data from tax data sources. Tax data for users/taxpayers already stored in electronic tax return preparation systems vary greatly. Accordingly, it is inefficient to search through a large number of potential data sources using a data discovery process that is uniformed about the diversity of individual taxpayer needs.

The embodiments described herein include a "guided" data collection system that determines the tax data needed for a given user, and uses this information to "guide" or "target" data collection from a large number of available data sources. Guided data collection closes the loop between the large and increasing number of data sources and the tax data needed for any given user, using a guided tax data collection system.

In one embodiment, a guided tax data collection system uses a tax knowledge engine to identify tax data needed to complete a tax return for a given user. Such a guided tax data collection system can provide at least the following benefits. First, personalized guided tax data collection based on tax data available to electronic tax return preparation systems. Second, a more efficient tax data collection system in terms of system performance and system resources required, especially as the number of data sources increases and as the number of users increases. Third, a systematic solution to address data identification across the different components of the tax data collection system.

For example, when collecting tax data for a plurality of taxpayers from a plurality of data sources, scanning through each of the plurality of data sources to collect tax data for each of the plurality of taxpayers can result in many separate data calls and/or the collection of unnecessary data collection, which wastes computation/storage/communication resources and/or slows the electronic tax return preparation process.

In particular, the increasing number of data sources includes social media sources, such as LinkedIn and Facebook, and government sources, such as the DMV and IRS records. An electronic tax return preparation may need the social security numbers ("SSN") of some users/taxpayers to complete their respective electronic tax returns. The electronic tax return preparation system may attempt to automatically obtain the missing SSNs from various available data sources. LinkedIn and Facebook are not particularly good (i.e., reliable) sources for SSNs, but the IRS is a good (i.e., reliable) source for SSNs. Alternatively or additionally, an electronic tax return preparation may need the age of some users/taxpayers to complete their respective electronic tax returns. The electronic tax return preparation system may attempt to automatically obtain the missing ages from various available data sources. Some sources (e.g., electronic banking records) are not particularly good (i.e., reliable) sources for age, but the LinkedIn and Facebook are good (i.e., reliable) sources for age.

The embodiments described herein will attempt to acquire missing tax data from more reliable sources. For instance, the embodiments described herein will attempt to acquire missing SSNs from the IRS, and not LinkedIn or Facebook. Similarly, the embodiments described herein will attempt to acquire missing taxpayer ages from the LinkedIn or Facebook. And not electronic banking records. In addition, the embodiments described herein may attempt to acquire a plurality of tax data from one category (e.g., SSNs) for a plurality of users/taxpayers who are missing tax data from the one category with a single data call to a single data source (e.g., the IRS). Both of these features will increase the efficiency of tax data acquisition and electronic tax return preparation in general.

As used in this application, a "directed graph" includes, but is not limited to a data structure including a plurality of functional vertices or nodes connected by one of a plurality of edges, arcs or lines, where each edge, arc or line has a direction. Each node may represent a data store, function, decision point, table, etc. Each edge, arc or line may represent a functional relationship between the connected pair of nodes. As used in this application, a "completeness graph" or "completion graph" includes, but is not limited to, a directed graph where each node is related to tax data required to make a determination related to a tax topic. The determination may be a state of completeness for the tax topic. As used in this application, "satisfying a completeness graph" includes, but is not limited to, providing tax data related to the nodes of a completeness graph such that traversing the completeness graph results in a determination that the taxpayer corresponding to the tax data qualifies for (i.e., to receive a deduction) the tax concept corresponding to the completeness graph. As used in this application, a "decision table" includes, but is not limited to, a tabular representation of a data structure including one axis (e.g., rows) representing paths of completion through a corresponding completeness graph, and another axis (e.g., columns) representing questions and respective answers. As used in this application, an "unanswered question in or for a completeness graph" includes, but is not limited to, an empty or undetermined node in the completeness graph.

As used in this application, a "preparer," "user" or "taxpayer" includes, but is not limited to, a person or entity preparing a tax. The "preparer," "user" or "taxpayer" may or may not be obligated to file the tax return. As used in this application, a "previous tax return" or "prior tax return" includes, but is not limited to, a tax return (in electronic or hard copy form) for a year before the current tax year. As used in this application, "tax data" includes, but is not limited to, information that may affect a user's tax burden, including information typically included in a tax return. As used in this application, "taxpayer data" includes, but is not limited to, information relating to a taxpayer, including, but not limited to, tax data. The terms "tax data" and "taxpayer data," as used in this application, also include, but are not limited to, partially or fully completed tax forms (electronic and hard copy) that include information typically included in a tax return. As used in this application, a "previously collected tax data" includes, but is not limited to, tax data that was previously collected (e.g., a previous year's tax data for the taxpayer).

As used in this application, "missing tax data," "missing taxpayer data" or "missing data" includes, but is not limited to, information needed to calculate a user's tax burden that is not yet in the possession of an electronic tax return preparation system. As used in this application, a "user data profile" includes, but is not limited to, a set of tax data related to a particular user. As used in this application, a "partition" includes, but is not limited to, a listing of the data sources and corresponding identifiers (e.g., pairs) of missing data for a particular user. As used in this application, a "target queue" includes, but is not limited to, a listing of identifiers of missing data and corresponding users for a particular data source.

As used in this application, "taxpayer data category" or "tax data category" includes, but is not limited to, a generic class of tax data (e.g., SSN, taxpayer age, mortgage interest paid, property tax paid, childcare expenses, business expenses, or other data categories that may be used to modify the tax liability of a taxpayer). As used in this application, "identifier of missing data" includes, but is not limited to, an indicator of the tax data category to which missing data belongs. As used in this application, an "accuracy score" includes, but is not limited to, a numerical indicator of the likelihood that a particular tax datum will be correct (e.g., taking into account the taxpayer's identity, the tax datum, and the data source from which the tax datum was obtained).

As used in this application, "tax data source" includes, but is not limited to, a source of data that can be accessed to provide data in the preparation of tax forms (e.g., lender for mortgage interest paid or county tax collector for property tax paid). As used in this application "tax data source program" includes, but is not limited to, a computer program that can function as a tax data source (e.g., online banking, financial management systems, and government websites). As used in this application, "tax code," "tax regulation," and "tax rule" includes, but is not limited to, statutes, regulations, and rules relating to taxes in various jurisdictions (e.g., state and federal), including the United States of America and other jurisdictions around the world.

As used in this application, a "financial management system" includes, but is not limited to, software that oversees and governs an entity's (e.g. person, business entity, government) finances (e.g., income, expenses, assets, and liabilities). Exemplary financial management system include MINT Financial Management Software, QUICKEN, QUICKBOOKS, TURBOTAX, which are available from Intuit Inc. of Mountain View, Calif., MICROSOFT MONEY, which is available from Microsoft Corp. of Redmond, Wash., and YODLEE Financial Management Software, which is available from Yodlee, Inc. of Redwood City, Calif. A financial management system is executed to assist a user with managing its finances. As part of overseeing and governing an entity's finances, financial management systems may access financial transaction data stored in various user accounts including checking, savings, money market, credit card, stock, loan, mortgage, payroll or other types of user account. Such user accounts can be hosted at a financial institution such as a bank, a credit union, a loan services or a brokerage. Financial transaction data may include, for example, account balances, transactions (e.g., deposits, withdraws, and bill payments), debits, credit card transactions (e.g., for merchant purchases). Financial management systems can also obtain financial transaction data directly from a merchant computer or a point of sale terminal. Financial management systems can include financial transaction data aggregators that manage and organize financial transaction data from disparate sources. While certain embodiments are described with reference to MINT Financial Management Software, the embodiments described herein can include other financial management systems such as QUICKEN Financial Management Software, QUICKRECIPTS Financial Management Software, FINANCEWORKS Financial Management Software, MICROSOFT MONEY Financial Management Software, YODLEE Financial Management Software (available from Yodlee, Inc. of Redwood City, Calif.) and other financial management systems capable of providing a taxpayer's financial data to an electronic tax return preparation system.

As used in this application, "computer," "computer device," or "computing device" includes, but are not limited to, a computer (laptop or desktop) and a computer or computing device of a mobile communication device, smartphone and tablet computing device. As used in this application, "tax preparation system," "tax preparation computing device," "tax preparation computer," "tax preparation software," "tax preparation module," "tax preparation application," "tax preparation program," "tax return preparation system," "tax return preparation computing device," "tax return preparation computer," "tax return preparation software," "tax return preparation module," "tax return preparation application," or "tax return preparation program" includes, but are not limited to, one or more separate and independent software and/or hardware components of a computer that must be added to a general purpose computer before the computer can be used to prepare tax returns, and computers having such components added thereto.

As used in this application, "tax data acquisition system," "tax data acquisition computing device," "tax data acquisition computer," "tax data acquisition software," "tax data acquisition module," "tax data acquisition application," or "tax data acquisition program" includes, but are not limited to, one or more separate and independent software and/or hardware components of a computer that must be added to a general purpose computer before the computer can collect tax data for electronic tax return preparation systems, and computers having such components added thereto.

As used in this application, "tax logic agent" includes, but is not limited to, one or more separate and independent software and/or hardware components of a computer that must be added to a general purpose computer before the computer can read user data profiles to identify respective identifiers of missing tax data or generate sets of identifiers of missing tax data (e.g., by analyzing and/or traversing completeness graphs and/or decision tables), and computers having such components added thereto.

As used in this application, "match system" includes, but is not limited to, one or more separate and independent software and/or hardware components of a computer that must be added to a general purpose computer before the computer can (1) identify one or more data sources corresponding to missing data or identifiers thereof, and (2) generate partitions for user data profiles corresponding to identifiers of missing data and data sources, and computers having such components added thereto.

As used in this application, "dispatch system" includes, but is not limited to, one or more separate and independent software and/or hardware components of a computer that must be added to a general purpose computer before the computer can generate target queues for data sources using partitions (e.g., partitions generated by a match system), and computers having such components added thereto.

As used in this application, "data collector" includes, but is not limited to, one or more separate and independent software and/or hardware components of a computer that must be added to a general purpose computer before the computer can query data sources (e.g., with a data call) based on target queues to collect data, and computers having such components added thereto.

As used in this application, "aggregator" includes, but is not limited to, one or more separate and independent software and/or hardware components of a computer that must be added to a general purpose computer before the computer can generating user specific data sets from collected data, and computers having such components added thereto.

As used in this application, "importer" includes, but is not limited to, one or more separate and independent software and/or hardware components of a computer that must be added to a general purpose computer before the computer can generate a modified user data profile using new data and/or data sets, and computers having such components added thereto.

As used in this application, "server" or "server computer" includes, but is not limited to, one or more separate and independent software and/or hardware components of a computer that must be added to a general purpose computer before the computer can receive and respond to requests from other computers and software in order to share data, hardware, and/or software resources among the other computers and software, and computers having such components added thereto. As used in this application, "obtaining data" or "acquiring data" includes, but is not limited to, accessing data (e.g., from a database through a network) and generating data (e.g., using one or more hardware and software components).

As used in this application, "input/output module" or "input output module" includes, but is not limited to, one or more separate and independent software and/or hardware components of a computer that must be added to a general purpose computer before the computer can communicate with and facilitate the receipt and transfer of information, including schema, completeness graphs, calculation graphs, tax data, data relating to computer data sources, identifiers of missing data, partitions, and target queues, from and to other computers. As used in this application, "memory module" includes, but is not limited to, one or more separate and independent software and/or hardware components of a computer that must be added to a general purpose computer before the computer can store information, including schema, completeness graphs, calculation graphs, tax data, data relating to computer data sources, identifiers of missing data, partitions, and target queues. As used in this application, a "tax calculation engine" includes, but is not limited to, one or more separate and independent software and/or hardware components of a computer that must be added to a general purpose computer before the computer can manipulate tax data to operate on a completeness graph and/or a calculation graph. As used in this application, a "natural language generator" includes, but is not limited to, one or more separate and independent software and/or hardware components of a computer that must be added to a general purpose computer before the computer can form a natural language textual explanation. As used in this application, a "user interface controller" includes, but is not limited to, one or more separate and independent software and/or hardware components of a computer that must be added to a general purpose computer before the computer can receive information from and send information to a user. As used in this application, "application programming interface" includes, but is not limited to, one or more separate and independent software and/or hardware components of a computer that must be added to a general purpose computer before the computer can receive information from and send information to a separate computer.

As used in this application, "website" includes, but is not limited to, one or more operatively coupled webpages. As used in this application, "browser" or "web browser" includes, but is not limited to, one or more separate and independent software and/or hardware components of a computer that must be added to a general purpose computer before the computer can receive, display and transmit resources from/to the World Wide Web.

FIG. 1 depicts an exemplary hardware system 100 in which a tax data acquisition system 102 according to one embodiment can operate. The hardware system 100 according to this embodiment includes a server computing device 104, a plurality of user computing devices 106, 106', 106" and a data source computing device 116, which are all operatively coupled via a network 108. The server computing device 104 and the tax data source computer device 116 are both stationary computers. The user computing devices depicted in FIG. 1 include a stationary or desktop computer 106, a tablet computer 106', and a smartphone 106". Generally, user computing devices include a few common attributes (e.g., a processor, a memory, and the ability to communicate via network; see FIG. 4) housed in various form factors (e.g., desktop computer, laptop computer, tablet computer, smartphone, watch, or other computing devices comprising a processor, memory, and the ability to communicate with other computing devices via a network).

The network 108 may be two or more networks depending on the system configuration and communication protocols employed. One or more or all of networks 108 may be, for example, a wireless or cellular network, a private communication network (e.g., mobile phone network), a Local Area Network (LAN), a Wide Area Network (WAN), and/or other technology capable of enabling one or more computing devices to communicate with one another. Reference to network 108 generally is not intended to refer to a specific network or communications protocol, and embodiments can be implemented using various networks 108 and combinations thereof.

In the embodiment depicted in FIG. 1, the tax data acquisition system 102 is operatively coupled to an electronic tax return preparation system/program 110, both of which operate on the server computing device 104. Operatively coupling the tax data acquisition system 102 and the electronic tax return preparation system 110 allows the systems to share resources. Examples of tax return preparation systems 110 that may be operatively coupled to the tax data acquisition system 102 include desktop or online versions of TURBOTAX, PROSERIES, and LACERTE tax return preparation applications, available from Intuit Inc. TURBOTAX, PROSERIES AND LACERTE are registered trademarks of Intuit Inc., Mountain View Calif.

Various web browser programs 112, 112', 112" operate on respective user computers 106, 106', 106" and access the tax data acquisition system 102 and the tax return preparation system 110 through the network 108. A tax data source program 118 operates on the tax data source computing device 116 and may provide tax data to the tax data acquisition system 102 (and the tax return preparation system 110).

The various computing devices 104, 106, 106', 106", 116 may include visual displays or screens 114 operatively coupled thereto. In the embodiment depicted in FIG. 1, the user computing devices 106, 106', 106" includes a display or screen 114 through which respective users physically interface with the user computing devices 106, 106', 106" and the respective web browser programs 112, 112', 112" operating thereon.

Because the tax data acquisition system 102 and the electronic tax return preparation system/program 110 depicted in FIG. 1 are separate, operatively coupled systems, they can operate on distributed computing and cloud environments. While the tax data acquisition system 102 and the electronic tax return preparation system/program 110 depicted in FIG. 1 are separate, operatively coupled systems, in other embodiments, one of the tax data acquisition system 102 and the electronic tax return preparation system 110 may form a part of the other system. For instance, the hardware system 100' embodiment depicted in FIG. 2, has a tax data acquisition system 102 that includes an electronic tax return preparation system 110. In still other systems, the tax data acquisition system 102 may form a part of an electronic tax return preparation system/program 110.

Figure 2:
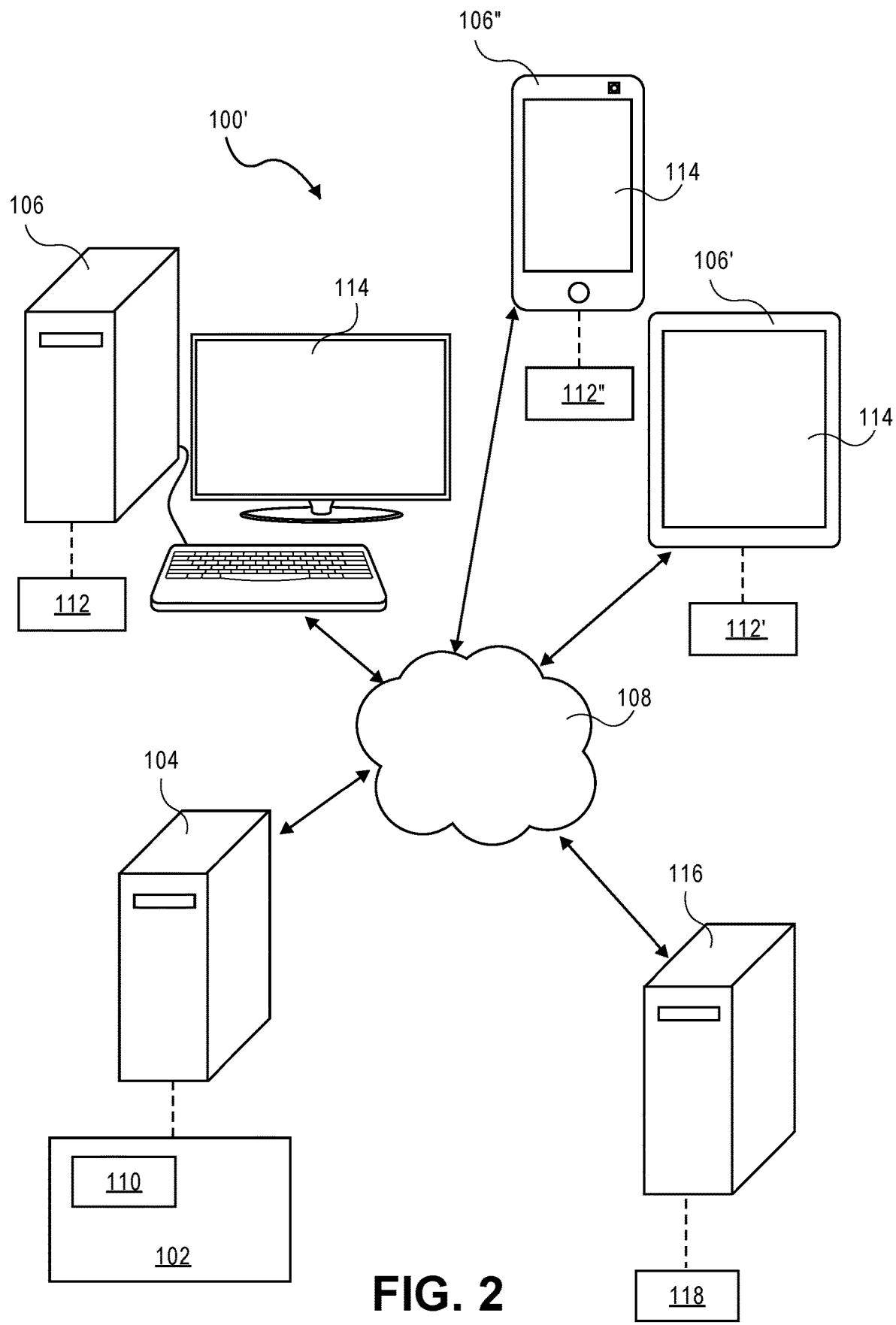

While FIGS. 1 and 2 depict a single tax data source computing device 116 operatively coupled to the respective hardware systems 100, 100', other hardware system embodiments include more than one tax data source computing devices. For instance, FIG. 3 depicts a hardware system 100" similar to the one depicted in FIG. 1, except that the hardware system 100" includes a plurality of tax data source computing devices 116a-116n, on which operate a plurality of tax data source programs 118a-118n.

Figure 3:
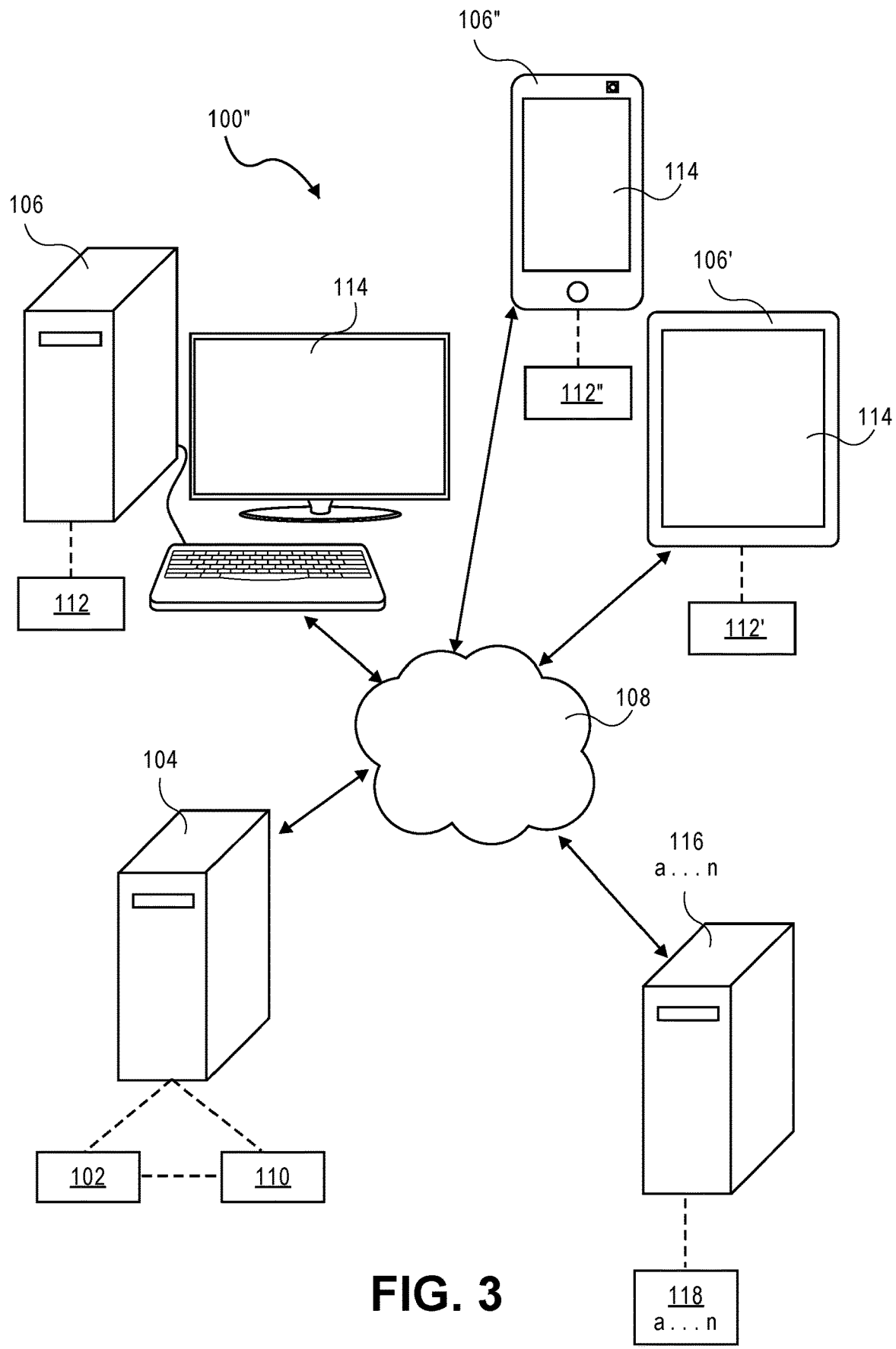

While FIGS. 1 to 3 depict the server computing device 104, the user computing device(s) 106, 106', 106" and the tax data source computing device 116 as being operatively coupled by the same network 108, in other embodiments, these computing devices may be operatively coupled by two or more networks.

Figure 4:
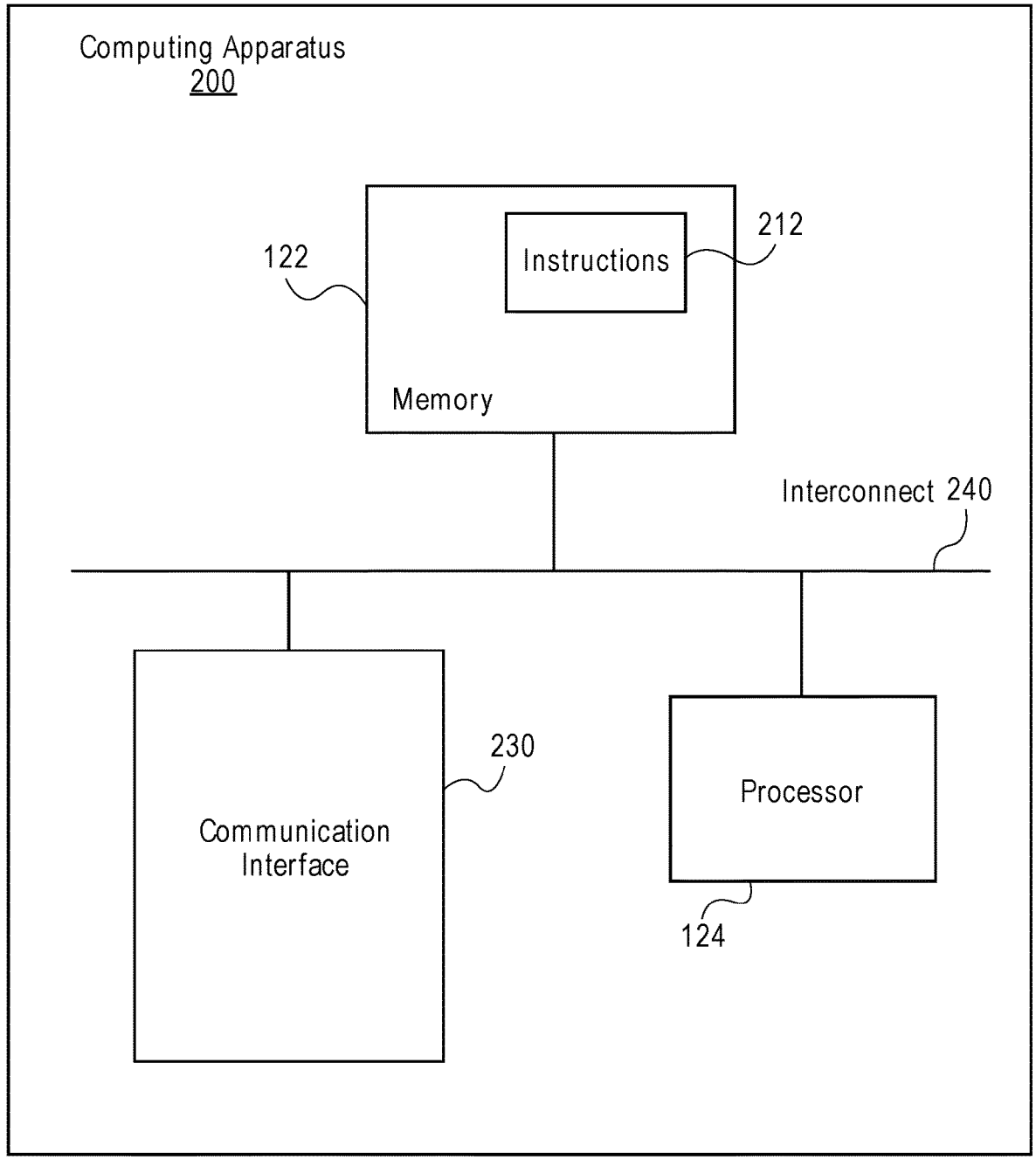
FIG. 4 is a block diagram of a computing apparatus or system in which various embodiments may be implemented or that may be utilized to execute various embodiments.
Figure 5:
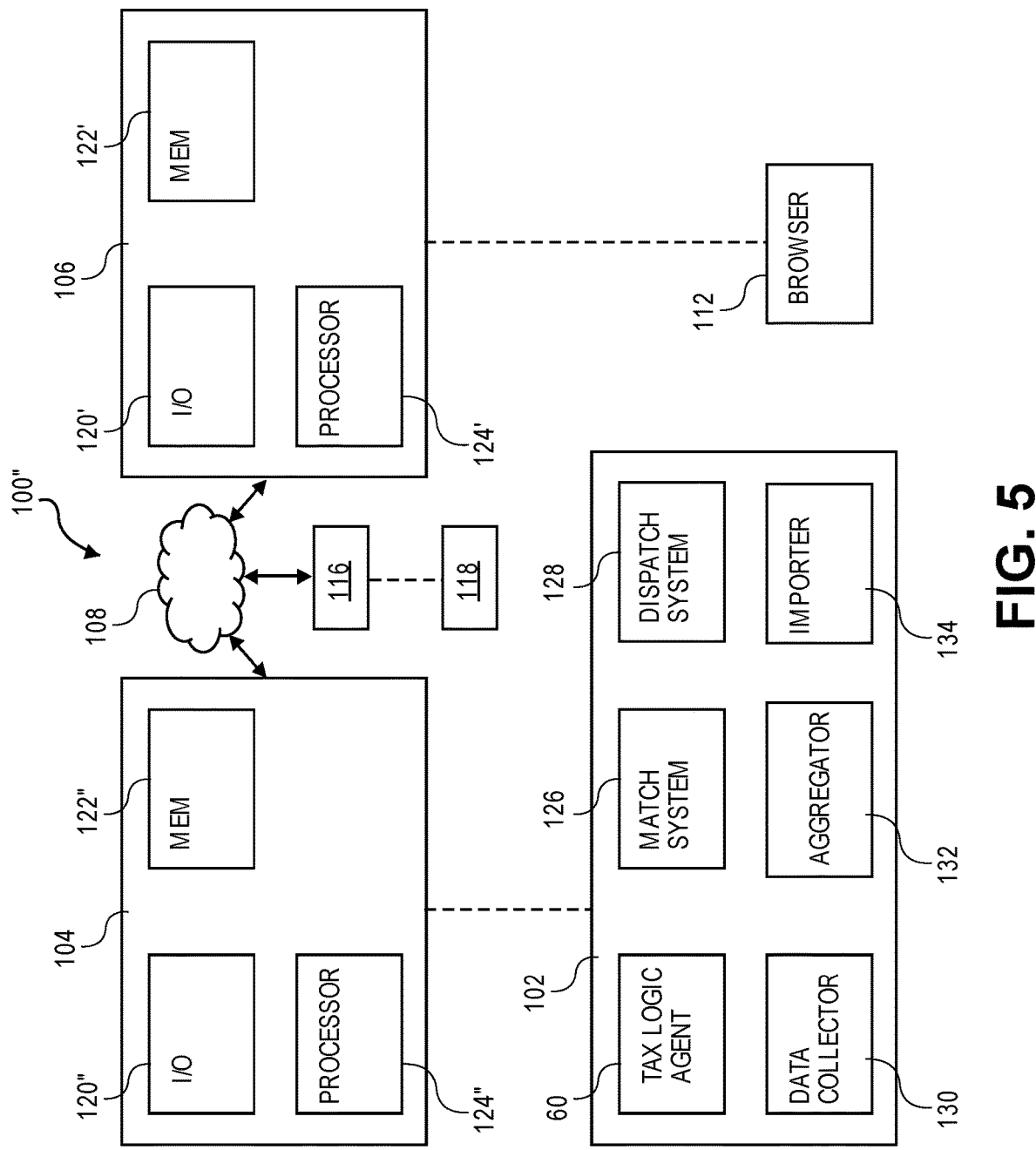
FIG. 5 is a block diagram of a computer system according to one embodiment on which a tax data acquisition system according to one embodiment may be implemented.

FIG. 4 generally illustrates certain components of a computing device 200 that may be utilized to execute embodiments and that includes a memory 122, program instructions 212, a processor or controller 124 to execute instructions 212, a network or communications interface 230, e.g., for communications with a network or interconnect 240 between such components. The memory 122 may be or include one or more of cache, RAM, ROM, SRAM, DRAM, RDRAM, EEPROM and other types of volatile or non-volatile memory capable of storing data. The processor unit 124 may be or include multiple processors, a single threaded processor, a multi-threaded processor, a multi-core processor, or other type of processor capable of processing data. Depending on the particular system component (e.g., whether the component is a computing device or a hand held mobile communications device), the interconnect 240 may include a system bus, LDT, PCI, ISA, or other types of buses, and the communications or network interface may, for example, be an Ethernet interface, a Frame Relay interface, or other interface. The network interface 230 may be configured to enable a system component to communicate with other system components across a network which may be a wireless or various other networks. It should be noted that one or more components of computing device 200 may be located remotely and accessed via a network. Accordingly, the system configuration provided in FIG. 5 is provided to generally illustrate how embodiments may be configured and implemented. The processors 124', 124" in the server computing device 104, the user computing device 106 and the tax data source computing device 116 are respectively programmed with the tax data acquisition system 102, browser 112 and tax data source program 118 so that they are no longer generic computing devices.

FIG. 5 depicts, in greater detail, another hardware system 100''' configured to host a tax data acquisition system 102 according to one embodiment. Like the hardware systems 100, 100', 100" depicted in FIGS. 1 to 3, the hardware system 100''' in FIG. 5 includes a server computing device 104, a user computing device 106 and a tax data source computing device 116 that are operatively coupled by a network 108. For clarity, the tax data source computing device 116 in the hardware system 100''' in FIG. 5 is depicted as a simple box.

The server computing device 104 includes an input/output module 120', a memory module 122' and a processor 124'. The user computing device 106 includes an input/output module 120", a memory module 122" and a processor 124". The tax data source computing device 116 includes an input/output module, a memory module and a processor. The input/output modules 120', 120" are configured to communicate with and facilitate the receipt and transfer of tax data, user data profiles, identities of missing data, partitions, and target queues. The memory modules 122', 122" are configured to store tax data, user data profiles, identities of missing data, partitions, and target queues, in proper formats for tax data acquisition. The processors 124', 124" in the server computing device 104, the user computing device 106, and tax data source computing device 116 are configured to respectively operate programs (e.g., tax data acquisition system 102, browser 112, and tax data source program 118).

The tax data acquisition system 102 operating on the server computing device 104 includes a tax logic agent 60 configured to read user data profiles to identify respective identifiers of tax data missing from the user data profile or generate sets of identifiers of missing tax data. Reading user data profile may include analyzing and/or traversing completeness graphs and/or decision tables, which are required to complete a tax return, in view of the user data in the user data profile. Data missing from the completeness graphs and/or decision tables can be collected to form the set of missing tax data for the user. The tax logic agent 60 can be part of the tax data acquisition system 102 as shown in FIGS. 2 and 5. Alternatively, it can be part of a separate but operatively coupled tax return preparation software 110, as shown in FIGS. 1 and 3.

The tax data acquisition system 102 also includes a match system 126 configured to identify one or more data sources 118 corresponding to missing data or identifiers thereof. This identification may be a multiple to multiple ("m to m") mapping when some of the many pieces of missing data may be mapped to a plurality of sources. For instance, a taxpayer's SSN may correspond (i.e., be obtainable from) the IRS and an online banking system. The match system 126 is also configured to generate partitions for user data profiles corresponding to identifiers of missing data and data sources. An exemplary partition may be a listing of the data sources 118 and corresponding identifiers of missing data (e.g., in pairs) for a particular user. For instance, a simple exemplary partition for user 1 may be (IRS:marital status, IRS:SSN; LinkedIn:first name).

The tax data acquisition system 102 further includes a dispatch system 128 configured to generate target queues for data sources using partitions. The partitions may have been generated by a match system 126. An exemplary target queue is a listing of identifiers of missing data and corresponding users for a particular data source. For instance, a simple exemplary target queue for Facebook may be (user 1 first name; user 1 marital status; user 2 marital status).

Moreover, the tax data acquisition system 102 includes a data collector 130 configured to query data sources 118 based on target queues to collect data identified on the target queues. The data sources 118 may be queried with a data call. In some embodiments, the data collector 130 is configured to query a data source 118 for multiple pieces of data identified in the target queue corresponding to the data source 118 with a single data call. This reduces the communication and processing system requirements for data acquisition.

In addition, the tax data acquisition system 102 includes an aggregator 132 configured to generate user specific data sets from collected data. The data acquired/collected by the data collector 130 may be grouped by user and formed into a union set to generate the user specific data sets.

The tax data acquisition system 102 also includes an importer 134 configured to generate a modified user data profile using new data and/or data sets. The importer 134 can add the new data for a user to the user previously acquired user profile to generate a more complete modified user data profile.

The browser 112 is configured to transmit information to and receive information from the tax data acquisition system 102 and to facilitate user interaction with the tax data acquisition system 102.

Having described various general hardware and software aspects of tax data acquisition systems according to various embodiments, the tax data acquisition software will now be described in greater detail, including data structures therein.

Figure 6:
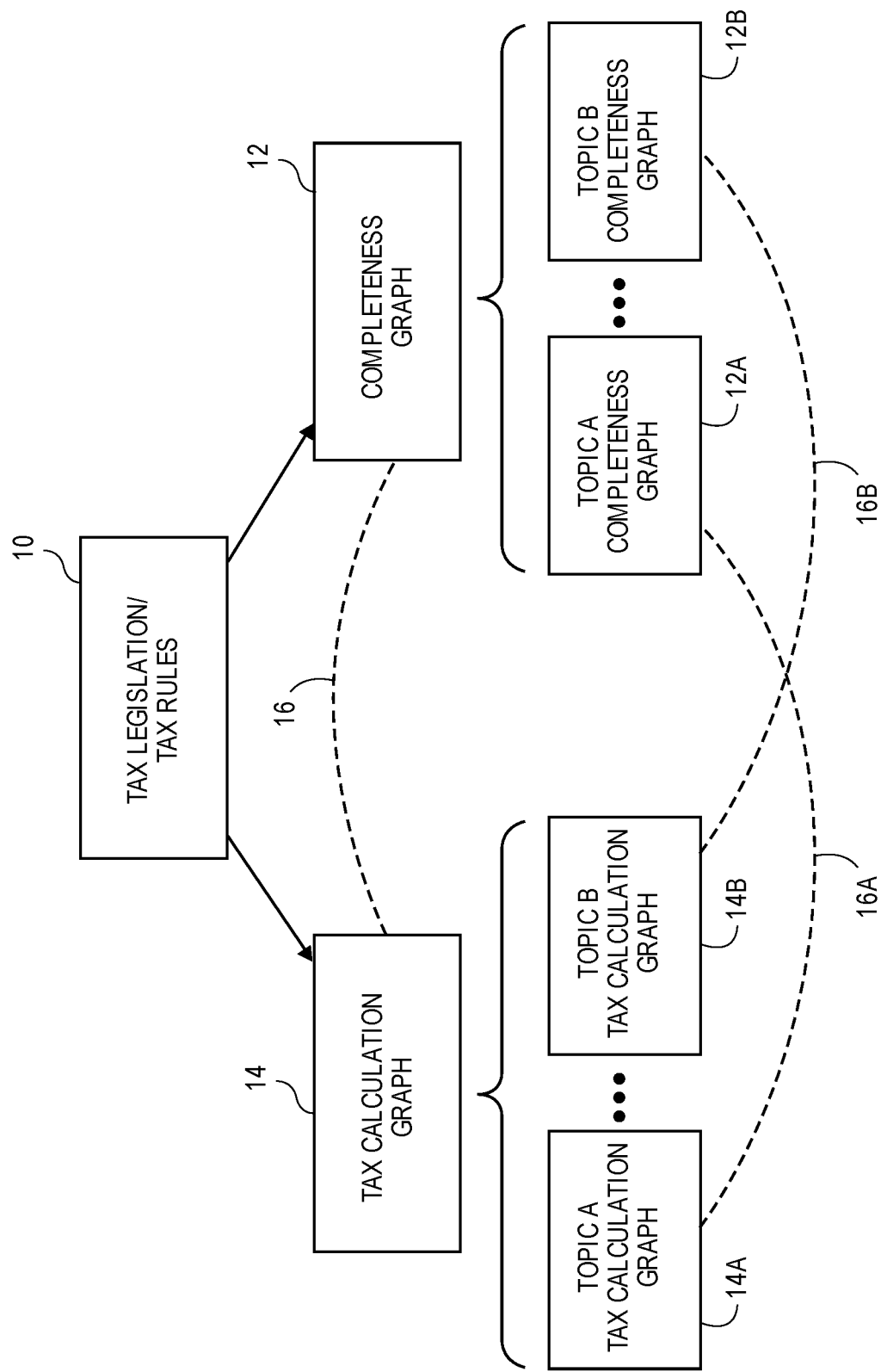
FIG. 6 schematically illustrates that completeness graphs and tax calculation graphs may include information from tax legislation/tax rules.

FIG. 6 illustrates that completeness graphs 12 and tax calculation graphs 14 may include information from tax legislation/tax rules 10. Information from tax legislation or rules 10 may be parsed or broken into various topics (e.g., by linguistic pattern recognition engines or human programmers). For example, there may be nearly one hundred topics that need to be covered for completing a federal tax return. When one considers both federal and state tax returns, there can be well over one hundred tax topics that need to be covered. When tax legislation or tax rules 10 are broken into various topics or sub-topics (e.g., by linguistic pattern recognition engines or human programmers), each particular topic (e.g., topics A, B) may each have their own dedicated completeness graph 12A, 12B and tax calculation graph 14A, 14B as seen in FIG. 6.

Note that in FIG. 6, the completeness graph 12 and the tax calculation graph 14 are interdependent as illustrated by dashed line 16. That is to say, some elements contained within the completeness graph 12 are needed to perform actual tax calculations using the tax calculation graph 14. Likewise, aspects within the tax calculation graph 14 may be needed as part of the completeness graph 12. Taken collectively, the completeness graph 12 and the tax calculation graph 14 represent data structures that capture all the conditions necessary to complete the computations that are required to complete a tax return that can be filed. The completeness graph 12, for example, determines when all conditions have been satisfied such that a "fileable" tax return can be prepared with the existing data. The completeness graph 12 is used to determine, for example, that no additional data input is needed to prepare and ultimately print or file a tax return. The completeness graph 12 is used to determine when a particular schema contains sufficient information such that a tax return can be prepared and filed. Individual combinations of completeness graphs 12 and tax calculation graphs 14 that relate to one or more topics can be used to complete the computations required for some sub-calculation. In the context of a tax setting, for example, a sub-selection of topical completeness graphs 12 and tax calculation graphs 14 can be used for intermediate tax results such as Adjusted Gross Income (AGI) or Taxable Income (TI), itemized deductions, tax credits, and the like.

Encapsulating the tax code and regulations within calculation graphs 14 results in much improved testability and maintainability of the tax return preparation software 110, by utilizing a modular system architecture. Compared to hard coded complex systems, building a software system from modules (e.g., calculation graphs 14) allows each of these modules to be independently analyzed, tested, maintained, updated, modified and/or changed. Software programming errors ("bugs") can be identified more easily when the calculation graphs 14 are used because such bugs can be traced more easily by analyzing discrete modules in the modular system architecture. In addition, updates to the calculation graphs 14 can be readily performed when tax code or regulations change with less effort by modifying discrete modules in the modular system architecture.

Figure 7:
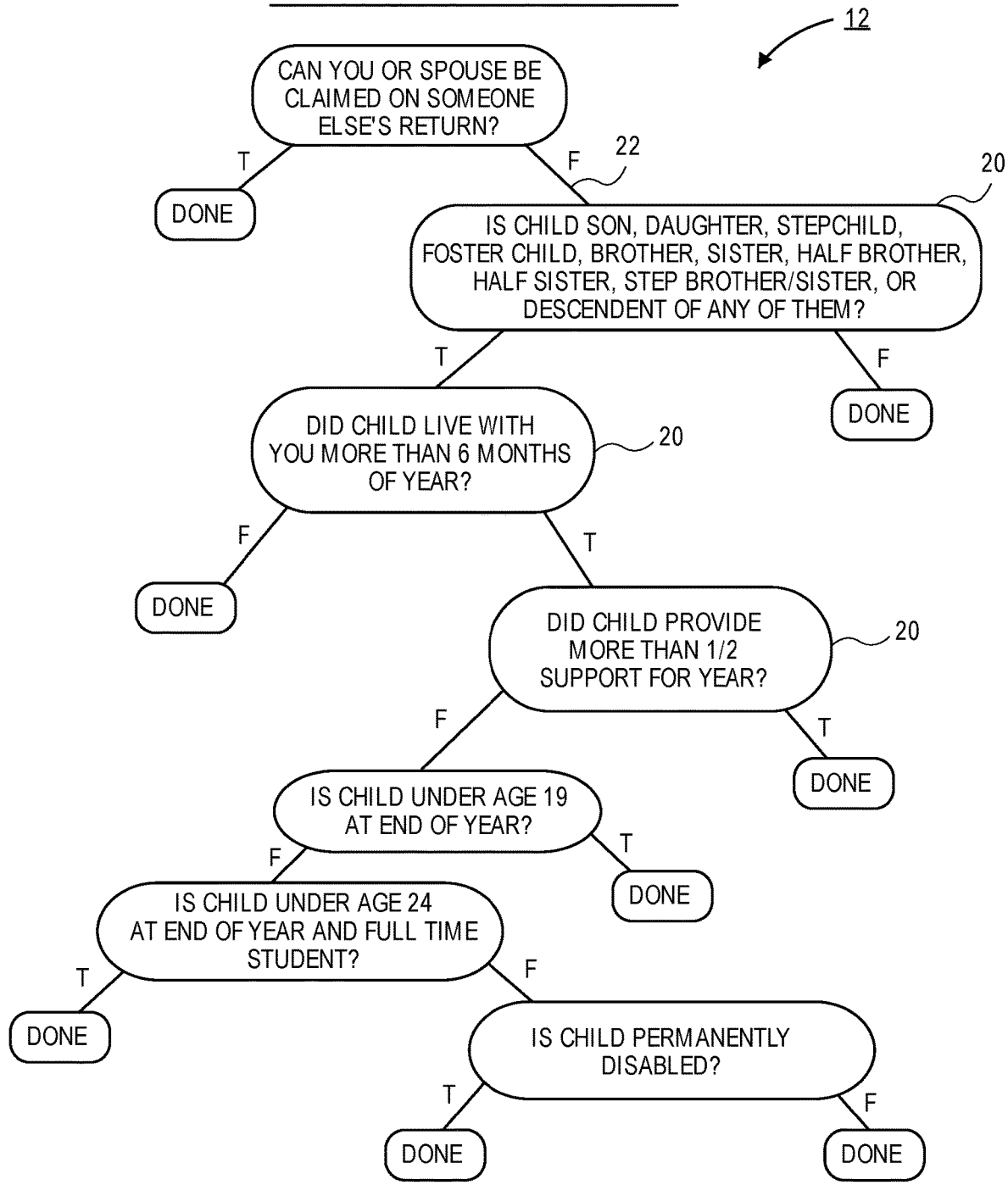
FIGS. 7 and 8 illustrate examples of simplified completeness graphs according to two embodiments.

The completeness graph 12 and the tax calculation graph 14 represent data structures that can be constructed in the form of a logical tree. FIG. 7 illustrates a completeness graph 12 in the form of a logical tree with nodes 20 and arcs 22 representing a basic or general version of a completeness graph 12 for the topic of determining whether a child qualifies as a dependent for federal income tax purposes. A more complete flowchart-based representation of questions related to determining a "qualified child" may be found in U.S. patent application Ser. No. 14/097,057, which is incorporated by reference herein. Each node 20 contains a condition that in this example is expressed as a Boolean expression that can be answered in the affirmative or negative. The arcs 22 that connect each node 20 illustrate the dependencies between nodes 20. The combination of arcs 22 in the completeness graph 12 illustrates the various pathways to completion. A single arc 22 or combination of arcs 22 that result in a determination of "Done" represent a pathway to completion. As seen in FIG. 7, there are several pathways to completion. For example, one pathway to completion is where an affirmative (True) answer is given to the question of whether you or a spouse can be claimed on someone else's tax return. If such a condition is true, your child is not a qualifying dependent because under IRS rules you cannot claim any dependents if someone else can claim you as a dependent. In another example, if you had a child and that child did not live with you for more than 6 months of the year, then your child is not a qualifying dependent. Again, this is a separate IRS requirement for a qualified dependent.

As one can imagine given the complexities and nuances of the tax code, many tax topics may contain completeness graphs 12 that have many nodes with a large number of pathways to completion. However, many branches or lines within the completeness graph 12 can be ignored, for example, when certain questions internal to the completeness graph 12 are answered that eliminate other nodes 20 and arcs 22 within the completeness graph 12. The dependent logic expressed by the completeness graph 12 allows one to minimize subsequent questions based on answers given to prior questions. This allows a minimum question set that can be generated and that can be presented to a user as explained herein.

Figure 8:
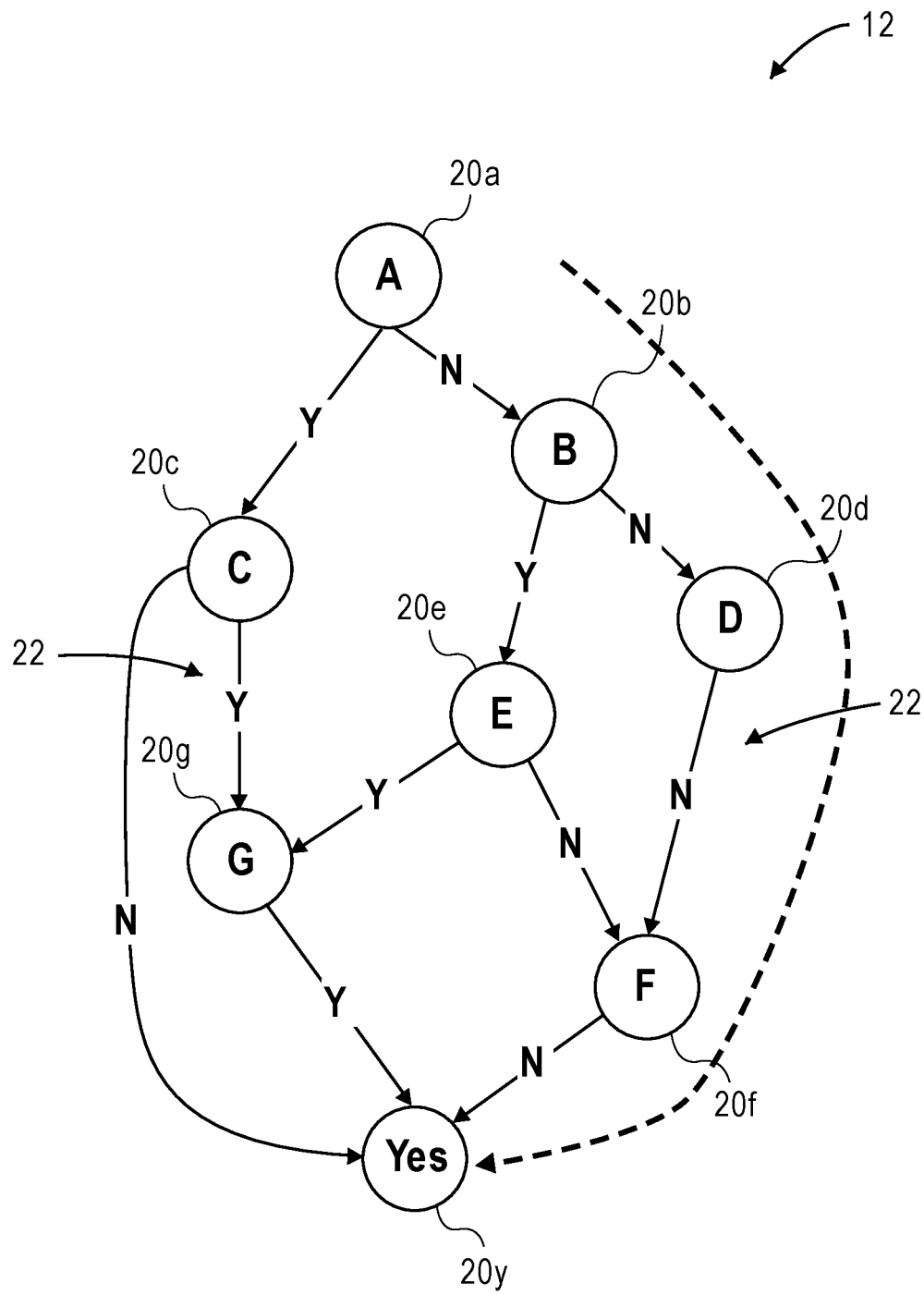

FIG. 8 illustrates another example of a completeness graph 12 that includes a beginning node 20a (Node A), intermediate nodes 20b-g (Nodes B-G) and a termination node 20y (Node "Yes" or "Done"). Each of the beginning node 20a and intermediate nodes 20a-g represents a question. Inter-node connections or arcs 22 represent response options. In the illustrated embodiment, each inter-node connection 22 represents an answer or response option in binary form (Y/N), for instance, a response to a Boolean expression. It will be understood, however, that embodiments are not so limited, and that a binary response form is provided as a non-limiting example. In the illustrated example, certain nodes, such as nodes A, B and E, have two response options 22, whereas other nodes, such as nodes D, G and F, have one response option 22.

As explained herein, the directed graph or completeness graph 12 that is illustrated in FIG. 8 can be traversed through all possible paths from the start node 20a to the termination node 20y. By navigating various paths through the completeness graph 12 in a recursive manner, the system can determine each path from the beginning node 20a to the termination node 20y.

The completeness graph 12 and the nodes 20 and arcs 22 therein can be tagged and later be used or called upon to intelligently explain to the user the reasoning behind why a particular variable is needed (i.e., a node exists) in a particular completeness graph 12, as explained in more detail below.

A completeness graph 12, such as the one depicted in FIG. 8, along with the pathways to completion through the graph can be converted into a different data structure or format. In the illustrated embodiment shown in FIG. 9, this different data structure or format is in the form of a decision table 30. In the illustrated example, the decision table 30 includes rows 32 (five rows 32a-e are illustrated) based on the paths through the completeness graph 12. In the illustrated embodiment, the columns 34a-g of the completeness graph 12 represent expressions for each of the questions (represented as nodes A-G in FIG. 8) and answers derived from completion paths through the completeness graph 12 and column 34h indicates a conclusion, determination, result or goal 34h concerning a tax topic or situation, e.g., "Yes— your child is a qualifying child" or "No—your child is not a qualifying child."

Figure 9:
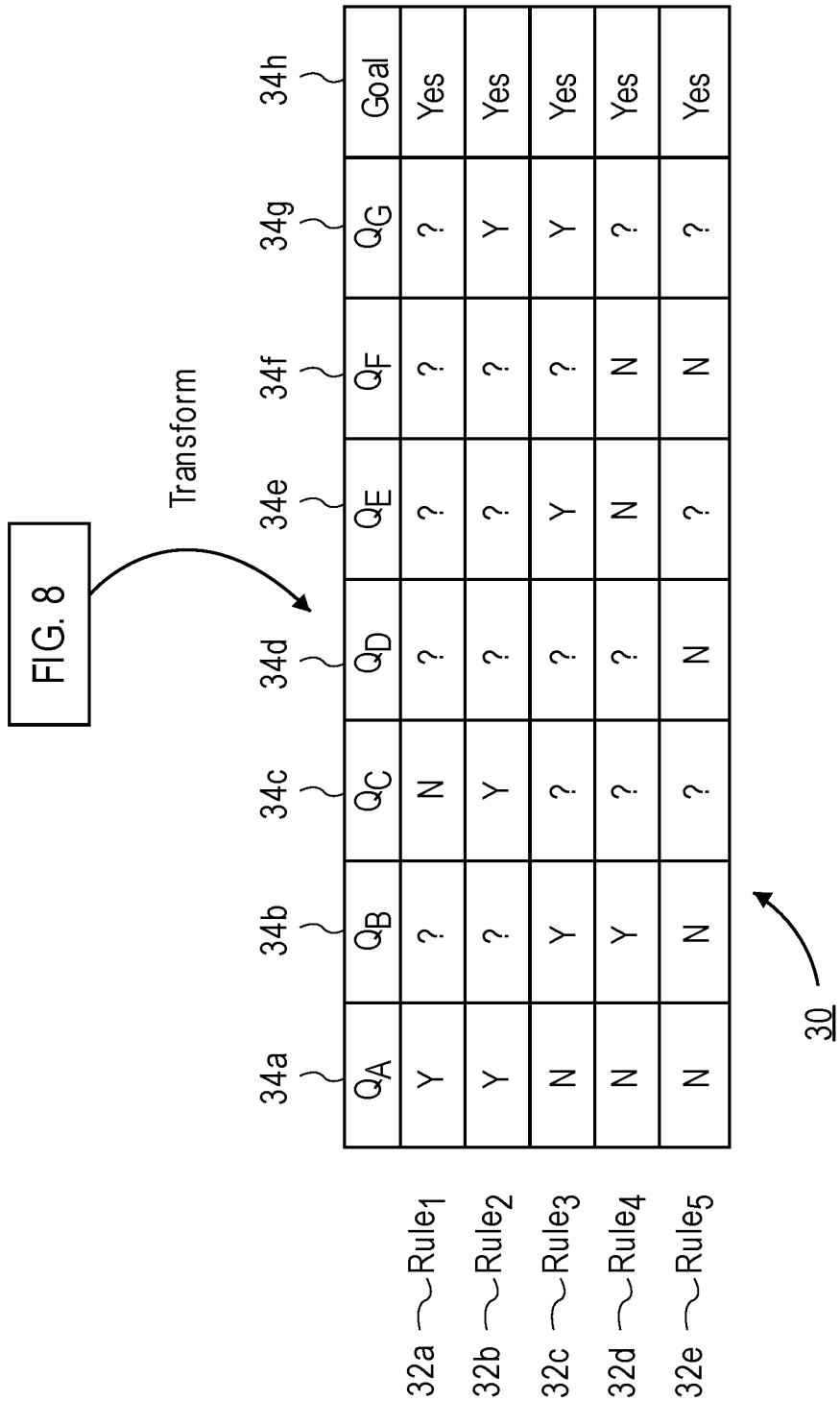
FIG. 9 illustrates a decision table based on or derived from the completeness graph illustrated in FIG. 7.

Referring to FIG. 9, each row 32 of the decision table 30 represents a tax rule. The decision table 30, for example, may be associated with a federal tax rule or a state tax rule. In some instances, for example, a state tax rule may include the same decision table 30 as the federal tax rule. The decision table 30 can be used, as explained herein, to drive a personalized interview process for the user of tax return preparation software 110. In particular, the decision table 30 is used to select a question or questions to present to a user during an interview process. In this particular example, in the context of the completeness graph 12 from FIG. 8 converted into the decision table 30 of FIG. 9, if the first question presented to the user during an interview process is question "A" and the user answers "Yes" rows 32c-e may be eliminated from consideration given that no pathway to completion is possible. The tax rule associated with these columns cannot be satisfied given the input of "Yes" in question "A." Note that those cell entries denoted by "?" represent those answers to a particular question in a node that are irrelevant to the particular pathway to completion. Thus, for example, referring to row 34a, when an answer to $Q_A$ is "Y" and a path is completed through the completeness graph 12 by answering Question C as "N" then answers to the other questions in Nodes B and D-F are "?" since they are not needed to be answered given that particular path.

After an initial question has been presented and rows are eliminated as a result of the selection, next, a collection of candidate questions from the remaining available rows 32a and 32b is determined. From this universe of candidate questions from the remaining rows, a candidate question is selected. In this case, the candidate questions are questions $Q_C$ and $Q_G$ in columns 34c, 34g, respectively. One of these questions is selected and the process repeats until either the goal 34h is reached or there is an empty candidate list.

FIG. 10 illustrates another embodiment of a decision table 30. In this embodiment, the decision table 30 includes additional statistical data 36 associated with each rule (e.g., rules $R_1$-$R_6$). For example, the statistical data 36 may represent a percentage or the like in which a particular demographic or category of user(s) satisfies this particular path to completion. The statistical data 36 may be mined from existing or current year tax filings. The statistical data 36 may be obtained from a proprietary source of data such as tax filing data stored by Intuit, Inc. The statistical data 36 may be third party data that can be purchased or leased for use. For example, the statistical data 36 may be obtained from a government taxing authority or the like (e.g., IRS). In one aspect, the statistical data 36 does not necessarily relate specifically to the user or users preparing the particular tax return. For example, the statistical data 36 may be obtained based on a number of tax filers which is then classified into one or more classifications. For example, statistical data 36 can be organized with respect to age, type of tax filing (e.g., joint, separate, married filing separately), income range (gross, AGI, or TI), deduction type, geographic location, and the like).

FIG. 10 illustrates two such columns 38a, 38b in the decision table 30 that contain statistical data 36 in the form of percentages. For example, column 38a (STAT1) may contain a percentage value that indicates taxpayers under the age of thirty-five where $Rule_1$ is satisfied. Column 38b (STAT2) may contain a percentage value that indicates taxpayers over the age of thirty-five where $Rule_1$ is satisfied. Any number of additional columns 38 could be added to the decision table 30 and the statistics do not have to relate to an age threshold or grouping. The statistical data 36 may be used, as explained in more detail below, by the tax return preparation software 110 to determine which of the candidate questions ($Q_A$-$Q_G$) should be asked to a taxpayer. The statistical data 36 may be compared to one or more known taxpayer data fields (e.g., age, income level, tax filing status, geographic location, or the like) such that the question that is presented to the user is most likely to lead to a path to completion. Candidate questions may also be excluded or grouped together and then presented to the user to efficiently minimize tax interview questions during the data acquisition process. For example, questions that are likely to be answered in the negative can be grouped together and presented to the user in a grouping and asked in the negative—for example, "we think these question do not apply to you, please confirm that this is correct." This enables the elimination of many pathways to completion that can optimize additional data requests of the taxpayer.

Figure 11A:
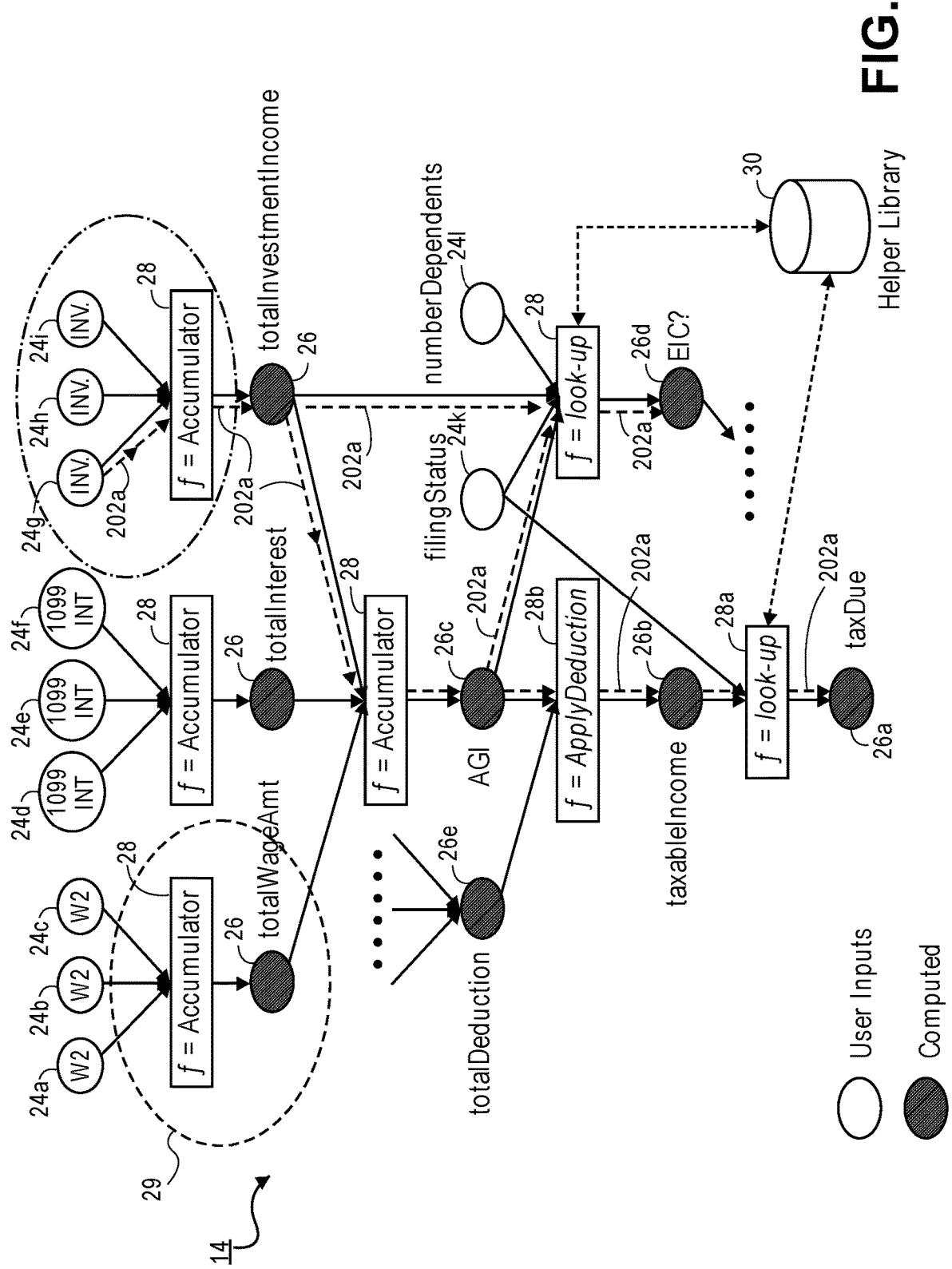
FIGS. 11A and 11B illustrate exemplary calculation graphs according to two embodiments.

FIG. 11A illustrates an example of a tax calculation graph 14. The tax calculation graph 14 semantically describes data dependent tax operations that are used to perform a tax calculation in accordance with the tax code or tax rules 10. The tax calculation graph 14 in FIG. 11A is a simplified view of data dependent tax operations that are used to determine the taxes Due (taxDue) based on various sources of income, deductions, exemptions, and credits. The tax calculation graph 14 is a type of directed graph (which may be composed of a plurality of directed graphs) and, in most situations relevant to tax calculations, is a directed acyclic graph that encodes the data dependencies amongst tax concepts or topics.

In FIG. 11A, various nodes 24 are leaf or input nodes. Examples of leaf nodes 24 in this particular example include data obtained from W-2 forms, data obtained from 1099-INT forms, data obtained from other investment income (INV), filing status, and number of dependents. Typically, though not exclusively, leaf nodes 24 are populated with user inputs. That is to say the user (e.g. a taxpayer) will enter this information from a user interface as described herein. In other embodiments, however, the leaf nodes 24 may be populated with information that is automatically obtained by the tax return preparation software 110. For example, in some embodiments, tax documents may be imaged or scanned with relevant data being automatically extracted using Object Character Recognition (OCR) techniques. In other embodiments, prior tax returns may be used by the tax return preparation software 110 to extract information (e.g., name, potential dependents, address, and social security number) which can then be used to populate the leaf nodes 24. Online resources such as financial services websites or other user-specific websites can be crawled and scanned to scrape or otherwise download tax related information that can be automatically populated into leaf nodes 24. Additional third party information sources such as credit bureaus, government databases, and the like can also be used by the tax return preparation software 110 to obtain information that can then be populated in to respective leaf nodes 24.

In still other embodiments, values for leaf nodes 24 may be derived or otherwise calculated. For example, while the number of dependents may be manually entered by a taxpayer, those dependents may not all be "qualifying" dependents for tax purposes. In such instances, the actual number of "qualified" dependents may be derived or calculated by the tax return preparation software 110. In still other embodiments, values for leaf nodes 24 may be estimated as described herein.

Still other internal nodes, referred to as functional nodes 26, semantically represent a tax concept and may be calculated or otherwise determined using a function node 28 (also referred to as a "function 28"). The functional node 26 and the associated function 28 define a particular tax operation 29. For example, as seen in FIG. 11A, tax operation 29 refers to total wage income and is the result of the accumulator function 28 summing all W-2 income from leaf nodes 24. The functional node 26 may include a number in some instances. In other instances, the functional node 26 may include a response to a Boolean expression such as "true" or "false." The functional nodes 26 may also be constant values in some instances. Some or all of these functional nodes 26 may be labeled as "tax concepts" or "tax topics." The combination of a functional node 26 and its associated function 28 relate to a specific tax operation 29 as part of the tax topic.

Interconnected functional node 26 containing data dependent tax concepts or topics are associated with a discrete set of functions 28 that are used to capture domain specific patterns and semantic abstractions used in the tax calculation. The discrete set of functions 28 that are associated with any particular functional node may be commonly re-occurring operations for functions that are used throughout the process of calculating tax liability. For instance, examples of such commonly reoccurring functions 28 include copy, capping, thresholding, accumulation or adding, look-up operations, phase out calculations, comparison calculations, exemptions, exclusions, and the like.

In one embodiment, the entire set of functions 28 that is used to compute or calculate a tax liability is stored within a data store 42 which in some instances may be a database 30. The various functions 28 that are used to semantically describe data connections between functional nodes 26 can be called upon by the tax return preparation software 110 for performing tax calculations. Utilizing these common functions 28 greatly improves the efficiency of the tax return preparation software 110 and can be used by a programmer to more easily track and follow the complex nature of the ever-evolving tax code. The common functions 28 also enable easier updating of the tax return preparation software 110 because as tax laws and regulations change, fewer changes need to be made to the software code as compared to prior hard-wired approaches.

In some embodiments, the function node 28 may include any number of mathematical or other operations. Examples of functions 28 include summation, subtraction, multiplication, division, and look-ups of tables or values from a database 30 or library as is illustrated in FIG. 11A. It should be understood that the functional node 26 within completeness graph 12 and the tax calculation graph 14 may be shared in some instances. For example, AGI is a re-occurring tax concept that occurs in many places in the tax code. AGI is used not only for the mathematical computation of taxes but is also used, for example, to determine eligibility of certain tax deductions and credits. Thus, the AGI node is common to both the completeness graph 12 and the tax calculation graph 14.

The tax calculation graph 14 and the associated functional nodes 26 and function nodes 28 can be tagged and later be used or called upon to intelligently explain to the user the reasoning behind why a particular tax result changed or did not change between a first set of tax data and a second set of tax data having one or more different values, as explained in more detail below. The functions 28 can be de-coupled from a specific narrow definition and instead be associated with one or more explanations. Examples of common functions 28 found in tax legislation and tax rules include the concepts of "caps" or "exemptions" that are found in various portions of the tax code. One example of a "cap" is the portion of the U.S. tax code that limits the ability of a joint filer to deduct more than $3,000 of net capital losses in any single tax year. There are many other instances of such caps. An example of an "exemption" is one that relates to early distributions from retirement plans. For most retirement plans, early distributions from qualified retirement plans prior to reaching the age of fifty nine and one-half (59½) require a 10% penalty. This penalty can be avoided, however, if an exemption applies such as the total and permanent disability of the participant. Other exemptions also apply. Such exemptions are found throughout various aspects of the tax code and tax regulations.

Figure 11B:
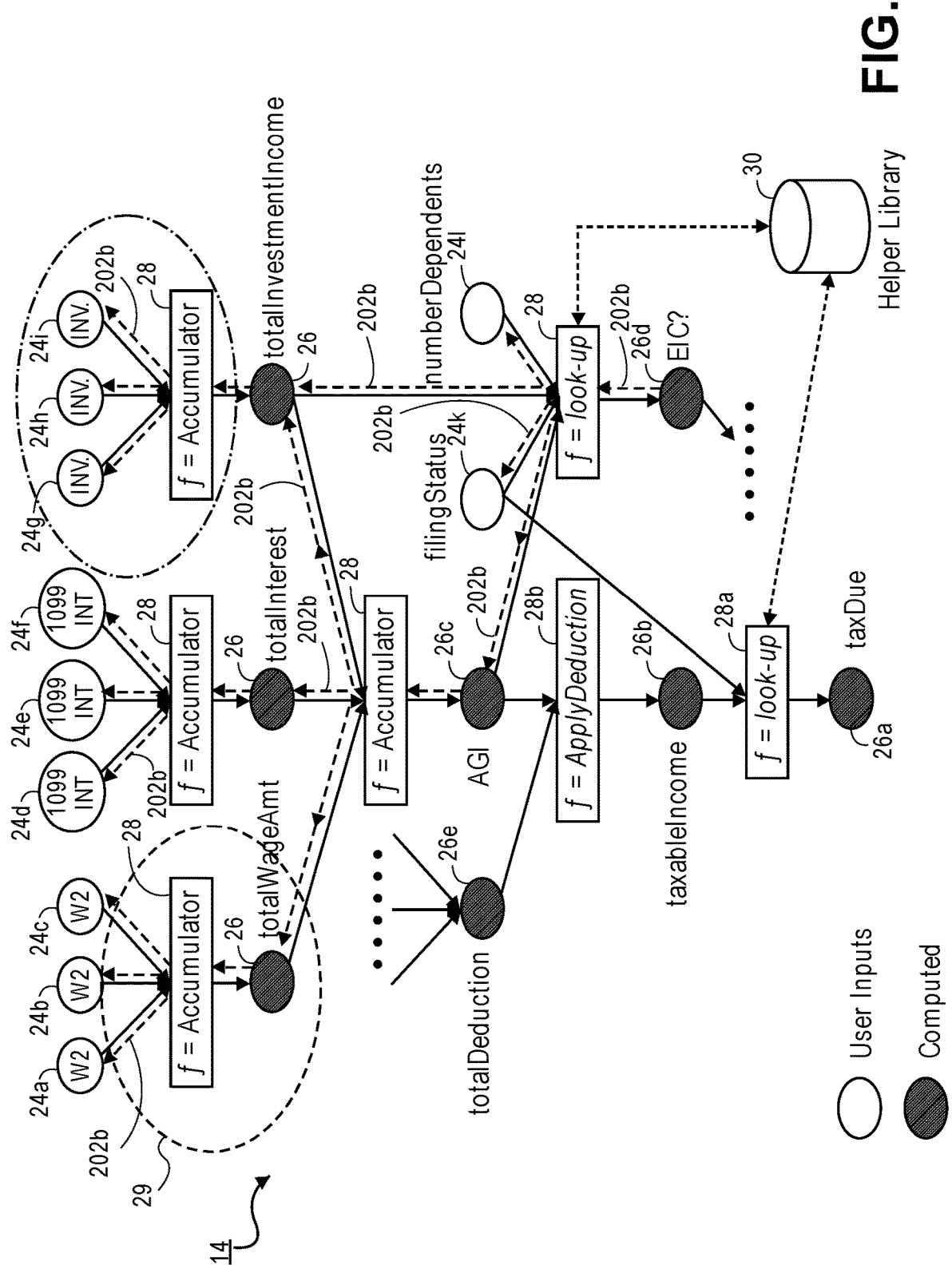

FIG. 11B is the same tax calculation graph as FIG. 11A, except it shows a different impact chain 202, as described in detail below.

Figure 12:
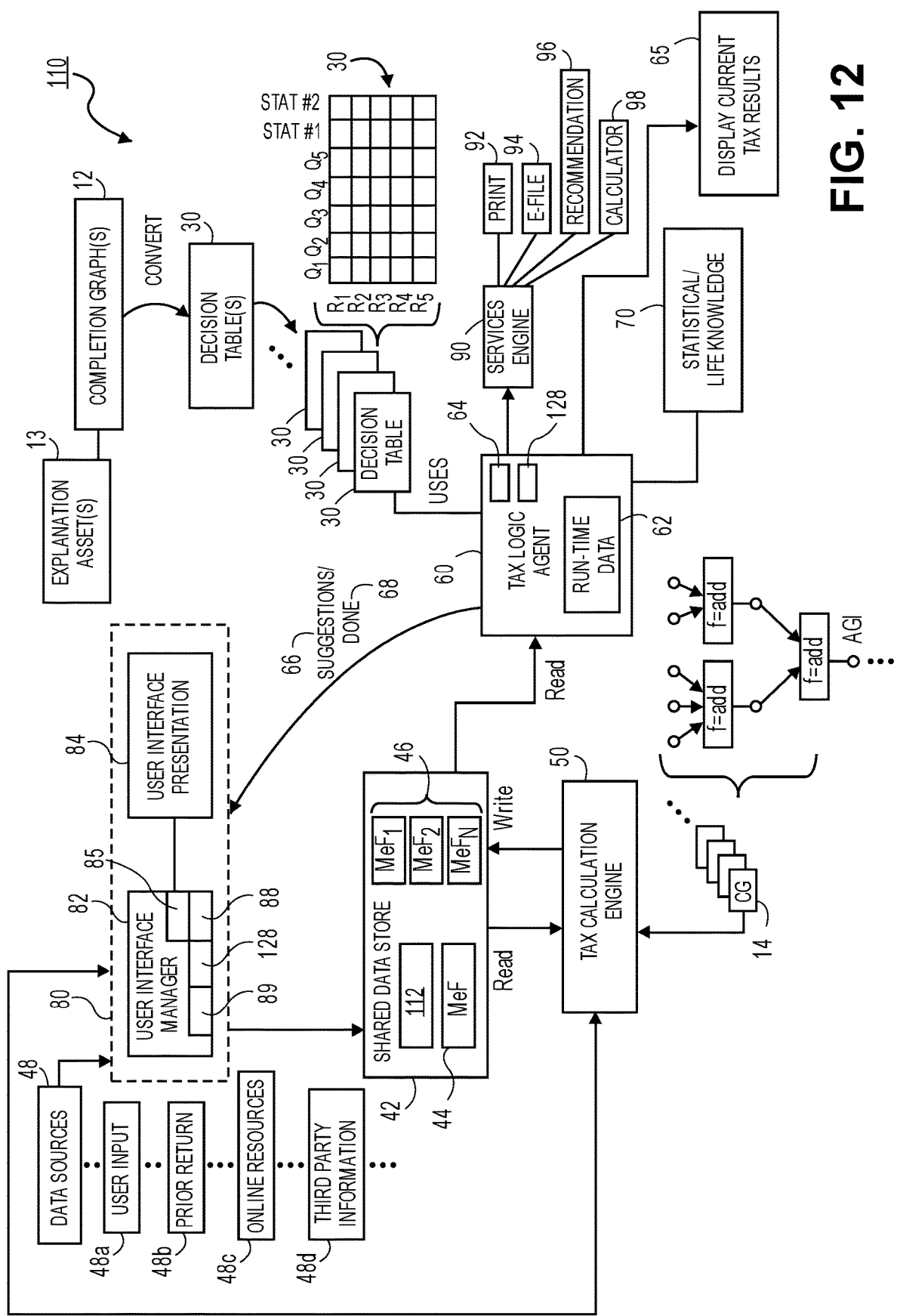
FIG. 12 schematically illustrates a tax preparation system for calculating taxes using rules and calculations based on declarative data structures, according to one embodiment.

FIG. 12 schematically illustrates a tax return preparation system 110 for calculating taxes using rules and calculations based on declarative data structures according to one embodiment. The system 110 includes a shared data store 42 that contains therein a schema 44 or canonical model representative to the data fields utilized or otherwise required to complete a tax return. The shared data store 42 may be a repository, file, or database that is used to contain the tax-related data fields. The shared data store 42 is accessible by a server computing device 104 as described herein (e.g., FIGS. 1 to 3). The shared data store 42 may be located on the server computing device 104 running the tax return preparation software 110 or it may be located remotely, for example, in cloud environment on another, remotely located computer. The schema 44 may include, for example, a schema based on the Modernized e-File (MeF) system developed by the Internal Revenue Service. The MeF is a web-based system that allows electronic filing of tax returns through the Internet. MeF uses extensible markup language (XML) format that is used when identifying, storing, and transmitting data. For example, each line or data element on a tax return is given an XML name tag as well as every instance of supporting data. Tax return preparation software 110 uses XML schemas and business rules to electronically prepare and transmit tax returns to tax reporting agencies. Transmitters use the Internet to transmit electronic tax return data to the IRS MeF system. The IRS validates the transmitted files against the XML schemas and Business Rules in the MeF schema 44. The schema 44 may be a modified version of the MeF schema used by the IRS. For example, the schema 44 may be an extended or expanded version (designated MeF++) of the MeF model established by government authorities that utilizes additional fields. While the particular MeF schema 44 is discussed herein, the invention is not so limited. MeF and MeF+++ are only examples of tax agency standards for electronic filing of tax returns, and the present invention is not limited to any particular standard. Accordingly, any references to MeF or MeF++ in the specification or drawings includes any suitable standard for electronic filing of tax returns.

There may be many different schemas 44 depending on the different tax jurisdiction. For example, Country A may have a tax schema 44 that varies from Country B. Different regions or states within a single country may even have different schemas 44. The systems and methods described herein are not limited to a particular schema 44 implementation. The schema 44 may contain all the data fields required to prepare and file a tax return with a government taxing authority. This may include, for example, all fields required for any tax forms, schedules, and the like. Data may include text, numbers, and a response to a Boolean expression (e.g., True/False or Yes/No). As explained in more detail, the shared data store 42 may, at any one time, have a particular instance 46 of the MeF schema 44 (for MeF++ schema) stored therein at any particular time. For example, FIG. 12 illustrates several instances 46 of the MeF schema 44 (labeled as MeF$_1$, MeF$_2$, MeF$_N$). These instances 46 may be updated as additional data is input into the shared data store 42.

As seen in FIG. 12, the shared data store 42 may import data from one or more computer data sources 48. A number of computer data sources 48 may be used to import or otherwise transfer tax related data to the shared data store 42. This may occur through a user interface controller 80 as described herein or, alternatively, data importation may occur directly to the shared data store 42 (not illustrated in FIG. 12). The tax related data may include personal identification data such as a name, address, or taxpayer ID. Tax data may also relate to, for example, details regarding a taxpayer's employer(s) during a preceding tax year. This may include, employer name, employer federal ID, dates of employment, and the like. Tax related data may include residential history data (e.g., location of residence(s) in tax reporting period (state, county, city, etc.) as well as type of housing (e.g., rental unit or purchased home). Tax related information may also include dependent-related information such as the number of family members in a household including children. Tax related information may pertain to sources of income, including both earned and unearned income as well. Tax related information also include information that pertains to tax deductions or tax credits. Tax related information may also pertain to medical insurance information. For example, under the new Affordable Care Act many taxpayers may obtain health insurance through a state or federal marketplace. Such a marketplace may have information stored or accessible that is used in connection with preparing a tax return. Tax information related to premiums paid, coverage information, subsidy amounts (if any), and enrolled individuals can be automatically imported into the shared data store 42.

For example, user input 48a is one type of computer data source 48. User input 48a may take a number of different forms. For example, user input 48a may be generated by a user using, for example, an input device such as keyboard, mouse, touchscreen display, voice input (e.g., voice to text feature) photograph or image, or the like to enter information manually into the tax return preparation software 110. For example, as illustrated in FIG. 12, user interface manager 82 contains an import module 89 that may be used to select what computer data sources 48 are automatically searched for tax related data. Import module 89 may be used as a permission manager that includes, for example, user account numbers and related passwords. The UI controller 80 enables what sources 48 of data are searched or otherwise analyzed for tax related data. For example, a user may select prior year tax returns 48b to be searched but not online resources 48c. The tax data may flow through the UI controller 80 directly as illustrated in FIG. 12 or, alternatively, the tax data may be routed directly to the shared data store 42. The import module 89 may also present prompts or questions to the user via a user interface presentation 84 generated by the user interface manager 82. For example, a question may ask the user to confirm the accuracy of the data. For instance, the user may be asked to click a button, graphic, icon, box or the like to confirm the accuracy of the data prior to or after the data being directed to the shared data store 42. Conversely, the interface manager 82 may assume the accuracy of the data and ask the user to click a button, graphic, icon, box or the like for data that is not accurate. The user may also be given the option of whether or not to import the data from the computer data sources 48.

User input 48a may also include some form of automatic data gathering. For example, a user may scan or take a photographic image of a tax document (e.g., W-2 or 1099) that is then processed by the tax return preparation software 110 to extract relevant data fields that are then automatically transferred and stored within the data store 42. OCR techniques along with pre-stored templates of tax reporting forms may be called upon to extract relevant data from the scanned or photographic images whereupon the data is then transferred to the shared data store 42.

Another example of a computer data source 48 is a prior year tax return 48b. A prior year tax return 48b that is stored electronically can be searched and data is copied and transferred to the shared data store 42. The prior year tax return 48b may be in a proprietary format (e.g., .txt, .pdf) or an open source format. The prior year tax return 48b may also be in a paper or hardcopy format that can be scanned or imaged whereby data is extracted and transferred to the shared data store 42. In another embodiment, a prior year tax return 48b may be obtained by accessing a government database (e.g., IRS records).

An additional example of a computer data source 48 is an online resource 48c. An online resource 48c may include, for example, websites for the taxpayer(s) that contain tax-related information. For example, financial service providers such as banks, credit unions, brokerages, investment advisors typically provide online access for their customers to view holdings, balances, and transactions. Financial service providers also typically provide year-end tax documents to their customers such as, for instance, 1099-INT (interest income), 1099-DIV (dividend income), 1099-B (brokerage proceeds), 1098 (mortgage interest) forms. The data contained on these tax forms may be captured and transferred electronically to the shared data store 42.

Of course, there are additional examples of online resources 48c beyond financial service providers. For example, many taxpayers may have social media or similar accounts. These include, by way of illustration and not limitation, Facebook, LinkedIn, Twitter, and the like. User's may post or store personal information on these properties that may have tax implications. For example, a user's LinkedIn account may indicate that a person changed jobs during a tax year. Likewise, a posting on Facebook about a new home may suggest that a person has purchased a home, moved to a new location, changed jobs; all of which may have possible tax ramifications. This information is then acquired and transferred to the shared data store 42, which can be used to drive or shape the interview process described herein. For instance, using the example above, a person may be asked a question whether or not she changed jobs during the year (e.g., "It looks like you changed jobs during the past year, is this correct?"). Additional follow-up questions can then be presented to the user.

Still referring to FIG. 12, another computer data source 48 includes sources of third party information 48d that may be accessed and retrieved. For example, credit reporting bureaus contain a rich source of data that may implicate one or more tax items. For example, credit reporting bureaus may show that a taxpayer has taken out a student loan or home mortgage loan that may be the source of possible tax deductions for the taxpayer. Other examples of sources of third party information 48d include government databases. For example, the state department of motor vehicles may contain information relevant to tax portion of vehicle registration fees which can be deductible in some instances. Other government databases that may be accessed include the IRS (e.g., IRS tax return transcripts), and state taxing authorities. Third party resources 48d may also include one of the state-based health insurance exchanges or the federal health insurance exchange (e.g., www.healthcare.gov).

The computer data sources 48b, 48c, 48d described above represent just a few of the tax data source programs 118 potentially available for automatic data acquisition by tax return preparation software 110. More such tax data source programs 118 are become available daily. The tax data acquisition systems 102 described herein are configured to access these tax data source programs 118 efficiently and using minimal system resources.

Referring briefly to FIGS. 1 to 3, the tax return preparation software 110 (e.g., the system 110 of FIG. 12) is executed by the server computing device 104. Referring back to FIG. 12, the tax return preparation software 110 executed by the server computing device 104 includes a tax calculation engine 50 that computes one or more tax calculations based on the tax calculation graph(s) 14 and the available data at any given instance within the schema 44 in the shared data store 42. The tax calculation engine 50 may calculate a final tax due amount, a final refund amount, or one or more intermediary calculations (e.g., taxable income, AGI, earned income, un-earned income, total deductions, total credits, alternative minimum tax (AMT) and the like). The tax calculation engine 50 utilizes the one or more calculation graphs 14 as described previously in the context of FIGS. 6, 11A and 11B. In one embodiment, a series of different calculation graphs 14 are used for respective tax topics. These different calculation graphs 14 may be coupled together or otherwise compiled as a composite calculation graph 14 to obtain an amount of taxes due or a refund amount based on the information contained in the shared data store 42. The tax calculation engine 50 reads the most current or up to date information contained within the shared data store 42 and then performs tax calculations. Updated tax calculation values are then written back to the shared data store 42. As the updated tax calculation values are written back, new instances 46 of the canonical model 46 are created. The tax calculations performed by the tax calculation engine 50 may include the calculation of an overall tax liability or refund due. The tax calculations may also include intermediate calculations used to determine an overall tax liability or refund due (e.g., AGI calculation).FIG. 11

Still referring to FIG. 12, the system 110 includes a tax logic agent (TLA) 60. The TLA 60 operates in conjunction with the shared data store 42 whereby updated tax data represented by instances 46 are read to the TLA 60. The TLA 60 contains run time data 62 that is read from the shared data store 42. The run time data 62 represents the instantiated representation of the canonical tax schema 44 at runtime. The TLA 60 may contain therein a rule engine 64 that utilizes a fact cache to generate either non-binding suggestions 66 for additional question(s) to present to a user or "Done" instructions 68 which indicate that completeness has occurred and additional input is not needed. The rule engine 64 may operate in the form of a Drools expert engine. Other declarative rules engines 64 may be utilized and a Drools expert rule engine 64 is provided as one example of how embodiments may be implemented. The TLA 60 may be implemented as a dedicated module contained within the tax return preparation software 110.

As seen in FIG. 12, the TLA 60 uses the decision tables 30 to analyze the run time data 62 and determine whether a tax return is complete. Each decision table 30 created for each topic or sub-topic is scanned or otherwise analyzed to determine completeness for each particular topic or sub-topic. In the event that completeness has been determined with respect to each decision table 30, then the rule engine 64 outputs a "done" instruction 68 to the UI controller 80. If the rule engine 64 does not output a "done" instruction 68 that means there are one or more topics or sub-topics that are not complete, in which case, as explained in more detail below, the UI controller 80 presents interview questions to a user for answer. The TLA 60 identifies a decision table 30 corresponding to one of the non-complete topics or sub-topics and, using the rule engine 64, identifies one or more non-binding suggestions 66 to present to the UI controller 80. The non-binding suggestions 66 may include a listing or compilation of one or more questions (e.g., $Q_1$-$Q_5$ as seen in FIG. 12) from the decision table 30. In some instances, the listing or compilation of questions may be ranked in order by rank. The ranking or listing may be weighted in order of importance, relevancy, confidence level, or the like. For example, a top ranked question may be a question that, based on the remaining rows (e.g., $R_1$-$R_5$) in a decision will most likely lead to a path to completion. As part of this ranking process, statistical information such as the STAT1, STAT2 percentages as illustrated in FIG. 10 may be used to augment or aid this ranking process. Questions may also be presented that are most likely to increase the confidence level of the calculated tax liability or refund amount. In this regard, for example, those questions that resolve data fields associated with low confidence values may, in some embodiments, be ranked higher.

The following pseudo code generally expresses how a rule engine 64 functions utilizing a fact cache based on the runtime canonical data 62 or the instantiated representation of the canonical tax schema 46 at runtime and generating non-binding suggestions 66 provided as an input a UI controller 80. As described in U.S. application Ser. No. 14/097,057 previously incorporated herein by reference, data such as required inputs can be stored to a fact cache so that the needed inputs can be recalled at a later time, and to determine what is already known about variables, factors or requirements of various rules:

```
Rule engine (64)/ Tax Logic Agent (TLA) (60)
    // initialization process
    Load_Tax_Knowledge_Base;
    Create_Fact_Cache; While (new_data_from_application)
    Insert_data_into_fact_cache;
    collection = Execute_Tax_Rules; // collection is all the fired rules
and corresponding conditions
    suggestions = Generate_suggestions (collection);
    send_to_application(suggestions);
```

The TLA 60 may also receive or otherwise incorporate information from a statistical/life knowledge module 70. The statistical/life knowledge module 70 contains statistical or probabilistic data related to the taxpayer. For example, statistical/life knowledge module 70 may indicate that taxpayers residing within a particular zip code are more likely to be homeowners than renters. More specifically, the statistical/life knowledge module may comprise tax correlation data regarding a plurality of tax matter correlations. Each of the tax matter correlations quantifies a correlation between a taxpayer attribute and a tax related aspect. For instance, a taxpayer attribute could be taxpayer age which may be correlated to a tax related aspect such as having dependents, or a taxpayer attribute might be taxpayer age which may be correlated to homeownership or other relevant tax related aspect. The tax correlation data also quantifies the correlations, such as by a probability of the correlation. For instance, the correlation between the taxpayer attribute and the tax related aspect may be a certain percentage probability, such as 10%, 20%, 30%, 40%, 50%, 60%, or any percentage from 0% to 100%. Alternatively, the quantification can be a binary value, such as relevant or not relevant. In other words, for a given taxpayer attribute, it may be determined that a tax related aspect is relevant or completely not relevant when a taxpayer has the given taxpayer attribute. As an example, if the taxpayer attribute is that the taxpayer is married, the correlation may indicate that spouse information is relevant and will be required.

The TLA 60 may use this knowledge to weight particular topics or questions related to these topics. For example, in the example given above, questions about home mortgage interest may be promoted or otherwise given a higher weight. The statistical knowledge may apply in other ways as well. For example, tax forms often require a taxpayer to list his or her profession. These professions may be associated with transactions that may affect tax liability. For instance, a taxpayer may list his or her occupation as "teacher." The statistic/life knowledge module 70 may contain data that shows that a large percentage of teachers have retirement accounts and in particular 403(b) retirement accounts. This information may then be used by the TLA 60 when generating its suggestions 66. For example, rather than asking generically about retirement accounts, the suggestion 66 can be tailored directly to a question about 403(b) retirement accounts.

The data that is contained within the statistic/life knowledge module 70 may be obtained by analyzing aggregate tax data of a large body of taxpayers. For example, entities having access to tax filings may be able to mine their own proprietary data to establish connections and links between various taxpayer characteristics and tax topics. This information may be contained in a database or other repository that is accessed by the statistic/life knowledge module 70. This information may be periodically refreshed or updated to reflect the most up-to-date relationships. Generally, the data contained in the statistic/life knowledge module 70 is not specific to a particular taxpayer but is rather generalized to characteristics shared across a number of taxpayers although in other embodiments, the data may be more specific to an individual taxpayer.

Still referring to FIG. 12, the UI controller 80 encompasses a user interface manager 82 and a user interface presentation or user interface 84. The user interface presentation 84 is controlled by the user interface manager 82 and may manifest itself, typically, on a visual screen or display 114 that is presented on a computing device 102. The computing device 102 may include the display of a computer, laptop, tablet, mobile phone (e.g., smartphone), or the like. Different user interface presentations 84 may be invoked using a UI generator 85 depending, for example, on the type of display or screen 114 that is utilized by the computing device. For example, an interview screen with many questions or a significant amount of text may be appropriate for a computer, laptop, or tablet screen but such as presentation may be inappropriate for a mobile computing device such as a mobile phone or Smartphone. In this regard, different interface presentations 84 may be prepared for different types of computing devices 102. The nature of the interface presentation 84 may not only be tied to a particular computing device 102 but different users may be given different interface presentations 84. For example, a taxpayer that is over the age of 60 may be presented with an interview screen that has larger text or different visual cues than a younger user.

The user interface manager 82, as explained previously, receives non-binding suggestions from the TLA 60. The non-binding suggestions may include a single question or multiple questions that are suggested to be displayed to the taxpayer via the user interface presentation 84. The user interface manager 82, in one aspect of the invention, contains a suggestion resolution element 88, which is responsible for resolving how to respond to the incoming non-binding suggestions 66. For this purpose, the suggestion resolution element 88 may be programmed or configured internally. Alternatively, the suggestion resolution element 88 may access external interaction configuration files. Additional details regarding configuration files and their use may be found in U.S. patent application Ser. No. 14/206,834, which is incorporated by reference herein.

Configuration files specify whether, when and/or how non-binding suggestions are processed. For example, a configuration file may specify a particular priority or sequence of processing non-binding suggestions 66 such as now or immediate, in the current user interface presentation 84 (e.g., interview screen), in the next user interface presentation 84, in a subsequent user interface presentation 84, in a random sequence (e.g., as determined by a random number or sequence generator). As another example, this may involve classifying non-binding suggestions as being ignored. A configuration file may also specify content (e.g., text) of the user interface presentation 84 that is to be generated based at least in part upon a non-binding suggestion 66.

A user interface presentation 84 may comprise pre-programmed interview screens that can be selected and provided to the generator element 85 for providing the resulting user interface presentation 84 or content or sequence of user interface presentations 84 to the user. User interface presentations 84 may also include interview screen templates, which are blank or partially completed interview screens that can be utilized by the generation element 85 to construct a final user interface presentation 84 on the fly during runtime.

As seen in FIG. 12, the UI controller 80 interfaces with the shared data store 42 such that data that is entered by a user in response to the user interface presentation 84 can then be transferred or copied to the shared data store 42. The new or updated data is then reflected in the updated instantiated representation of the schema 44. Typically, although not exclusively, in response to a user interface presentation 84 that is generated (e.g., interview screen), a user inputs data to the tax return preparation software 110 using an input device that is associated with the computing device. For example, a taxpayer may use a mouse, finger tap, keyboard, stylus, voice entry, or the like to respond to questions. The taxpayer may also be asked not only to respond to questions but also to include dollar amounts, check or un-check boxes, select one or more options from a pull down menu, select radio buttons, or the like. Free form text entry may also be requested from the taxpayer. For example, with regard to donated goods, the taxpayer may be prompted to explain what the donated goods are and describe the same in sufficient detail to satisfy requirements set by a particular taxing authority.

Still referring to FIG. 12, in one aspect, the TLA 60 outputs a current tax result 65 which can be reflected on a display 114 of a server computing device 104. For example, the current tax result 65 may illustrate a tax due amount or a refund amount. The current tax results 65 may also illustrate various other intermediate calculations or operations used to calculate tax liability. For example, AGI or TI may be illustrated. Deductions (either itemized or standard) may be listed along with personal exemptions. Penalty or tax credits may also be displayed on the server computing device 104. This information may be displayed contemporaneously with other information, such as user input information, or user interview questions or prompts.

The TLA 60 also outputs a tax data that is used to generate the actual tax return (either electronic return or paper return). The return itself can be prepared by the TLA 60 or at the direction of the TLA 60 using, for example, the services engine 90 that is configured to perform a number of tasks or services for the taxpayer. The services engine 90 is operatively coupled to the TLA 60 and is configured to perform a number of tasks or services for the taxpayer. For example, the services engine 90 can include a printing option 92. The printing option 92 may be used to print a copy of a tax return, tax return data, summaries of tax data, reports, tax forms and schedules, and the like. The services engine 90 may also electronically file 94 or e-file a tax return with a tax authority (e.g., federal or state tax authority). Whether a paper or electronic return is filed, data from the shared data store 42 required for particular tax forms, schedules, and the like is transferred over into the desired format. With respect to e-filed tax returns, the tax return may be filed using the MeF web-based system that allows electronic filing of tax returns through the Internet. Of course, other e-filing systems may also be used other than those that rely on the MeF standard. The services engine 90 may also make one or more recommendations 96 based on the run-time data 62 contained in the TLA 60. For instance, the services engine 90 may identify that a taxpayer has incurred penalties for underpayment of estimates taxes and may recommend to the taxpayer to increase his or her withholdings or estimated tax payments for the following tax year. As another example, the services engine 90 may find that a person did not contribute to a retirement plan and may recommend 96 that a taxpayer open an Individual Retirement Account (IRA) or look into contributions in an employer-sponsored retirement plan. The services engine 90 may also include a calculator 98 that can be used to calculate various intermediate calculations used as part of the overall tax calculation algorithm. For example, the calculator 98 can isolate earned income, investment income, deductions, credits, and the like. The calculator 98 can also be used to estimate tax liability based on certain changed assumptions (e.g., how would my taxes change if I was married and filed a joint return?). The calculator 98 may also be used to compare analyze differences between tax years.

By using calculation graphs 14 to drive tax calculations and tax operations, it is possible to determine interdependencies of the nodes (including tax operations, functional nodes and function nodes) and the year-over-year calculation graphs 14 can be used to readily identify differences and report the same to a user. Differences can be found using commonly used graph isomorphism algorithms over the two respective calculation graphs 14.

In operation of the systems 102, 110 to acquire tax data to prepare a tax return, a user initiates the tax return preparation software 110 on a server computing device 104 as seen, for example, in FIGS. 1 to 3. The tax return preparation software 110 may reside on the user computing device 106 that the user interfaces with or, alternatively, the tax return preparation software 110 may reside on a remote computing device 104 such as a server or the like as illustrated. In such instances, the user computing device 106 that is utilized by the user or taxpayer may communicate with the remote server computing device 104 using an application running on the user computing device 106. The tax return preparation software 110 may also be run using Internet browser software 112 running on the user computing device 106. Communication between the user computing device 106 and the remote server computing device 106 may occur over a wide area network such as the Internet. Communication may also occur over a private communication network (e.g., mobile phone network).

When the user initiates the tax return preparation software 110, the tax data acquisition systems 102 may automatically import at least some of the tax data needed to complete a tax return from one or more computer data sources 48. The tax data acquisition systems 102 according to the embodiments herein increase the efficiency of the tax data import process with the ever increasing number of tax data sources. Tax data may also be input manually with user input 48*a*. The tax calculation engine 50 computes one or more tax calculations dynamically based on the then available data at any given instance within the schema 44 in the shared data store 42. In some instances, estimates or educated guesses may be made for missing data. Details regarding how such estimates or educated guesses are done may be found in U.S. patent application Ser. No. 14/448,986 which is incorporated by reference as if set forth fully herein. The data acquisition and tax calculation processes are repeated until the tax return is completed.

Tax data source programs 118 potentially available for automatic data acquisition by tax return preparation software 110, such as the computer data sources 48b, 48c, 48d described above, are increasing in number. Tax data acquisition systems can become inefficient when they are overwhelmed by this large number of tax data sources. The tax data acquisition systems 102 described herein address the increasing number of tax data source programs 118 by efficiently accessing these sources in a guided manner while utilizing minimal system resources.

In existing systems, tax data source programs are accessed in a predetermined order. Then, all available tax data is collected and communicated to the tax return preparation software, which import the data for tax return preparation. As the number of tax data source programs increases this tax data acquisition and importing process becomes increasing inefficient. Further, existing tax data acquisition systems do not take into account the accuracy of data sources relative to particular categories of data.

In contrast to these existing systems, the embodiments described herein provide a tax data acquisition system 102 that may run on a computing device 104 (as seen in FIGS. 1 to 3 and 5) that operates on new data construct in which tax rules and the tax determinations based thereon are established in declarative data-structures, namely, one or more completeness/completion graphs 12 (see FIGS. 6 and 7). Completeness graphs 12 are data structures in the form of graphs having interconnecting nodes 20 in which arcs 22 are directed from one node to another (e.g., 22a from 20a to 20b). Completeness graphs 12 identify when all conditions have been satisfied to complete a tax topic determination (i.e., whether an individual qualifies for a particular deduction). Use of these data-structures permits the user experience to be loosely connected or even divorced from the tax calculation engine and the tax data used in the tax topic determinations. Tax topic results are dynamically determined based on tax data derived from sourced data, estimates, user input, etc. Use of these data structures also permits the tax data acquisition system 102 (i.e., the tax logic agent 60) to efficiently identify missing data (and identifiers thereof) for a particular user. The embodiments also operate on other new data structures, i.e., partitions and target queue to guide tax data acquisition). The embodiments further operate on accuracy scores corresponding to collected data to determine the accuracy of the collected data.

Figure 13:
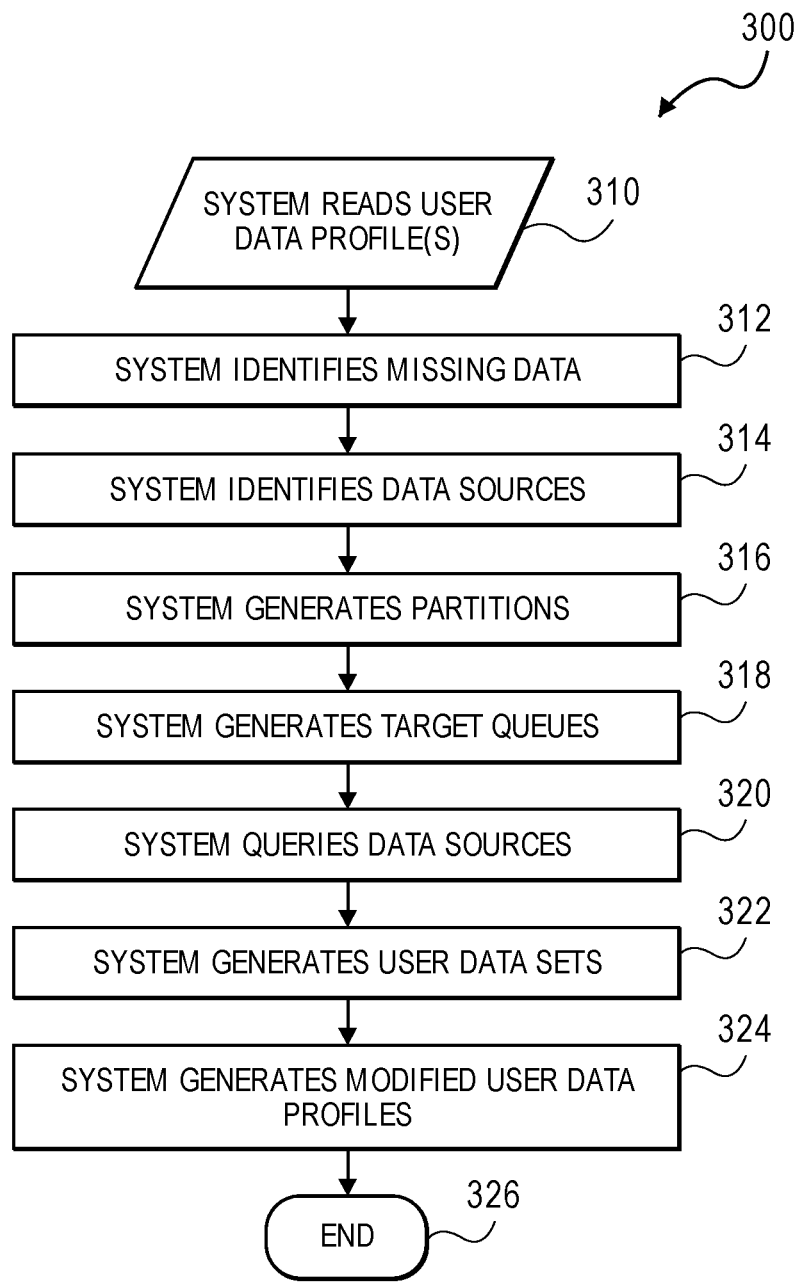
FIG. 13 is a flowchart depicting a computer-implemented method/algorithm for collecting tax data for electronic tax return preparation programs, according to one embodiment.

FIG. 13 depicts a method 300 for collecting tax data for an electronic tax return preparation system 110. By analyzing and utilizing various data structures (e.g., completeness graphs 12, decision tables 30, partitions, and target queues, accuracy scores), this method 300 allows tax data to be collected efficiently.

At step 310, the tax data acquisition system 102 (e.g., the tax logic agent 60) reads one or more user data profiles corresponding to respective users. The user data profiles are the sets of user data currently in possession of the tax data acquisition system 102/electronic tax return preparation software 110.

At step 312, the tax data acquisition system 102 (e.g., the tax logic agent 60) generates respective sets of identifiers of missing data from the one or more user data profiles. The sets of identifiers are indexed to respective user IDs corresponding to the respective users. The sets of identifiers of missing data identify the tax data needed to complete the tax returns for the respective users. The tax logic agent 60 may generate the sets of identifiers of missing data by analyzing the user data profiles in view of the completeness graphs 12 and/or decision tables 30 representing the current tax laws/regulations.

In a simple example, the sets of identifiers of missing data may be:
  user1:(SSN; marital status)
  user2:(first name).

At step 314, the tax data acquisition system 102 (e.g., the match system 126) identifies a plurality of data sources 118 corresponding to the sets of identifiers of missing data. The match system 126 may identify the data sources 118 by analyzing source metadata for the data sources 118. The source metadata may include a list of tax data potentially available from each data source 118.

The source metadata may also include accuracy scores that indicate the likelihood that a particular tax datum will be correct. The accuracy score may be a numerical indicator. The accuracy score may be based on one or more of the taxpayer's identity, the tax datum, and the data source from which the tax datum will be obtained. The accuracy scores of conflicting data collected from a plurality of sources can be used to resolve the conflicts.

In the simple example described above, the data sources corresponding to the sets of identifiers of missing data may be:
  user1:(SSN:IRS,Online Bank; marital status: IRS, Facebook)
  user2:(first name: LinkedIn, Facebook).

With accuracy scores, the data sources corresponding to the sets of identifiers of missing data may be:
  user1:(SSN: IRS:100,Online Bank:50; marital status: IRS:90, Facebook: 75)
  user2:(first name: LinkedIn:80Facebook:60).

At step 316, the tax data acquisition system 102 (e.g., the match system 126) generates respective partitions for the user data profiles. Each partition is a listing of paired data sources and corresponding identifiers of missing data for a particular user. The partitions may also include accuracy scores.

In the simple example described above, the partitions may be:
  user1:(IRS:SSN; IRS:marital status; Online Bank:SSN; Facebook:marital status)
  user2:(LinkedIn:first name; Facebook:first name).

With accuracy scores, the partitions may be:
  user1:(IRS:SSN:100; IRS:marital status:90; Online Bank: SSN:50; Facebook:marital status:75)
  user2:(LinkedIn:first name:80; Facebook:first name:60).

At step 318, the tax data acquisition system 102 (e.g., the dispatch system 128) generates target queues for the data sources using the respective partitions. The target queues include the missing data corresponding to respective data sources. The target queues may include lists of paired user IDs and identifiers of missing data for each data source. The target queues may include accuracy scores.

The target queues may also include source metadata corresponding to a data source, where the source metadata is required to access the data source. For instance, the data source may be a Facebook account of a user, and the source metadata may be a Facebook ID and/or password of the user.

In the simple example described above, the target queues may be:
  IRS:(SSN:user1; marital status:user1)
  Online Bank:(SSN:user1)

Facebook:(marital status:user1; first name:user2)
LinkedIn:(first name:user2)
With accuracy scores, the target queues may be:
IRS:(SSN:user1:100; marital status: user1:90)
Online Bank:(SSN:user1:50)
Facebook:(marital status:user1:75; first name:user2:60)
LinkedIn:(first name:user2:80)

At step 320, the tax data acquisition system 102 (e.g., the data collector 130) queries the plurality of data sources based on the target queues to collect data corresponding to the sets identifiers of missing data. The data collector 130 may query the data sources by sending an API call and/or sending a query to an internal database in the data sources. The data collector 130 may query the data sources as soon as a missing datum is identified, or it may request more than one pieces of missing data in a single data call.

In the simple example described above, the data calls may be very similar to the target queues as shown below:
IRS:(SSN:user1; marital status:user1)
Online Bank:(SSN:user1)
Facebook:(marital status:user1; first name:user2)
LinkedIn:(first name:user2)

At step 322, the tax data acquisition system 102 (e.g., the aggregator 132) generates user specific data sets corresponding to each of the users from respective portions of the collected data. Each user specific data set is associated with a respective user ID. The user specific data sets may be union sets of the portion of the collected data corresponding to each user. The user specific data sets may include accuracy scores. Generating the user specific data sets may also include comparing accuracy scores for two pieces of conflicting data with the same identifier of missing data and userID, and selecting the piece of data with the higher accuracy score to resolve any conflicts in the collected data. The accuracy score can also be used to determine when to request user input regarding conflicting data.

In the simple example described above, the user specific data sets may be:
user1:(IRS:SSN:XXX-XX-XXXX; IRS: marital status: married; Online
Bank:SSN:XXX-XX-XXXY; Facebook: marital status: single)
user2:(LinkedIn:first name:Robert; Facebook:first name: Bob).

With accuracy scores, an intermediate state of the user specific data sets may be:
user1:(IRS:SSN:XXX-XX-XXXX:100; IRS:marital status:married:90; Online
Bank:XXX-XX-XXXY:50; Facebook:marital status:married:75)
user2:(LinkedIn:first name:Robert:80; Facebook:Bob: first name:60).

With accuracy scores, the user specific data sets after comparing the accuracy scores and eliminating the data with the lower scores may be:
user1:(IRS:SSN:XXX-XX-XXXX:100; IRS:marital status:married:90)
user2:(LinkedIn:first name:Robert:80).

In instances of data collection for a single user, the aggregator 132 does not need to sort by userID. However, it can still select collected data based on accuracy scores as described above.

At step 324, the tax data acquisition system 102 (e.g., the importer 134) generates modified user data profiles for each of the plurality of users using respective user specific data sets. The importer 134 may fill in data missing from the user data profiles with the newly acquired data from the user specific data sets. When user specific data sets are generated using accuracy scores, the user specific data is pre-sorted and filling in the missing data is a simple process.

After generating the modified user data profiles, the method 300 for collecting tax data is completed (step 326). If the system 102 determines that at least some of the missing tax data cannot be acquired from tax data source programs 118, the electronic tax return preparation system 110 may proceed with tax data collection using user input 48a. After the user has inputted some taxpayer data, the system 102 may attempt to collect tax data from tax data source programs 118 using method 300.

Figure 14:
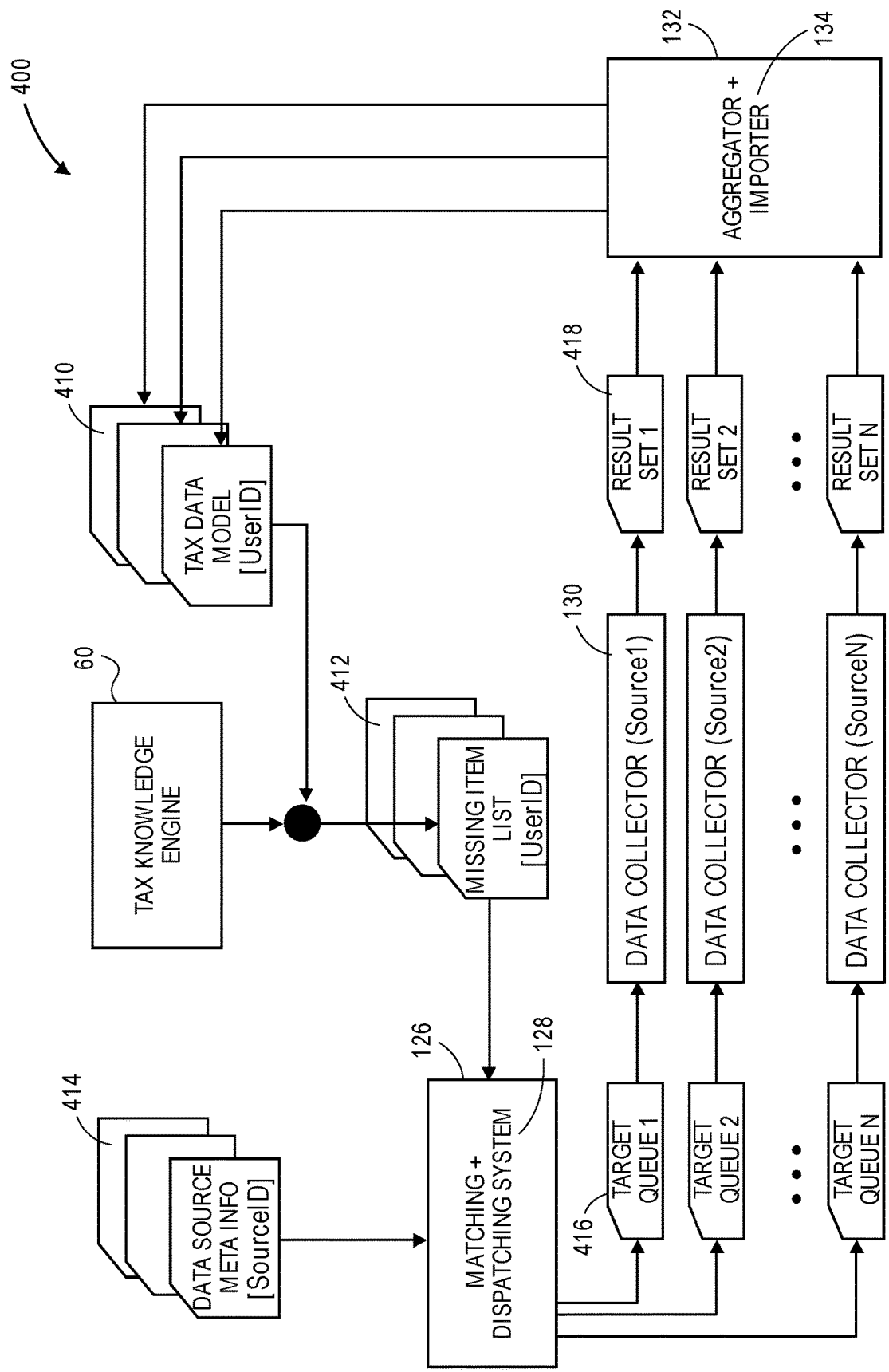
FIG. 14 depicts an exemplary process flow corresponding to the computer-implemented method/algorithm depicted in FIG. 13.

FIG. 14 depicts an exemplary process/data flow 400 corresponding to the method 300 depicted in FIG. 13. The flow 400 begins with user data profiles ("tax data model [userID]") 410. The tax knowledge engine (i.e., the tax logic agent 60 thereof) operates on the user data profiles 410 to generate sets of identifiers of missing data ("missing item list [userID]") 412. The match system 126 and dispatch system 128 operate on the set of identifiers of missing data 412 and data source metadata [sourceID] 414 to generate target queues 416. As shown in FIG. 14, a separate target queue 416 is generated for each tax data source. The partitions are not shown in FIG. 14.

Next, separate data collectors 130 operate on the target queues 416 and their respective data sources to generate respective sets of collected data 418. The aggregator 132 and importer 134 then operate on the sets of collected data to generate modified user data profiles 410'. The function of the various components of the tax data acquisition system 102 are similar to the corresponding functions depicted in FIG. 13 and described above.

The embodiments described herein efficiently and automatically collect tax data from a large number tax data source programs 118 for a plurality of users. Efficiently and automatically collecting tax data improves the user experience by saving user time during tax data entry, increasing accuracy of tax data (and therefore accuracy of tax return) by reducing human error, and reducing overall time required to complete an electronic tax return. The embodiments describe efficient systems and method for guided data acquisition from a large number of potential data sources for a large number of users with a diversity of individual taxpayer needs.

The embodiments also improve the efficiency of the computer systems (e.g., server computing device 104) on which the tax data acquisition system 102 operates, including processor load, memory footprint, and communication bandwidth. The use of completeness graphs 12, decision tables 30, partitions, and target queues, accuracy scores, described herein, increases processing efficiency and reduces memory footprint size. The embodiments described herein address the computer centric issue of collecting tax data from tax data source programs 118 over networks 108 using various computing engines that operate on various data structures. The embodiments described herein include transforming (1) user data profiles into modified and more complete user data profiles, (2) partitions into target queues, (3) target queues into collected data, and (4) collected data into user specific data sets. The embodiments described herein also improve the technical fields of information storage, information processing, computer communications, and electronic tax return preparation.

Method embodiments or certain steps thereof, some of which may be loaded on certain system components, computers or servers, and others of which may be loaded and executed on other system components, computers or servers, may also be embodied in, or readable from, a non-transitory, tangible medium or computer-readable medium or carrier, e.g., one or more of the fixed and/or removable data storage data devices and/or data communications devices connected to a computer. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, DVD-RW, or other carrier now known or later developed capable of storing data. The processor 220 performs steps or executes program instructions 212 within memory 122 and/or embodied on the carrier to implement method embodiments.

Embodiments, however, are not so limited and implementation of embodiments may vary depending on the platform utilized. Accordingly, embodiments are intended to exemplify alternatives, modifications, and equivalents that may fall within the scope of the claims.

Although particular embodiments have been shown and described, it should be understood that the above discussion is not intended to limit the scope of these embodiments. While embodiments and variations of the many aspects of embodiments have been disclosed and described herein, such disclosure is provided for purposes of explanation and illustration only. Thus, various changes and modifications may be made without departing from the scope of the claims.

Where methods and steps described above indicate certain events occurring in certain order, those of ordinary skill in the art having the benefit of this disclosure would recognize that the ordering of certain steps may be modified and that such modifications are in accordance with the variations of the disclosed embodiments. Additionally, certain of the steps may be performed concurrently in a parallel process as well as performed sequentially. Thus, the methods shown in various flow diagrams are not intended to be limited to a particular sequential order, unless otherwise stated or required.

Accordingly, embodiments are intended to exemplify alternatives, modifications, and equivalents that may fall within the scope of the claims.

What is claimed is:

1. A method implemented by a server computing device including a memory and a processor, the server computing device being in communication with a plurality of user computing devices and a plurality of remote data sources over at least one network for collecting tax data for an electronic tax return, the server computing device comprising a tax data acquisition system coupled with an electronic tax return preparation system at least partially being stored as computer-executable instructions in the memory of the server computing device and functioning in conjunction with the processor of the server computing device, each user computing device comprising a program operable for each user to initiate the electronic tax return preparation system, the method comprising executing the instructions thereby causing the server computing device to perform:

reading a plurality of user data profiles stored in a shared data store, the plurality of the user data profiles being indexed to respective user identifiers (IDs) for respective users;

providing one or more completeness graph data structures for automatically processing data of a user data profile to determine whether each user qualifies for one or more tax topics, each completeness graph data structure being represented by a completeness graph, the completeness graph comprising a plurality of interconnecting and logically dependent functional nodes being connected with respective arcs to form a plurality of completeness paths representing rules and regulations for completing a respective tax topic determination, the plurality of interconnecting functional nodes comprising a beginning node, a plurality of intermediate nodes, and a termination node, at least one arc connecting the beginning node and at least one intermediate node, at least one arc connecting the termination node and at least one intermediate node, and at least one arc connecting different intermediate nodes, each completion path comprising the beginning node, one or more intermediate nodes, the termination node and respective arcs, the beginning node and the plurality of intermediate nodes representing respective textual questions with respective logic expressions, the respective arcs each representing one of two response options of the respective logic expression to the respective textual question along each completion path based on the data of the user data profile such that a completion path is determined at the termination node to complete the respective tax topic determination;

traversing one or more completeness graphs by providing the data of the respective user data profiles to the nodes of respective completeness graphs through the respective completion paths from the beginning node to the termination node to generate respective sets of missing data identifiers of the missing data from respective user data profiles, each set of the missing data identifiers being indexed to a respective user ID, each missing data identifier indicative of a category of the missing data, wherein the missing data is required to answer the respective textual questions to complete respective tax topic determinations;

identifying a plurality of data sources corresponding to the sets of the missing data identifiers of the missing data for respective user data profiles indexed to respective user IDs;

generating a plurality of partition data structures for collecting the missing data for the plurality of the user data profiles, each partition data structure being indexed to each user ID and comprising a respective list of multiple pairs of respective data sources and respective missing data identifiers of the missing data;

generating a plurality of target queues to access the plurality of the data sources using the respective partitions for collecting the missing data for the plurality of user data profiles, each target queue being a target queue data structure generated for each respective data resource and comprising the data resource associated with a plurality of pairs of respective missing data identifiers and different respective user IDs;

querying the plurality of data sources based on the target queues to collect data corresponding to the sets of the missing data identifiers and respective user IDs over the at least one network;

generating user specific data sets corresponding to each of the plurality of users from respective collected data, each user specific data set associated with a respective user ID; and updating the user data profiles stored in a shared data store for each of the plurality of users by filling in data missing from the user data profiles using respective user specific data sets.

2. The method of claim 1, wherein reading the plurality of the user data profiles comprises analyzing the plurality of the user data profiles in view of decision tables to identify the missing data, wherein each decision table is a representation of a data structure comprising the plurality of completion paths through the respective completeness graph, each decision table comprising a plurality of columns corresponding to the respective textual questions of the completeness graph, a plurality of rows corresponding to respective rules and completion paths, and a plurality of cells defined by respective column-row intersections, each cell representing one of two response options to the respective logic expression corresponding to the textual question of each cell's respective column, wherein a completion path is determined by the responses to the logic expressions along the respective row thereby eliminating at least one textual question of the decision table.

3. The method of claim 1, wherein identifying the plurality of data sources comprises: the server computing device analyzing source metadata for the plurality of data sources.

4. The method of claim 3, wherein the source metadata identifies the data available from each of the plurality of data sources.

5. The method of claim 1, wherein the respective target queues include source metadata corresponding to at least one of the plurality of data sources, wherein the source metadata is required to access the at least one of the plurality of data sources.

6. The method of claim 5, wherein the at least one of the plurality of data sources is a Facebook account of a user, and the source metadata is a Facebook ID and a password of the user.

7. The method of claim 1, wherein querying the plurality of data sources comprises a data collector sending an API call to a data source of the plurality of data sources over the at least one network.

8. The method of claim 1, wherein querying the plurality of data sources comprises a data collector sending a query to an internal database in the plurality of data sources over the at least one network.

9. The method of claim 1, wherein querying the plurality of data sources comprises a data collector requesting more than one piece of missing data from a data source in a single data call.

10. The method of claim 1, wherein generating user specific data sets corresponding to each of the plurality of users comprises forming a union set of at least some of the collected data, the union set corresponding to one of the plurality of users.

11. The method of claim 1, wherein the collected data comprises respective accuracy scores indicating respective accuracy of the corresponding collected data.

12. The method of claim 11, wherein generating the user specific data sets comprises comparing a first accuracy score and a second accuracy score corresponding to respective first and second collected data conflicted with a same identifier of the missing data and a same user IDs from different data sources; and responsive to the comparing, selecting a specific data set with a higher accuracy score to generate the user specific data sets.

13. A computing system comprising:
a server computing device including a memory and a processor;
a plurality of user computing devices; and
a plurality of remote data sources, wherein the server computing device is in communication with the plurality of user computing devices and the plurality of remote data sources over at least one network for collecting tax data for an electronic tax return, the server computing device comprising a tax data acquisition system coupled with an electronic tax return preparation system at least partially being stored as computer-executable instructions in the memory of the server computing device and functioning in conjunction with the processor of the server computing device, the user computing device comprising a program operable for a user to initiate the electronic tax return preparation system, the instructions being executed by the processor to cause the server computing device to perform:
reading a plurality of user data profiles stored in a shared data store, the plurality of the user data profiles being indexed to respective user identifiers (IDs) for respective users; providing one or more completeness graph data structures for automatically processing data of a user data profile to determine whether each user qualifies for one or more tax topics, each completeness graph data structure being represented by a completeness graph, the completeness graph comprising a plurality of interconnecting and logically dependent functional nodes being connected with respective arcs to form a plurality of completeness paths representing rules and regulations for completing a respective tax topic determination, the plurality of interconnecting functional nodes comprising a beginning node, a plurality of intermediate nodes, and a termination node, at least one arc connecting the beginning node and at least one intermediate node, at least one arc connecting the termination node and at least one intermediate node, and at least one arc connecting different intermediate nodes, each completion path comprising the beginning node, one or more intermediate nodes, the termination node and respective arcs, the beginning node and the plurality of intermediate nodes representing respective textual questions with respective logic expressions, the respective arcs each representing one of two response options of the respective logic expression to the respective textual question along each completion path based on the data of the user data profile such that a completion path is determined at the termination node to complete the respective tax topic determination;
traversing one or more completeness graphs by providing the data of the respective user data profiles to the nodes of respective completeness graphs through the respective completion paths from the beginning node to the termination node to generate respective sets of missing data identifiers associated with the missing data from respective user data profiles, each set of the missing data identifiers being indexed to a respective user ID, each missing data identifier indicative of a category of the missing data, wherein the missing data is required to answer the respective textual questions to complete respective tax topic determinations;
identifying a plurality of data sources corresponding to the sets of the missing data identifiers of the missing data for respective user data profiles indexed to respective user IDs;
generating a plurality of partition data structures for collecting the missing data for the plurality of the user data profiles, each partition data structure generated for being indexed to each user ID and comprising a respective list of multiple pairs of respective data sources and respective missing data identifiers of the missing data;
generating a plurality of target queues to access the plurality of the data sources using the respective partitions for collecting the missing data for the plurality of user data profiles, each target queue being a target queue data structure generated for each respective data resource and comprising the data resource associated with a plurality of pairs of respective missing data identifiers and different respective user IDs;

querying the plurality of data sources based on the target queues to collect data corresponding to the sets of the missing data identifiers and respective user IDs over the at least one network;

generating user specific data sets corresponding to each of the plurality of users from respective collected data, each user specific data set associated with a respective user ID; and updating the user data profiles stored in the shared data store for each of the plurality of users by filling in data missing from the user data profiles using respective user specific data sets.

14. The system of claim 13, wherein reading the plurality of the user data profiles comprises: the server computing device analyzing the plurality of the user data profiles in view of decision tables to identify the missing data, wherein each decision table is a representation of a data structure comprising the plurality of completion paths through the respective completeness graph, each decision table comprising a plurality of columns corresponding to the respective textual questions of the completeness graph, a plurality of rows corresponding to respective rules and completion paths, and a plurality of cells defined by respective column-row intersections, each cell representing one of two response options to the respective logic expression corresponding to the textual question of each cell's respective column, wherein a completion path is determined by the responses to the logic expressions along the respective row thereby eliminating at least one textual question of the decision table.

15. The system of claim 13, wherein identifying the plurality of data sources comprises: the server computing device analyzing source metadata for the plurality of data sources.

16. The system of claim 15, wherein the source metadata identifies the data available from each of the plurality of data sources.

17. The system of claim 13, wherein the respective target queues include source metadata corresponding to at least one of the plurality of data sources, wherein the source metadata is required to access the at least one of the plurality of data sources.

18. The system of claim 17, wherein the at least one of the plurality of data sources is a Facebook account of a user, and the source metadata is a Facebook ID and a password of the user.

19. The system of claim 13, wherein querying the plurality of data sources comprises: the server computing device sending an API call to a data source of the plurality of data sources over the at least one network.

20. The system of claim 13, wherein querying the plurality of data sources comprises: the server computing device sending a query to an internal database in the plurality of data sources over the at least one network.

21. The system of claim 13, wherein querying the plurality of data sources comprises: the server computing device requesting more than one piece of missing data from a data source in a single data call.

22. The system of claim 13, wherein generating user specific data sets corresponding to each of the plurality of users comprises forming a union set of at least some of the collected data, the union set corresponding to one of the plurality of users.

23. The system of claim 13, wherein the collected data comprises respective accuracy scores indicating respective accuracy of the corresponding collected data.

24. The system of claim 23, wherein generating the user specific data sets comprises comparing a first accuracy score and a second accuracy score corresponding to respective first and second collected data conflicted with a same identifier of the missing data and a same user IDs from different data sources; and responsive to the comparing, selecting a specific data set with a higher accuracy score to generate the user specific data sets.

25. The method of claim 1, wherein the shared data store contains all data fields required to prepare and file the electronic tax return by the server computing device over the at least one network, wherein the shared data store may import the collected data from one or more data sources, and wherein the shared data store stores one or more Modernized e-File (MeF) schemas, each MeF schema using an extensible markup language (XML) format for identifying, storing, and transmitting the collected data.

26. The method of claim 1, further comprising:
determining that at least a part of the missing tax data is not acquired from the remote data sources; and
in response to the determining, proceeding to collect the missing data using user inputs through a user interface of the user computing device over the at least one network.

27. The system of claim 13, wherein the shared data store contains all data fields required to prepare and file the electronic tax return by the server computing device over the at least one network, wherein the shared data store may import the collected data from one or more data sources, and wherein the shared data store stores one or more Modernized e-File (MeF) schemas, each MeF schema using an extensible markup language (XML) format for identifying, storing, and transmitting the collected data.

28. The system of claim 13, wherein the instructions are further executed by the processor to cause the server computing device to perform:
determining at least a part of the missing tax data is not acquired from the remote data sources; and
in response to the determining, proceeding to collect the missing data using user inputs through a user interface of the user computing device over the at least one network.

* * * * *